(12) United States Patent
Ooi et al.

(10) Patent No.: US 12,254,136 B2
(45) Date of Patent: Mar. 18, 2025

(54) HAPTIC BUTTON WITH SMA

(71) Applicant: CAMBRIDGE MECHATRONICS LIMITED, Cambridge (GB)

(72) Inventors: David Kuan Wei Ooi, Cambridge (GB); Peter Van Wyk, Cambridge (GB); Joshua Carr, Cambridge (GB); Thomas James Powell, Cambridge (GB); Marc-Sebastian Scholz, Cambridge (GB); Andreas Flouris, Cambridge (GB); Andrew Benjamin Simpson Brown, Cambridge (GB); Stephen Matthew Bunting, Cambridge (GB); Dominic George Webber, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/230,909

(22) Filed: Aug. 7, 2023

(65) Prior Publication Data

US 2023/0384862 A1  Nov. 30, 2023

Related U.S. Application Data

(63) Continuation of application No. 16/969,459, filed as application No. PCT/GB2019/050535 on Feb. 26, 2019, now Pat. No. 11,762,468.

(30) Foreign Application Priority Data

Feb. 26, 2018 (GB) .................................. 1803084
Aug. 9, 2018 (GB) .................................. 1813008

(51) Int. Cl.
 *G06F 3/01* (2006.01)

(52) U.S. Cl.
 CPC .................................. *G06F 3/016* (2013.01)

(58) Field of Classification Search
 CPC ....................................................... G06F 3/016
 See application file for complete search history.

(56) References Cited

U.S. PATENT DOCUMENTS 4,690,641 A * 9/1987 Luiset ..................... A61C 1/141
 433/129
5,020,428 A * 6/1991 Gawler ............ G07B 17/00193
 101/87

(Continued)

FOREIGN PATENT DOCUMENTS

WO  2014/093741 A1  6/2014

OTHER PUBLICATIONS

Examination Report dated Mar. 14, 2022 of EP Application 19710078.7 (11 pages).

(Continued)

*Primary Examiner* — Tadesse Hailu
(74) *Attorney, Agent, or Firm* — Van Hoven PC; Stefan D. Osterbur; Joshua Van Hoven

(57) ABSTRACT

Broadly speaking, embodiments of the present techniques provide haptic button assemblies in which the haptic button has a low profile while still providing a satisfying tactile response or sensation to a user. Advantageously, the haptic button assemblies may have a profile that, for example, enables the assembly to be incorporated into the free space along an edge of a portable computing device. The haptic assemblies may, for example, be arranged to move the button perpendicularly with respect to the edge of the device.

20 Claims, 26 Drawing Sheets

(56) References Cited

U.S. PATENT DOCUMENTS

| | | | |
|---|---|---|---|
| 5,388,992 | A | 2/1995 | Franklin et al. |
| 5,711,415 | A * | 1/1998 | Fukuda .................... G05G 9/02 200/570 |
| 6,059,499 | A * | 5/2000 | Bird ........................ B60P 7/083 410/106 |
| 6,380,733 | B1 | 4/2002 | Apel et al. |
| 6,448,520 | B1 * | 9/2002 | Inoue ..................... H01H 3/125 200/344 |
| 6,717,573 | B1 * | 4/2004 | Shahoian ................ G06F 3/016 345/161 |
| 7,852,190 | B1 | 12/2010 | Woychik et al. |
| 8,431,852 | B2 * | 4/2013 | Maruyama ........... H01H 13/705 200/344 |
| 9,710,061 | B2 | 7/2017 | Pance et al. |
| 10,008,349 | B2 | 6/2018 | Kernebeck et al. |
| 10,191,550 | B1 | 1/2019 | Nussbaum et al. |
| 10,691,211 | B2 | 6/2020 | Amin-Shahidi et al. |
| 2002/0054060 | A1 | 5/2002 | Schena |
| 2005/0098413 | A1 | 5/2005 | Kiyotaka |
| 2006/0014123 | A1 | 1/2006 | Hanley |
| 2006/0109256 | A1 | 5/2006 | Grant et al. |
| 2008/0316171 | A1 | 12/2008 | Shahoian et al. |
| 2009/0001855 | A1 | 1/2009 | Lipton et al. |
| 2009/0128376 | A1 | 5/2009 | Caine et al. |
| 2011/0024275 | A1 | 2/2011 | Aisenbrey |
| 2011/0102326 | A1 | 5/2011 | Casparian et al. |
| 2012/0126959 | A1 | 5/2012 | Zarrabi et al. |
| 2012/0206248 | A1 | 8/2012 | Biggs |
| 2012/0212442 | A1 | 8/2012 | Uchida et al. |
| 2013/0044049 | A1 | 2/2013 | Biggs et al. |
| 2013/0207793 | A1 | 8/2013 | Weaber et al. |
| 2015/0325494 | A1 * | 11/2015 | Kroneder .............. H01L 23/043 361/715 |
| 2016/0368671 | A1 * | 12/2016 | Pentelovitch .......... B65D 39/12 |
| 2017/0153704 | A1 | 6/2017 | Nakao et al. |
| 2017/0194114 | A1 | 7/2017 | Towers |
| 2017/0221661 | A1 | 8/2017 | Kernebeck et al. |
| 2017/0228028 | A1 | 8/2017 | Nakamura et al. |
| 2017/0315617 | A1 | 11/2017 | Nakao |
| 2018/0369865 | A1 | 12/2018 | Shoji et al. |

OTHER PUBLICATIONS

GB Search Report received for GB Application No. 1813008.8, mailed on Oct. 31, 2018, 1 page.

Howe et al., "Sharp memory alloy actuator controller design for tactile displays," Proceedings of the 34th Conference on Decision & Control, FM09 2:10 pp. 3540-3544, IEEE (1995).

Takeda Y. et al., "Tactile actuators using SMA micro-wires and the generation of texture sensation from images", 2013 IEEE/RSJ International Conference on Intelligent Robots and Systems, 2013, pp. 2017-2022.

International Search Report and Written Opinion received for PCT Patent Application No. PCT/GB2019/050535, mailed on May 7, 2019, 9 pages.

\* cited by examiner

HAPTIC BUTTON WITH SMA

CROSS-REFERENCE TO RELATED APPLICATIONS

This application is a continuation of U.S. patent application Ser. No. 16/969,459, filed Aug. 12, 2020, now allowed, which is a national stage application under 35 U.S.C. § 371 of International Application PCT/GB2019/050535, filed Feb. 26, 2019, which claims priority of GB Patent Applications 1803084.1, filed Feb. 26, 2018 and GB 1813008.8, filed Aug. 9, 2018. The disclosure of which are hereby incorporated by reference herein in their entireties.

The present techniques generally relate to apparatus and methods for providing haptic feedback in electrical and electronic products, and in particular, relate to apparatus for providing haptic feedback which comprise a shape memory alloy (SMA) actuator.

Consumer electronics devices, such as laptops and smartphones, may employ different types of controls to give users of the devices some feedback indicating that they have successfully pressed a button on the device. This is generally known as haptic feedback, and haptic buttons or controls on a device may provide a tactile sensation to the user to confirm that the they have successfully pressed the button/control/switch. A haptic button may be provided as a module or assembly for incorporation within an electronic device by a device manufacturer. However, space within mobile and portable consumer electronic devices is typically at a premium. Haptic buttons are typically located along or near edges of a smartphone or a portable computing device, for example, so that the display screen may be maximised. The ever-decreasing thickness of portable computing devices, and the increasing display screen size, means that there is relatively little free space within a smartphone for haptic buttons. It is therefore, advantageous to produce a haptic button having a low profile, e.g. having a low/small height such that the button is able to be incorporated into the free space along an edge of a portable computing device. However, a low profile button is, by design, not able to move/travel within the computing device as much as ordinary buttons, and therefore, may not be able to provide a satisfying tactile response or sensation to the user.

The present applicant has identified the need for an improved haptic button assembly for electronic devices.

In a first approach of the present techniques, there is provided a haptic button assembly comprising: a housing comprising a cavity; a button provided within the cavity and moveable along a first axis within the cavity; at least one intermediate element provided within the cavity in contact with the button and moveable in a plane defined by the first axis and a second axis, the second axis being perpendicular to the first axis, and arranged to drive movement of the button along the first axis; and at least one shape-memory alloy (SMA) wire coupled to the at least one intermediate moveable element and arranged to, on contraction, move the intermediate moveable element in the plane.

In a second approach of the present techniques, there is provided a haptic button assembly comprising: a housing comprising a cavity; a button provided within the cavity and moveable along a first axis within the cavity; at least one intermediate moveable element provided within the cavity in contact with the button and rotatable about a second axis that is parallel to the first axis, and arranged to drive movement of the button along the first axis; and at least one shape memory alloy (SMA) actuator wire coupled to the at least one intermediate moveable element and arranged to, on contraction, rotate the intermediate moveable element about the second axis.

In a third approach of the present techniques, there is provided a haptic assembly comprising: a rotatable button arranged to rotate about a first axis; at least one intermediate moveable element rotatable about the first axis, and arranged to drive rotation of the rotatable button; and at least one shape memory alloy (SMA) actuator wire arranged along a second axis, the second axis being perpendicular to the first axis, the at least one SMA actuator wire being coupled to the at least one intermediate moveable element and arranged to, on contraction, rotate the intermediate moveable element about the first axis.

In a fourth approach of the present techniques, there is provided an apparatus comprising: a moveable component; a static component; at least one haptic assembly arranged to move the moveable component, the haptic assembly comprising: at least one intermediate moveable element arranged to drive movement of the moveable component; and at least one shape memory alloy (SMA) actuator wire coupled to the at least one intermediate moveable element and arranged to, on contraction, drive movement of the intermediate moveable component.

In a fifth approach of the present techniques, there is provided an apparatus comprising any of the haptic button assemblies described herein for delivering a haptic sensation to a user of the apparatus.

The apparatus may be any one of: a smartphone, a protective cover or case for a smartphone, a functional cover or case for a smartphone or electronic device, a camera, a foldable smartphone, a foldable image capture device, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), an autonomous vehicle (e.g. a driverless car), a vehicle, a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of possible apparatus.

In a further approach of the present techniques, there is provided a method for providing a haptic sensation to a user using any haptic button assembly described herein, the method comprising: receiving data from a sensor indicating that the button has been pressed; and sending a signal to drive the at least one SMA actuator wire.

Preferred features are set out in the appended dependent claims.

Implementations of the present techniques will now be described, by way of example only, with reference to the accompanying drawings, in which.

Figure 11A:
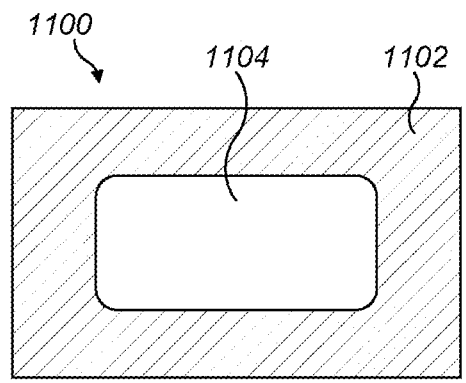
Figure 11B:
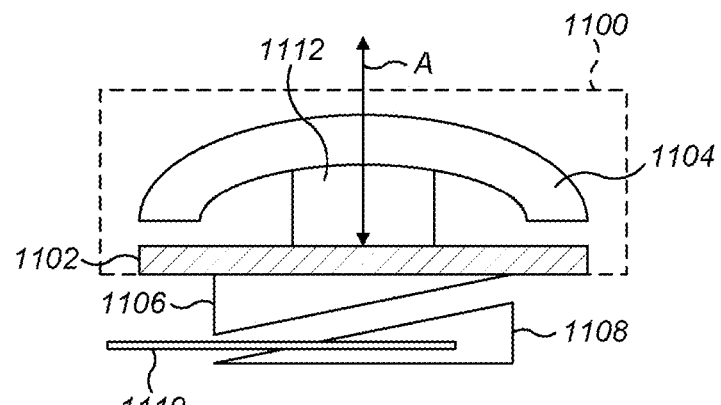
Figure 12A:
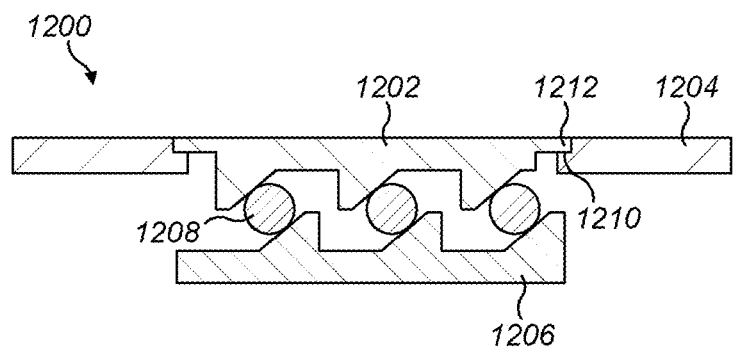
Figure 12B:
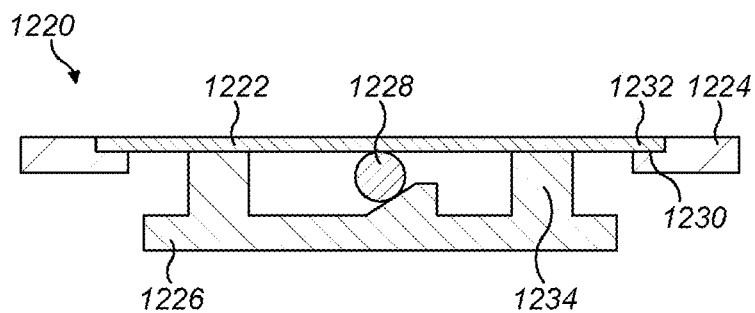
Figure 12C:
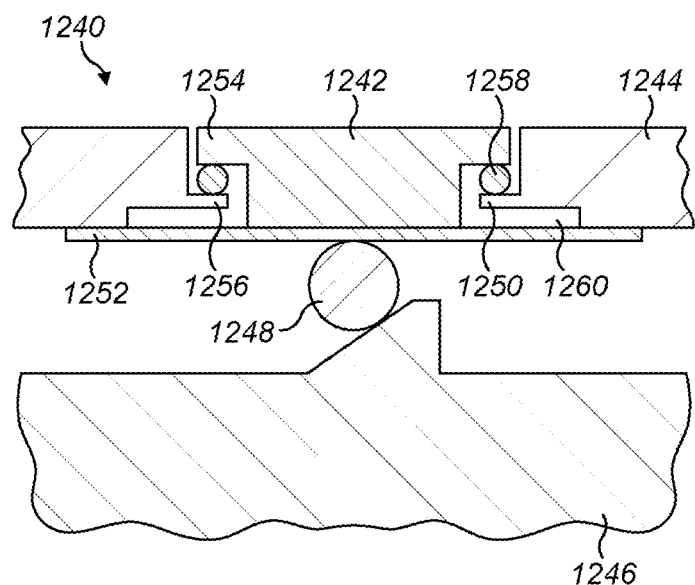
Figure 13A:
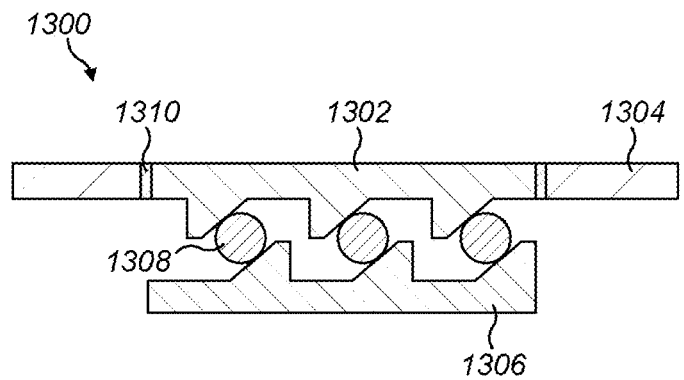
Figure 13B:
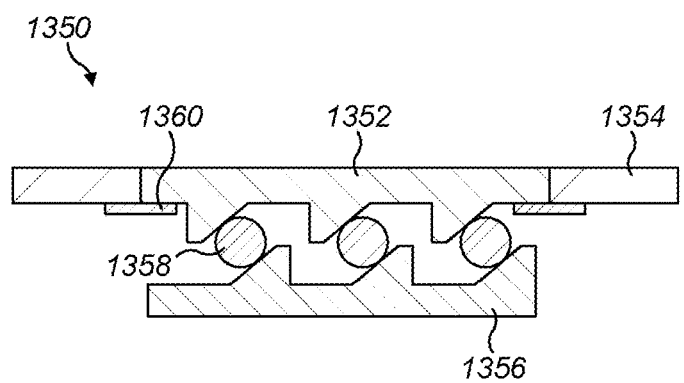
Figure 14:
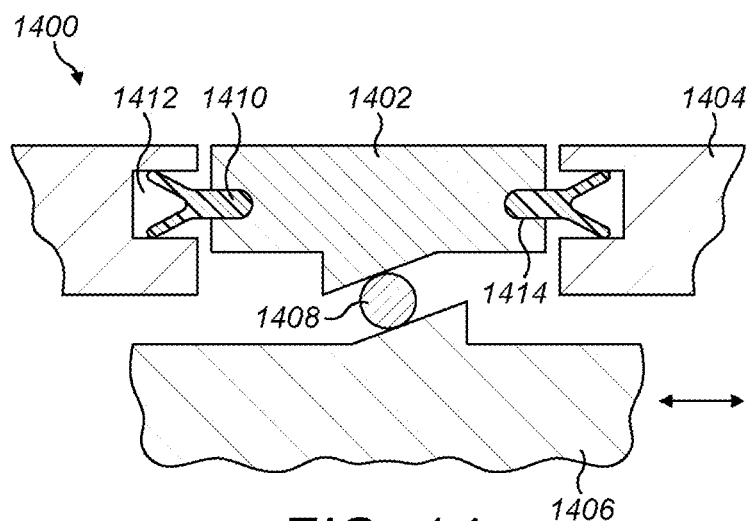
Figure 15:
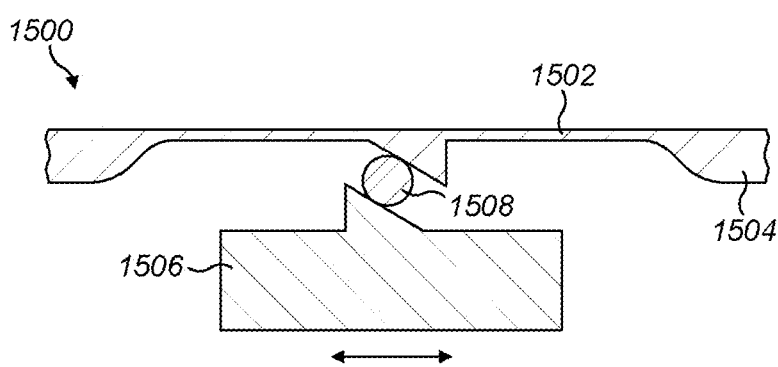
Figure 16:
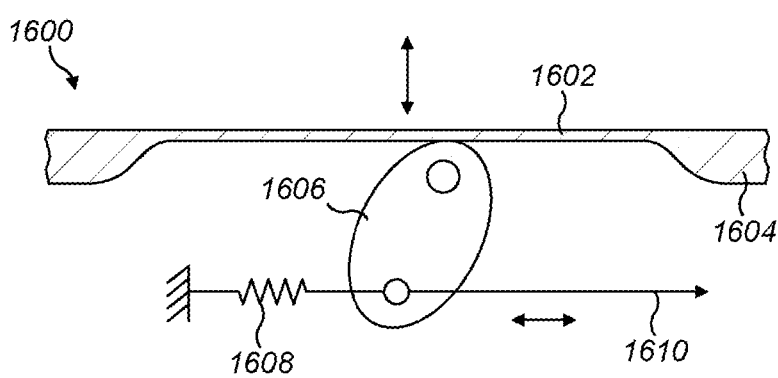
Figure 16A:
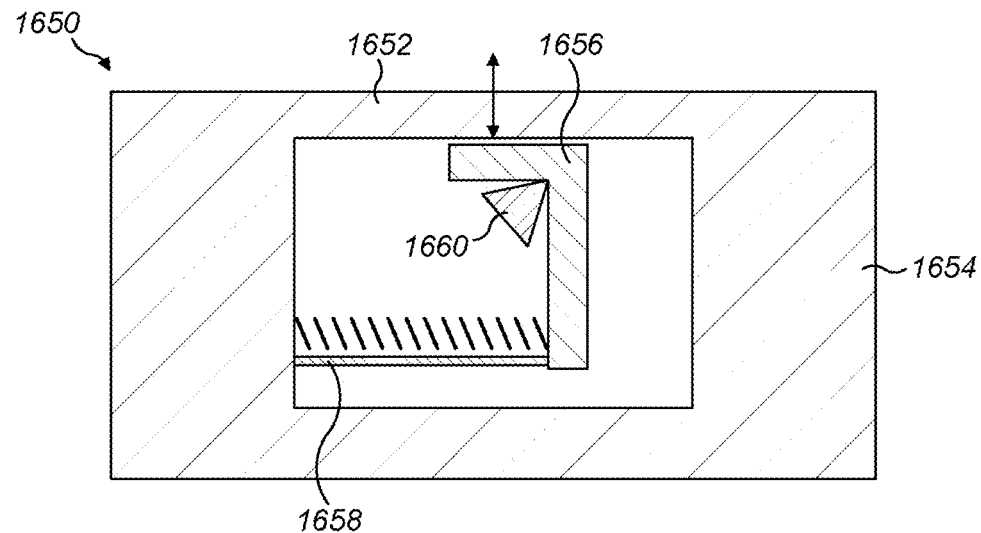
Figure 17:
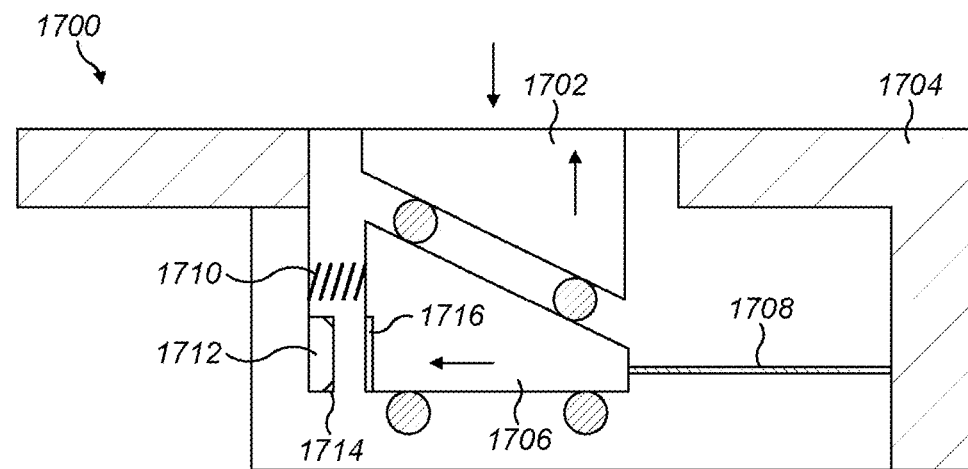
Figure 18A:
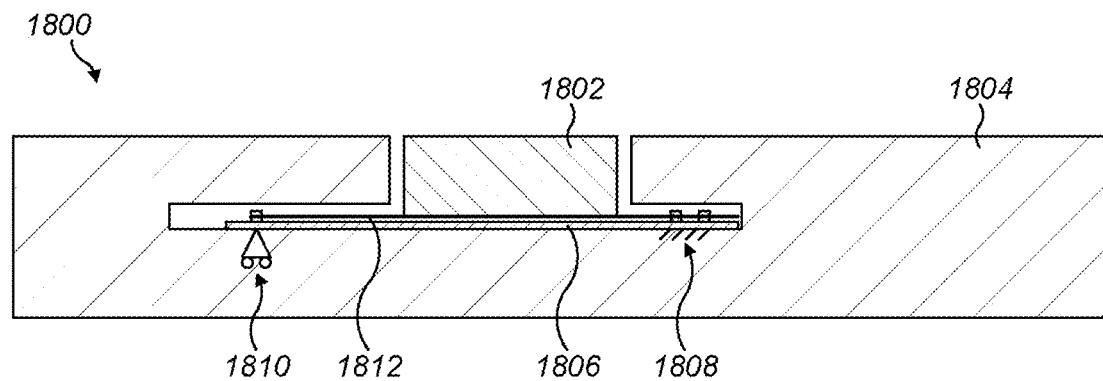
Figure 18B:
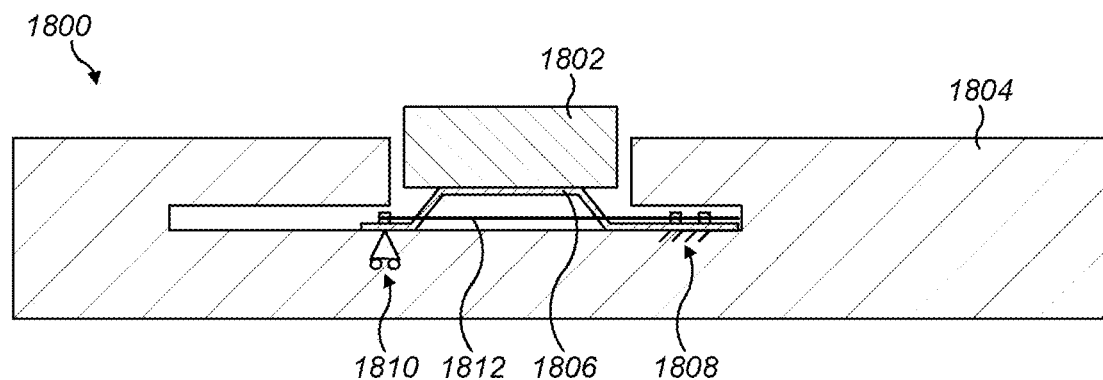
Figure 19:
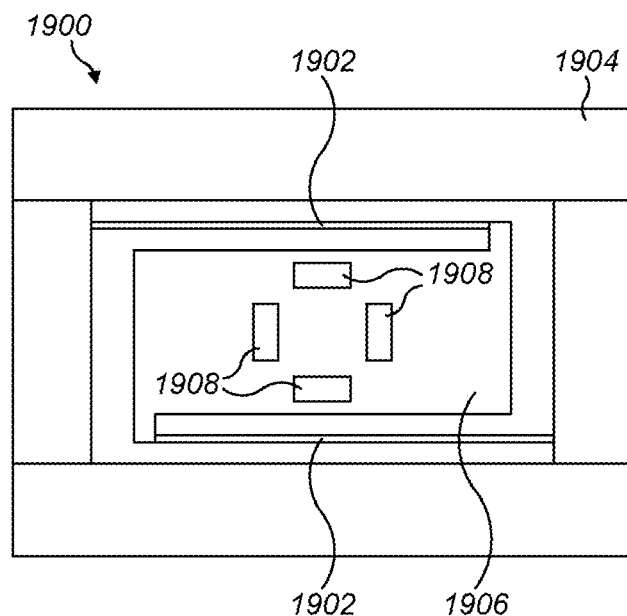
Figure 20:
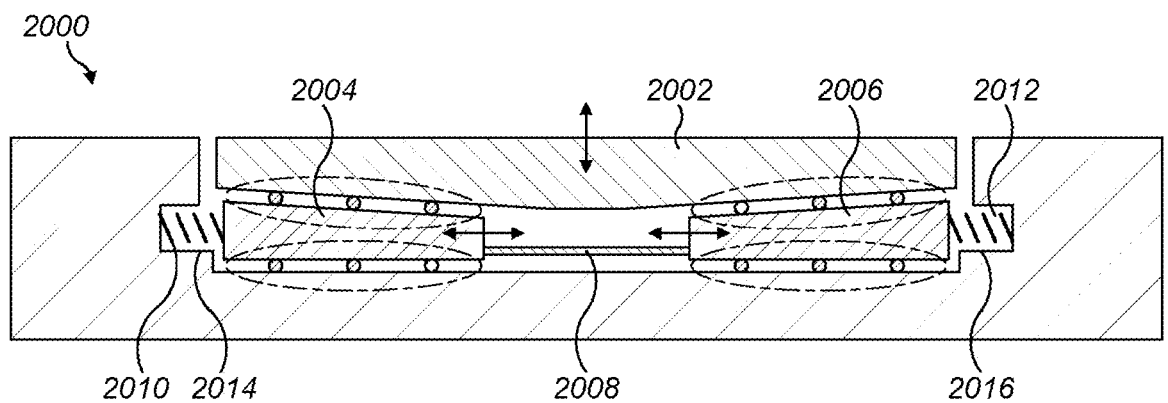
Figure 21A:
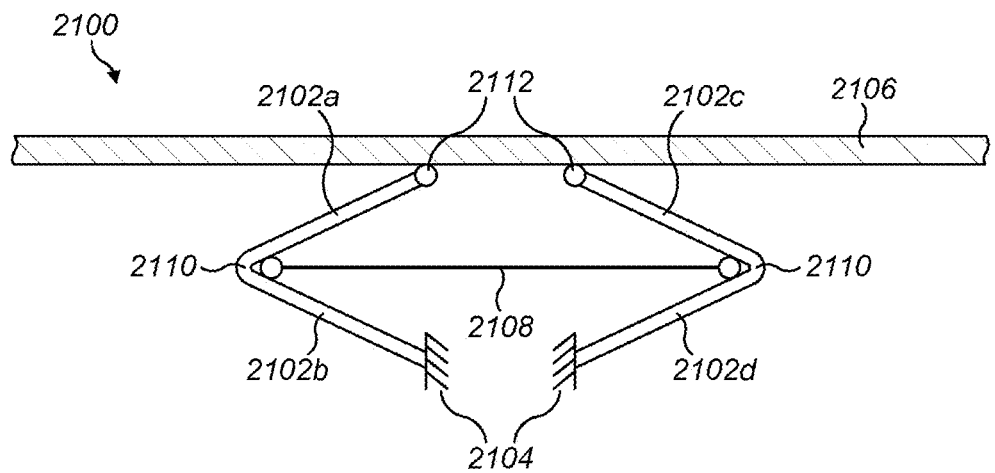
Figure 21B:
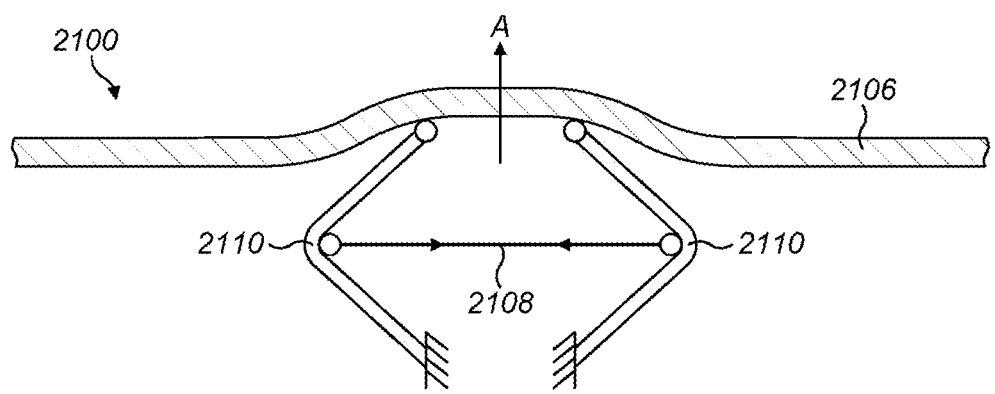
Figure 22:
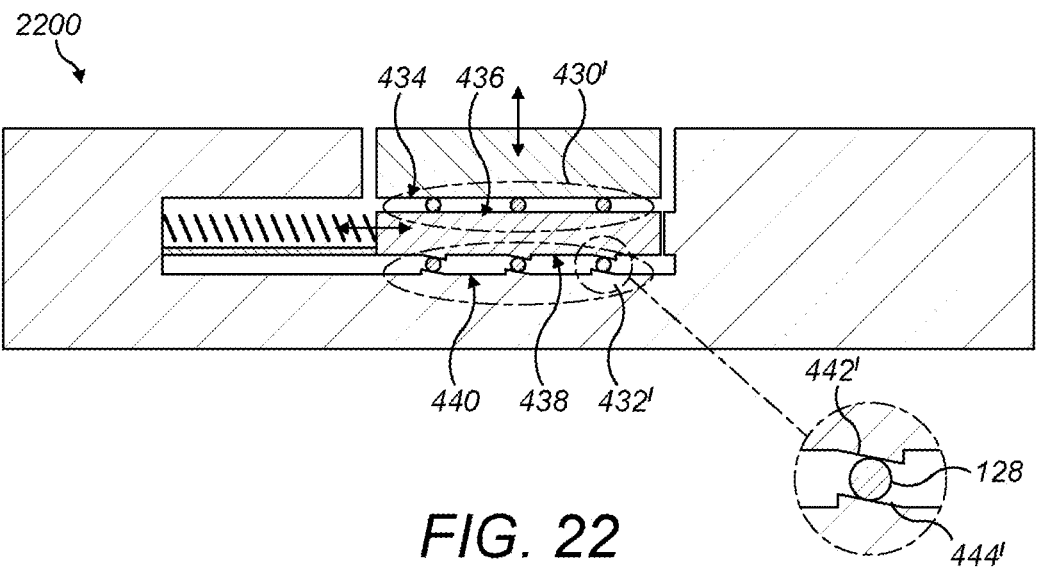
Figure 23A:
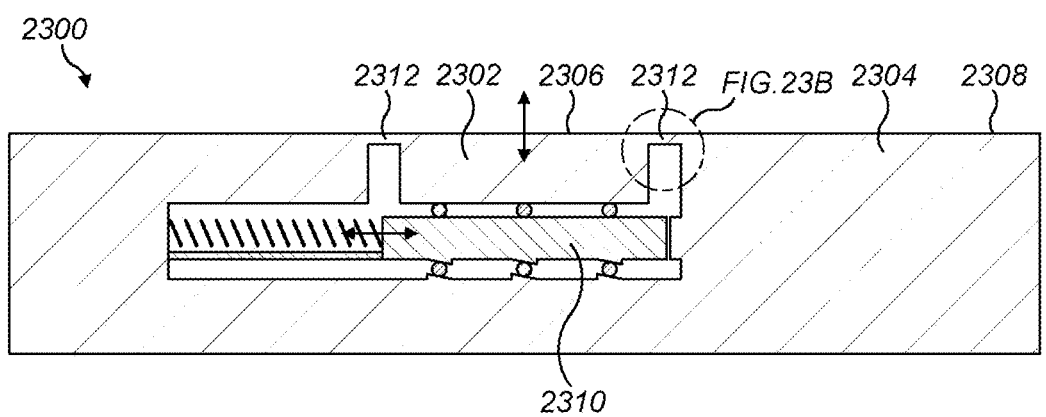
Figure 24:
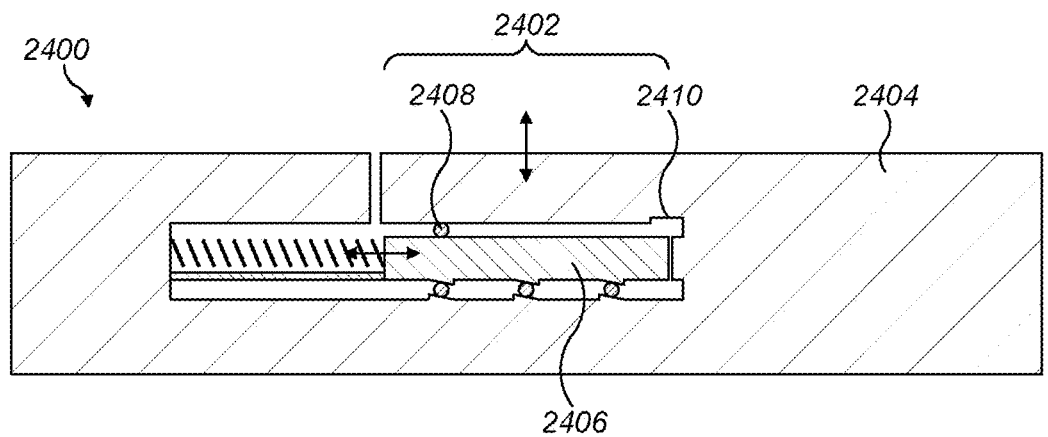
Figure 25:
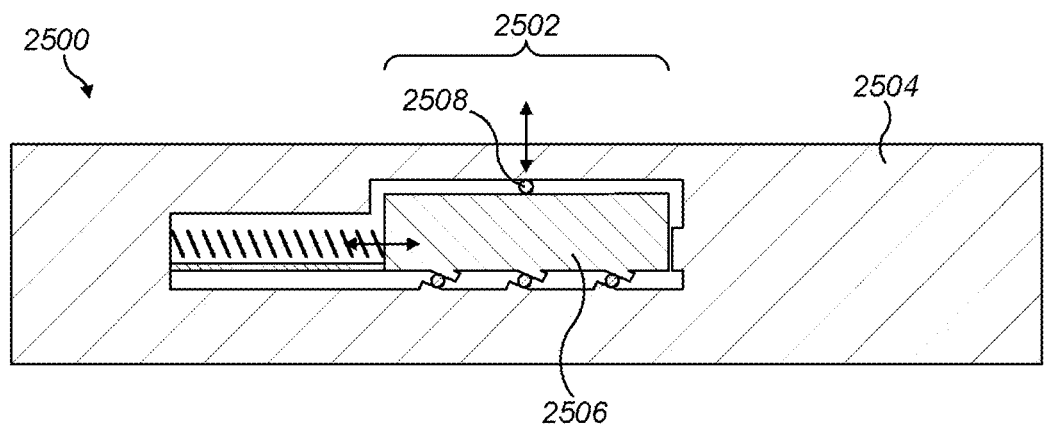
Figure 26:
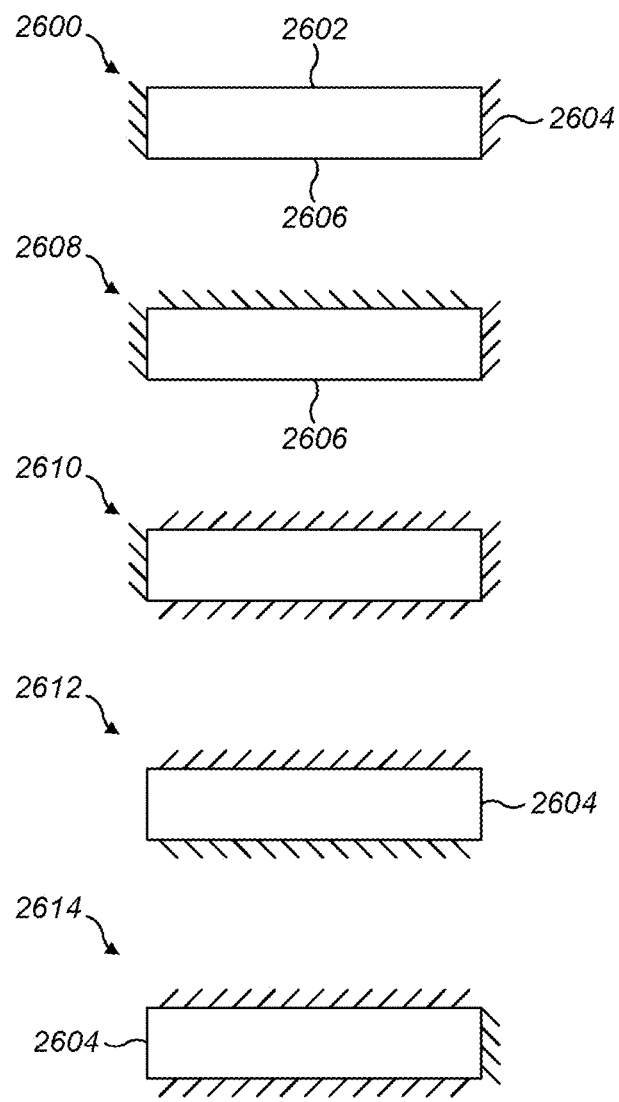
Figure 27A:
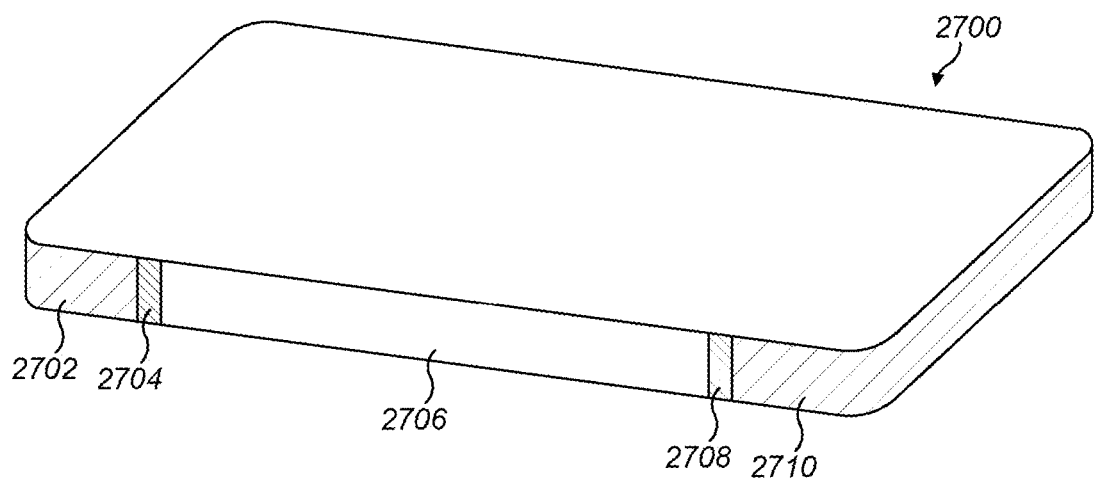
Figure 27B:
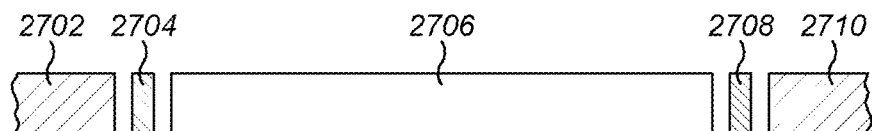
Figure 28A:
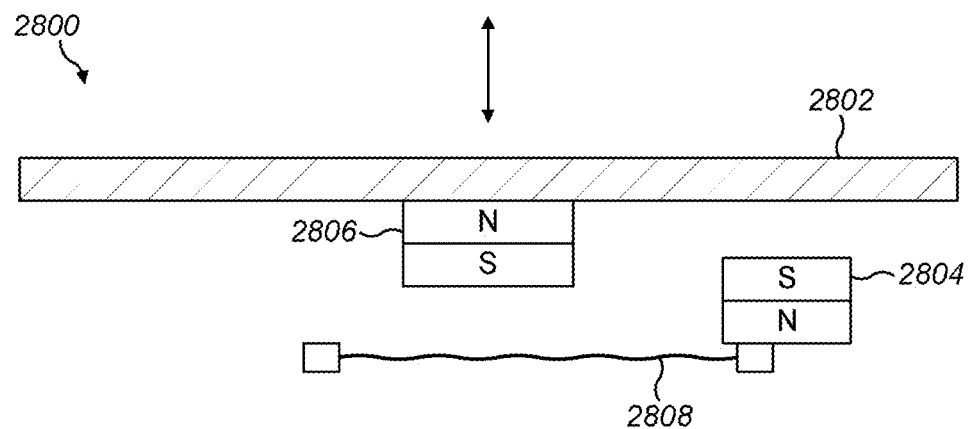
Figure 28B:
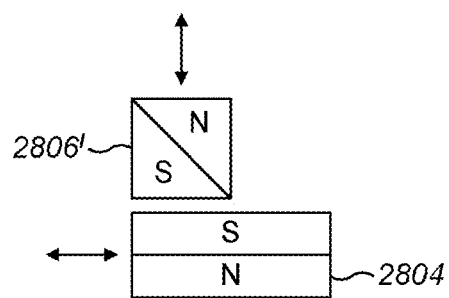
Figure 29A:
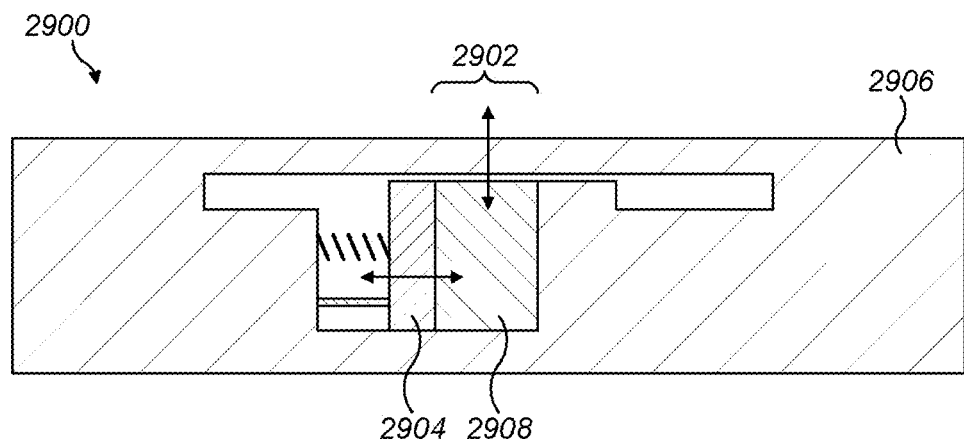
Figure 29B:
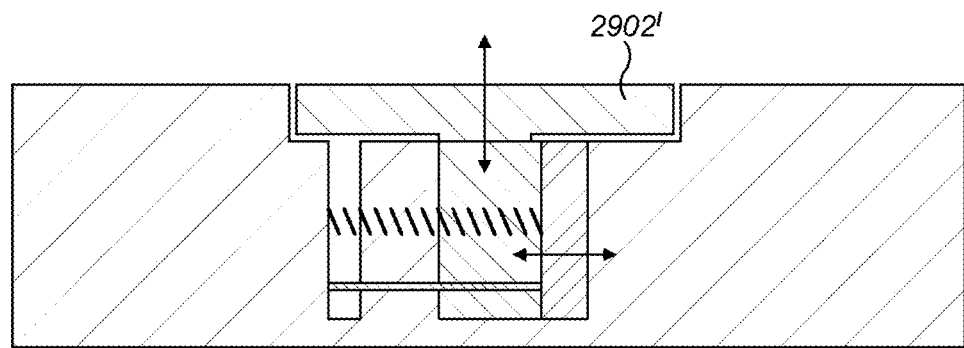
Figure 29C:
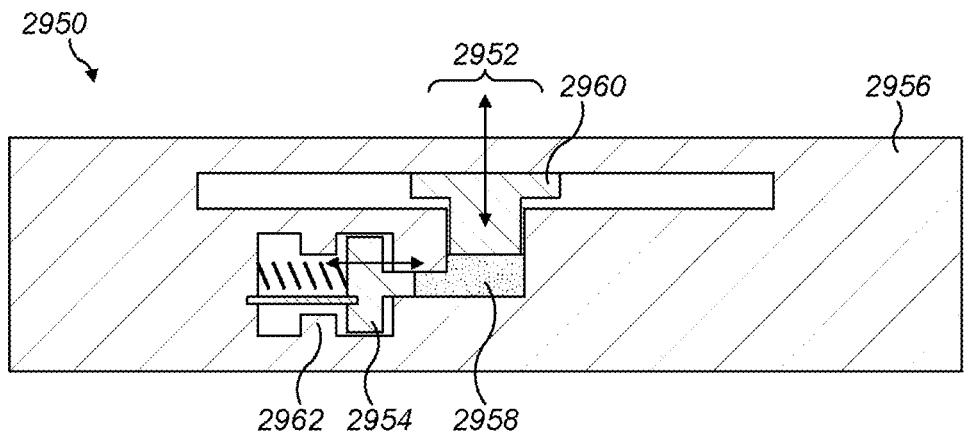
Figure 29D:
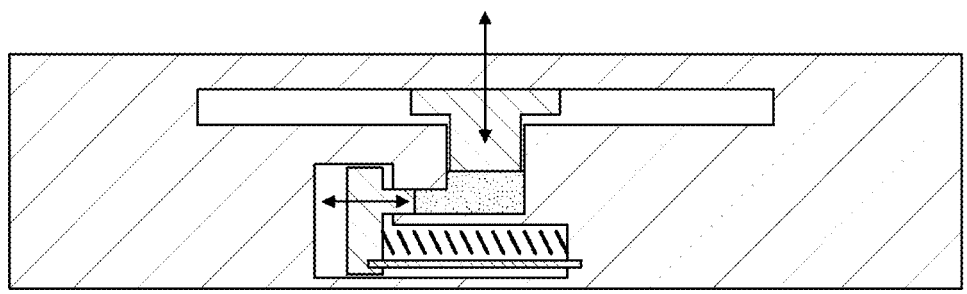
Figure 29E:
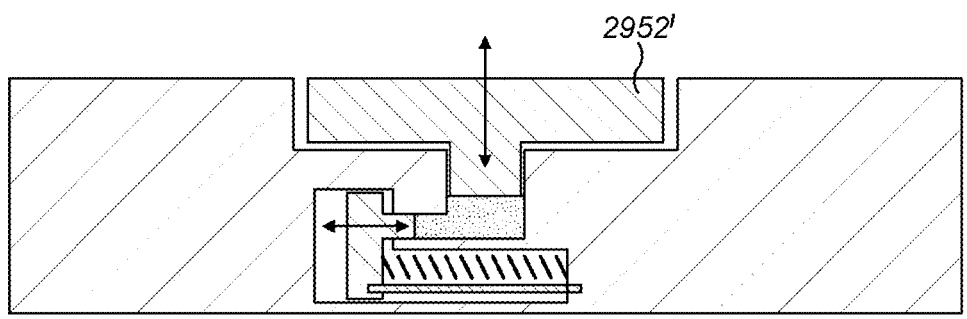
Figure 30A:
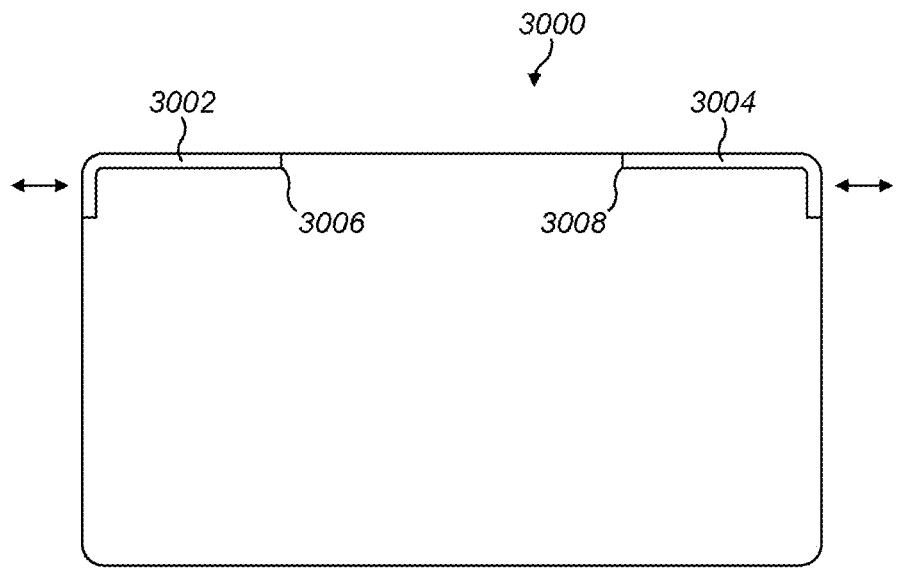
Figure 30B:
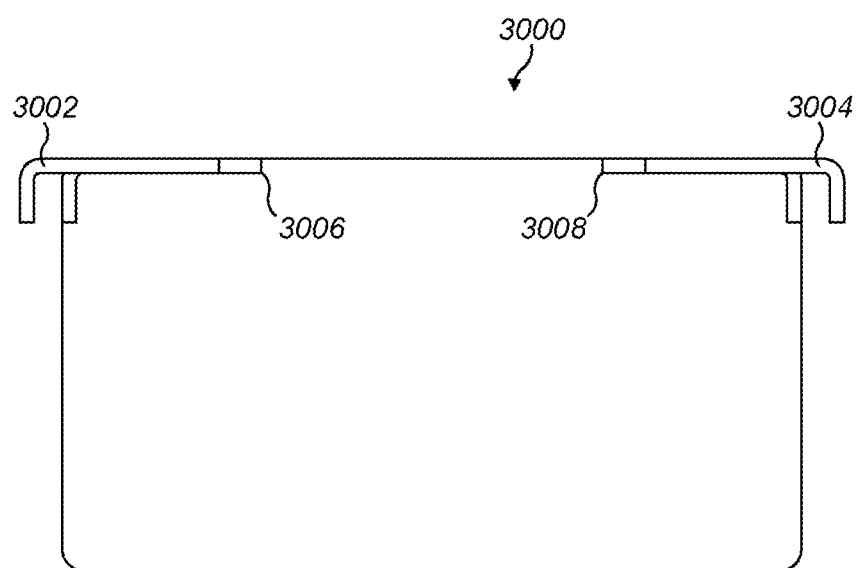
Figure 31A:
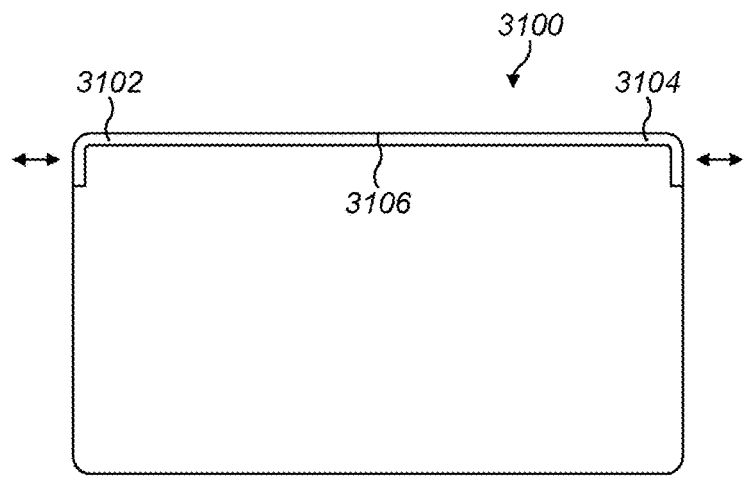
Figure 31B:
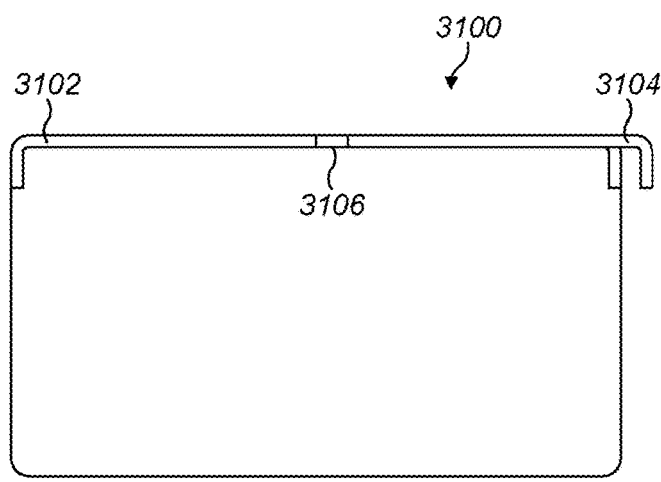
Figure 32:
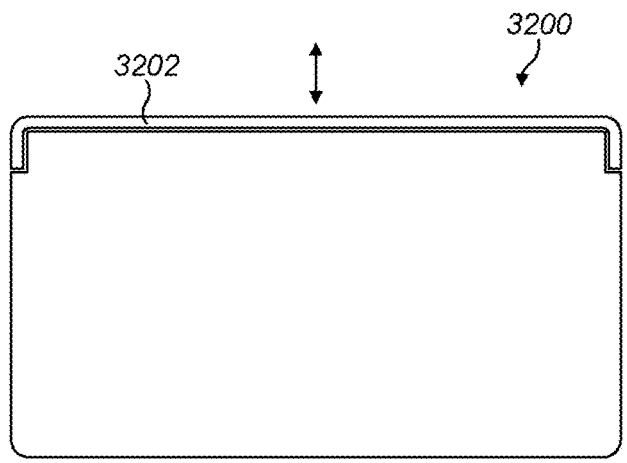
Figure 33A:
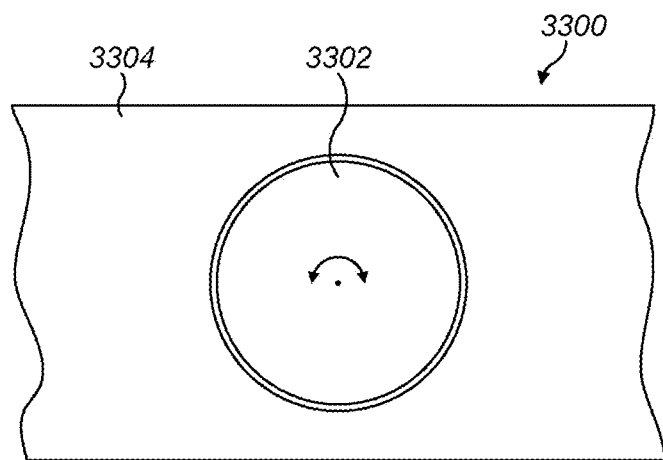
Figure 33B:
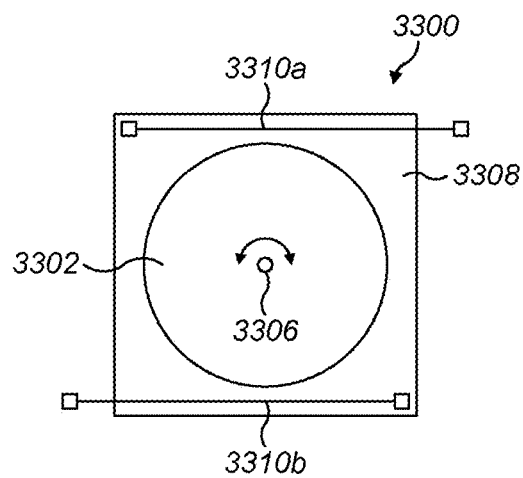
Figure 33C:
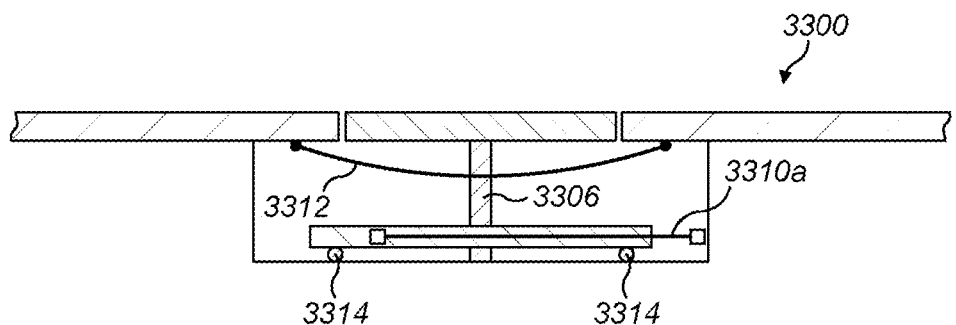

FIGS. 11A and 11B respectively show a plan view and a cross-sectional view of a sealing mechanism for sealing a haptic button assembly, and FIG. 11O shows a cross-sectional view of a modified sealing mechanism;

FIGS. 12A to 12C show cross-sectional views of three mechanisms for sealing a haptic button assembly;

FIGS. 13A and 13B show cross-sectional views of two further mechanisms for sealing a haptic button assembly;

FIG. 14 shows a cross-sectional view of a further mechanism for sealing a haptic button assembly;

FIG. 15 shows a cross-sectional view of an eleventh haptic button assembly and a sealing mechanism;

FIG. 16 shows a cross-sectional view of a twelfth haptic button assembly and a sealing mechanism;

FIG. 16A shows a cross-sectional view of a further haptic button assembly;

FIG. 17 shows a cross-sectional view of a thirteenth haptic button assembly;

FIGS. 18A and 18B respectively show cross-sectional views of a fourteenth haptic button assembly in an equilibrium state and in an activated state;

FIG. 19 shows a plan view of a fifteenth haptic button assembly;

FIG. 20 shows a cross-sectional view of a sixteenth haptic button assembly;

FIGS. 21A and 21B respectively show cross-sectional views of a gapless haptic assembly in an equilibrium state and in an activated state;

FIG. 22 shows a cross-sectional view of a further arrangement of a haptic button assembly;

FIG. 23A shows a cross-sectional view of a gapless haptic assembly;

FIGS. 23B to G show cross-sectional views of a flexible portion of the gapless haptic assembly of FIG. 23A;

FIG. 24 shows a cross-sectional view of a partly gapless haptic assembly;

FIG. 25 shows a cross-sectional view of a gapless haptic assembly;

FIG. 26 shows schematic diagrams of gapless and partly gapless haptic assemblies;

FIG. 27A shows a schematic perspective view of a smartphone, FIG. 27B shows a schematic view of an edge of the smartphone of FIG. 27A, and FIGS. 27C-E show schematic views of the profile of a button portion of the smartphone of FIG. 27A;

FIG. 28A shows a schematic cross-sectional view of a gapless haptic assembly comprising magnets, and FIG. 28B shows an alternative arrangement of the magnets in FIG. 28A;

FIG. 29A shows a cross-sectional view of a gapless haptic assembly comprising a material under compression, and FIG. 29B shows a cross-sectional view of the haptic assembly of FIG. 29A with a gap;

FIG. 29C shows a cross-sectional view of a gapless haptic assembly comprising a piston, FIG. 29D shows an alternative arrangement of the gapless haptic assembly of FIG. 29C, and FIG. 29E shows a cross-sectional view of the haptic assembly of FIG. 29D with a gap;

FIGS. 30A and 30B show schematic plan views of a smartphone comprising a partly gapless haptic assembly in the equilibrium (inactive) and active states respectively;

FIGS. 31A and 31B show schematic plan views of a smartphone comprising an alternative partly gapless haptic assembly in the equilibrium (inactive) and active states respectively;

FIG. 32 shows a schematic plan view of a smartphone comprising a further alternative partly gapless haptic assembly in the active state; and FIG. 33A shows a plan view of a button of a further haptic button assembly, FIG. 33B shows a plan view of the further haptic button assembly and FIG. 33C shows a cross-sectional view of the further haptic button assembly.

Broadly speaking, embodiments of the present techniques provide haptic button assemblies in which the haptic button has a low profile while still providing a satisfying tactile response or sensation to a user. Advantageously, the haptic button assemblies may have a profile that, for example, enables the assembly to be incorporated into the free space along an edge of a portable computing device.

The haptic assemblies may, for example, be arranged to move the button perpendicularly with respect to the edge of the device (instead of laterally along the edge of the device).

It is possible to generate a haptic sensation from a button or movable portion by moving the button in a lateral direction with respect to the contact by the user—see, for example, WO2018/046937 and GB2551657. However, it may be preferable that a haptic button moves in a direction that is normal to the surface of the button and the surface of a device in which the button is incorporated. This is because a disadvantage of a haptic button that moves laterally is that it requires a large gap between the moving button and the edges of the housing which houses the button to allow lateral motion of the button, but the large gap means it is more difficult to make the haptic button water proof and dust proof in an energy efficient manner. Thus, a haptic button which is easier to make water and dust proof is desirable. It is also desirable to provide a haptic button which does not have a large visible gap (e.g. of the order of 250 µm for a laterally moving button) between the button and the housing, as a smaller gap (e.g. of the order of 50 µm or less) is more aesthetically pleasing.

Furthermore, due to the pressures on size and layout associated with many consumer electronics devices such as wearables, watches and mobile phones, it is also desirable that the haptic button assembly has a low profile.

The present techniques provide haptic button assemblies which have both a low profile (such that they may be more readily incorporated into consumer electronics devices such as smartphones), and may be water and dust proof.

Furthermore, the present techniques provide a local haptic sensation caused by a direct impulse, rather than through inertial effects. For example, smartphones comprise inertial haptic actuators—a mass is moved when a haptic effect is required. Movement of the mass causes the whole smartphone to shake or vibrate. Thus, the haptic effect is general and is not localised. The present techniques provide a localised haptic feedback. Further still, the haptic feedback provided by the present techniques may be customisable by a user by modifying software parameters. This allows different types of haptic feedback to be provided for different purposes or to suit different users.

The term "bearing" is used interchangeably herein with the terms "sliding bearing", "plain bearing", "rolling bearing", "ball bearing", "flexure", and "roller bearing". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. The bearing may be provided on, or may comprise, non-linear bearing surfaces. In some embodiments of the present techniques, more than one type of bearing element may be used in combination to provide the bearing functionality. Accordingly, the term "bearing" used herein includes any combination of, for example, plain bearings, ball bearings, roller bearings and flexures. In embodiments, a suspension system may be used to suspend the intermediate moveable element and/or the button within the haptic button assembly and to constrain motion to only the desired motion. For example, a suspension system of the type described in WO2011/104518 may be used. Thus, it will be understood that the term "bearing" used herein also means "suspension system". The bearing may be formed from any suitable material, e.g. ceramic, a metal, a metal alloy, steel, stainless steel, mild steel, bearing bronze, phosphor bronze, plastic, and polytetrafluoroethylene (PTFE). The bearing may be coated with a friction-reducing or low-friction coating such as a lubricant, a dry film lubricant, a diamond-like coating (DLC), a vapour-deposited coating, and hard chrome. The bearing, or a surface that contacts the bearing, may be polished.

Each of the haptic button assemblies described herein may be incorporated into any device in which it may be useful to provide a user of the device with haptic feedback. For example, the haptic button assemblies may be incorporated into an electronic device or a consumer electronics device, such as a computer, laptop, portable computing device, smartphone, computer keyboard, gaming system, portable gaming device, gaming equipment/accessory (e.g. controllers, wearable controllers, etc.), medical device, user input device, etc. It will be understood that this is a non-limiting, non-exhaustive list of possible devices, which may incorporate any of the haptic button assemblies described herein. The haptic button assemblies described herein may be, for example, incorporated into or otherwise provided along an edge of a smartphone or on a surface of a smartphone. In embodiments, the haptic button assemblies described herein may be provided as standalone modules that may be incorporated into an electronic device during manufacture, and may be adapted to suit the device specifications such that it fits into a casing or external surface of the electronic device. In alternative embodiments, some or all of the components of the haptic button assemblies described herein may be integrally formed in an electronic device. For example, the housing, button and/or seal of each haptic button assembly may be part of the electronic device itself. Each haptic button assembly may comprise electrical connections, which may couple the assembly to the device's processor(s), chip(s), motherboard, etc., such that the action of the button of the assembly being pressed may be processed by the device and so that the haptic feedback can be provided.

Figure 1:
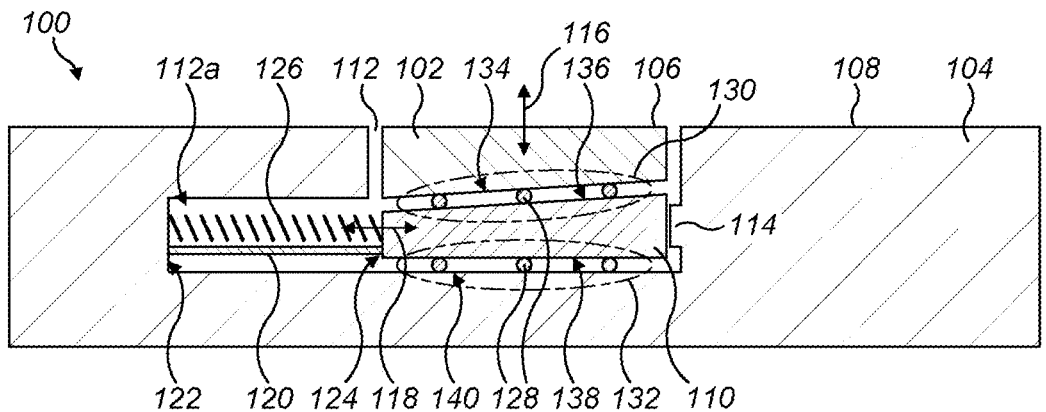
FIG. 1 shows a cross-sectional view of a first arrangement of a haptic button assembly.

Various haptic button assemblies are now described with respect to the Figures. It will be understood that elements or features described with respect to one particular Figure or haptic button assembly may equally apply to any of the Figures or haptic button assemblies described herein. For example, the techniques for sealing a haptic button assembly or the different possible SMA actuator wire arrangements described with respect to particular Figures, may apply equally to any or all of the haptic button assemblies described herein The Intermediate Moveable Element FIG. 1 shows a cross-sectional view of a first arrangement of a haptic button assembly 100. The haptic button assembly 100 comprises a button 102. The button 102 may be pressed by a user to perform a particular operation, such as making a selection, turning a device on/off, entering data (e.g. typing on a keyboard), scrolling, turning a function of the device in which the assembly 100 is located on/off or adjusting the function (e.g. adjusting volume of audio output from the device), etc. Pressing or unpressing (depressing) the button 102 may cause haptic feedback or a haptic sensation to be delivered to the user, so that the user is provided with some sensory feedback (particularly touch-based feedback) to indicate that the operation has been performed.

In many of the arrangements and embodiments described herein, the button 102 may be a surface feature on a device/apparatus that incorporates the haptic button assembly. In this case, the haptic button 102 may not be pressed by a user but may still be able to provide haptic feedback. Instead of a button press triggering haptic feedback, the haptic feedback may be triggered by software in response to another event. For example, if a user makes a selection on a screen of their smartphone, the selection may cause haptic feedback to be triggered, where the feedback is provided by the button or surface feature. (Software-triggered haptic feedback may occur in particular applications, such as in gaming and/or virtual/augmented reality devices). Thus, in many of the arrangements and embodiments described herein, direct pressing of the haptic button 102 may not be required in order for haptic feedback to be delivered. However, in each case, the mechanism to deliver the haptic feedback is broadly the same whether or not button itself is pressed.

In embodiments, such as that shown in FIG. 1, the haptic button assembly 100 may comprise a housing 104 (also referred to herein as "support", "chassis", "casework", and "casing"). The housing 104 may comprise a cavity or recess 112. The button 102 may be provided within the cavity 112 of the housing 104. The button 102 comprises a contact surface 106 (also referred to herein as an outer surface, external surface or upper surface). In embodiments, the button 102 may be arranged within the cavity 112 such that the contact surface 106 is substantially level with/flush with an external surface 108 of the housing 104. However, in embodiments, the button 102 may protrude from the external surface 108 of the housing 104. It will be understood that the housing 104 surrounds and encases the button 102, such that only the contact surface 106 of the button is visible/contactable by a user.

The haptic button assembly 100 may comprise an intermediate, movable element 110, which may be provided within the cavity 112 below the button 102. Button 102 may be arranged to move (when pressed/depressed by a user) in a first direction. The first direction may be a direction that is perpendicular to the external surface 108 of housing 104, as indicated by arrow 116 in FIG. 1. In other words, contact of a user's finger with the contact surface 106 of button 102, for example, may cause the button 102 to move into the housing 104 or further into cavity 112. In particular embodiments, the button 102 may move into the cavity 112 by 100 µm. The haptic button assembly 100 may comprise a sensor (not shown) in the housing 104 below the button and intermediate moveable element 110. The sensor may be a force sensor, for example. Generally speaking, the sensor may be any suitable sensor or mechanism for detecting depression of the button 102 by a user (i.e. detecting that a user has pressed the button 102). The movement of the button 102 into the cavity 112 (as a result of the user pressing the button 102) causes a force to be exerted on the sensor. The sensor may be coupled to control circuitry (not shown), and the sensor may be configured to communicate with the control circuitry when the force on the sensor changes, or when the force on the sensor has been applied for a minimum duration. The detection by the sensor of a user pressing the button causes the haptic feedback to be generated and applied by haptic button assembly 100.

Moveable element 110 may be able to move in a second direction within the cavity 112. The second direction is different to the first direction. The second direction may be a direction that is substantially parallel to the external surface 108 of casing 104, as indicated by arrow 118 in FIG. 1. That is, moveable element 110 may move in a sideways (or lateral) direction within the housing 104 (or within the recess 112 of the housing 104). Thus, the first direction and the second direction may be orthogonal. Movement of the intermediate moveable element 110 in the second direction may cause movement of the button 102 in the first direction. That is, movement of the intermediate moveable element 110 may cause the button 102 to be moved in such away that a haptic effect/sensation is delivered to a user touching the button 102. The concept of moving intermediate moveable element 110 in one direction to cause movement of button 102 in another direction may be implemented in a number of ways.

For example, in embodiments such as that shown in FIG. 1, both the button 102 and the moveable element 110 may be wedge-shaped, and arranged within the cavity 112 such that a wider end of the wedge-shaped button 102 is in proximity to a narrower end of the wedge-shaped moveable element 110. Thus, a narrower end of the wedge-shaped button 102 is in proximity to a wider end of the wedge-shaped moveable element 110. This arrangement of the wedge-shaped button 102 and moveable element 110 means that when the moveable element 110 is caused to move within the casing 104 in the second direction 118, the button 102 will be forced to move in the first direction 116. In this embodiment, the intermediate moveable element 110 is a 'single wedge', as only one surface of the element is sloped/inclined.

The movement of moveable element 110 is now described. The haptic button assembly 100 may comprise at least one shape memory alloy (SMA) actuator wire 120. The at least one SMA actuator wire 120 may be provided within a further cavity 112a in housing 104. The further cavity 112a may be smaller than the cavity 112 but may be large enough for the intermediate moveable element 110 to at least partly fit into. The SMA actuator wire 120 may be coupled at one end 122 to the housing 104 (and specifically to the further cavity 112a) and at another end 124 to the intermediate moveable element 110. Thus, in embodiments, the intermediate movable element 110 may be formed of a material that is suitable for coupling to (e.g. crimping) an SMA actuator wire, such as a suitable metallic material. Alternatively, the intermediate moveable element 110 may be formed of any material, and crimp components may be fixedly attached to the intermediate moveable element 110, to crimp an end of the SMA actuator wire. Generally speaking, a coupling element may be used to couple each SMA actuator wire 120 to the housing 104 (i.e. the static component) and to the intermediate moveable element 110. The coupling element may provide a permanent (i.e. fixed) connection between the SMA wires and the static component or the moveable component. The coupling element may be a crimp connector, a welded component that is welded to each SMA actuator wire to form a weld, or other similar connectors. A coupling element (e.g. crimp connector or welded component) may hold multiple SMA actuator wires or may hold a single SMA actuator wire, as described in United Kingdom Patent Application No. GB1820042.8 to the present applicant.

Thus, each SMA actuator wire may be coupled to the at least one intermediate moveable element via a coupling element. The coupling element may be a crimp connector, a welded component, or a non-fixed connector.

As an alternative to crimping, the ends of each SMA actuator wire 120 may be connected in place using welding (e.g. arc welding, welding using a weld bar, laser/heat-based welding, etc.). During the welding process, care needs to be taken to control the welding so that damage to the SMA actuator wire, e.g. melting or loss of material, is minimised.

The coupling element may alternatively comprise a connector which provides a non-fixed connection between the SMA actuator wire and the intermediate moveable component or static component. Such a non-fixed connector may be in the form of a protruding element such as a hook, dowel pin or similar element around which the SMA wires are looped or similarly held in place. For example, a length of SMA actuator wire may wrap around/be provided around a dowel pin (see e.g. FIG. 9D) on the intermediate moveable element, and the ends of the SMA actuator wire may be attached to the housing via crimps. Alternatively, a length of SMA actuator wire may be attached to the intermediate moveable element and wrap around a pin-like feature or dowel on the static portion/housing.

When a button press is detected by the sensor, this detection is communicated to control circuitry (not shown). The control circuitry may be arranged to control power delivered to the at least one SMA actuator wire 120. Power may be delivered to the at least one SMA actuator wire. When the SMA actuator wire 120 is powered, it becomes hot and contracts. The contraction of the SMA actuator wire 120 causes the intermediate moveable element 110 to move laterally/sideways within the cavity 112, and towards (and in embodiments, at least partly into) the further cavity 112a. In the illustrated arrangement, the intermediate moveable element 110 moves towards the left of the Figure. As the intermediate moveable element 110 moves sideways towards/into the further cavity 112a, the wedge-shape of the moveable element 110 forces the button 102 to move within cavity 112. In the illustrated arrangement, the button 102 moves upwards in/towards the top of the Figure. The intermediate moveable element 110 may cause the button 102 to move by, for example, between 20 µm to 0.5 mm. In embodiments, the button 102 may move by up to 1 mm.

Generally speaking, it will be understood that the button 102 and intermediate moveable element 110 could be shaped such that the button moves into the cavity 112 when the SMA actuator wire 120 is powered and caused to contract. Thus, in each embodiment described herein, the button 102 may move into the cavity in order to deliver haptic feedback. (The types of haptic feedback deliverable when the button moves into the cavity may be the same as or different to the types of feedback deliverable when the button moves outwards of the cavity).

The haptic button assembly 100 may comprise an element which opposes the force of the at least one SMA actuator wire 120. For example, the haptic button assembly 100 may comprise a return spring 126. The return spring 126 may be provided within the further cavity 112a and may be coupled at one end to the housing 104 and at another end to the intermediate moveable element 110. The return spring 126 may be arranged to oppose the contraction of the at least one SMA actuator wire 120 (which caused the moveable element 110 to move in one direction), and thereby move the intermediate moveable element 110 in an opposite direction, i.e. away from the further cavity 112a. In the Figure, the return spring 126 may cause the intermediate moveable element 110 to move to the right when the wire is not being powered and is not being actively heated (i.e. is cooling). The element which opposes the force of the at least one SMA actuator wire 120 may be any suitable resilient biasing element, and it will be understood that the return spring is only one non-limiting example. In embodiments, a further SMA actuator wire may be used to oppose the force of the SMA actuator wire 120. This may be arranged to, on contraction, pull the intermediate moveable element in the opposite direction to the movement caused by the SMA actuator wire 120. The further SMA actuator wire may be provided between the housing 104 and the opposite side of the intermediate moveable element 110 (opposite to the side to which SMA actuator wire 120 is attached). In this embodiment, the at least one SMA actuator wire 120 and the return spring 126 may be considered to form an actuator which causes movement of the intermediate moveable element 110 (also referred to herein as a "moving portion") in the housing 104 (also referred to herein as a "static portion").

In alternative embodiments, a return spring or further SMA actuator wire may not be used. Instead, the force of a user's finger on the button 102 may be sufficient to oppose the contraction of the at least one SMA actuator wire 120 and thereby move the intermediate moveable element away from the further cavity 112a.

In embodiments, a system of opposing SMA actuator wires may be used to customise the haptic feedback delivered when a user presses the button 102. For example, the system of opposing wires may allow different types of haptic feedback to be provided depending on what the sensor of the assembly 100 detects/senses. For example, where the sensor is a force sensor, the haptic feedback may be customised based on the magnitude of the force detected by the sensor—a high contact force may cause a particular type of haptic feedback to be delivered while a low contact force may cause a different type of haptic feedback to be delivered. The feedback delivered may be adjusted by having an arrangement of opposing SMA actuator wires that allows the movement (e.g. speed, direction, etc.) of the intermediate moveable element 110 to be finely controlled. In embodiments, the SMA actuator wire(s) may themselves be part of the sensor mechanism of the assembly, by measuring the resistance of the SMA actuator wires to determine e.g. the contact force.

The haptic button assembly 100 may comprise one or more bearings to reduce friction between the moving parts of the assembly. For example, the haptic button assembly 100 may comprise a first bearing 130 between the button 102 and the intermediate moveable element 110. The first bearing 130 may comprise one or more ball bearings 128 that are provided between surface 134 of the button 102 and surface 136 of the intermediate moveable element 110. Surfaces 134 and 136 are ramped (inclined) so that when the SMA actuator wire 120 contracts and moves the moveable element laterally, the button 102 is forced to move within cavity 112 (i.e. orthogonal to the movement of the moveable element 110). Surfaces 134 and 136 are inclined by the same angle and in the same direction. Specifically, the direction in which the surfaces 134, 136 are inclined is chosen so that movement of the intermediate moveable element 110 towards the further cavity 112a pushes the button 102 upwards in the cavity 112, i.e. such that contact surface 106 may protrude from the housing 104 (and may not be flush with surface 108 of the housing 104). First bearing 130 may comprise the inclined (ramped) mating surfaces 134 and 136 and one or more ball bearings 128. For example, bearing 130 may comprise three ball bearings 128, but this is a non-limiting example. The haptic button assembly 100 may comprise a second bearing 132 between the intermediate moveable element 110 and a surface of the housing 104 (i.e. a surface of the cavity 112). The second bearing 132 may comprise one or more ball bearings 128 provided between surface 138 of the intermediate moveable element 110 and surface 140 of the housing 104 (i.e. a surface of the cavity 112), which may facilitate the lateral movement of the movable element 110. The horizontal movement of the movable element 110 causes the button 102 to move up and down (as indicated by the double-headed arrows) to provide the tactile effect to the user's finger.

The haptic button assembly 100 may comprise an endstop 114 in cavity 112. The endstop 114 may be formed as part of the housing 104 or cavity 112, or may be a separate element that is provided in cavity 112. The endstop 114 may be provided at a location in the cavity 112 to restrict movement of the intermediate moveable element 110. Generally speaking, if SMA actuator wire is stretched too far (i.e. a certain tension is exceeded), the SMA actuator wire may weaken or become damaged, or even break. The force of the return spring 126 on the intermediate moveable element 110 may cause the SMA actuator wire 120 to become overstretched. Therefore, the endstop 114 may restrict the movement of the intermediate moveable element 110 so that the at least one SMA actuator wire 120 does not overstretch. Similarly, a force applied to the button surface by the user's finger may cause the wire to overstretch if there is no endstop.

Accordingly, the present techniques provide a haptic button assembly comprising: a housing comprising a cavity; a button provided within the cavity and moveable along a first axis within the cavity; at least one intermediate moveable element provided within the cavity in contact with the button and moveable in a plane defined by the first axis and a second axis, the second axis being perpendicular to the first axis, and arranged to drive movement of the button along the first axis; and at least one shape memory alloy (SMA) actuator wire coupled to the at least one intermediate moveable element and arranged to, on contraction, move the intermediate moveable element in the plane.

Figure 2:
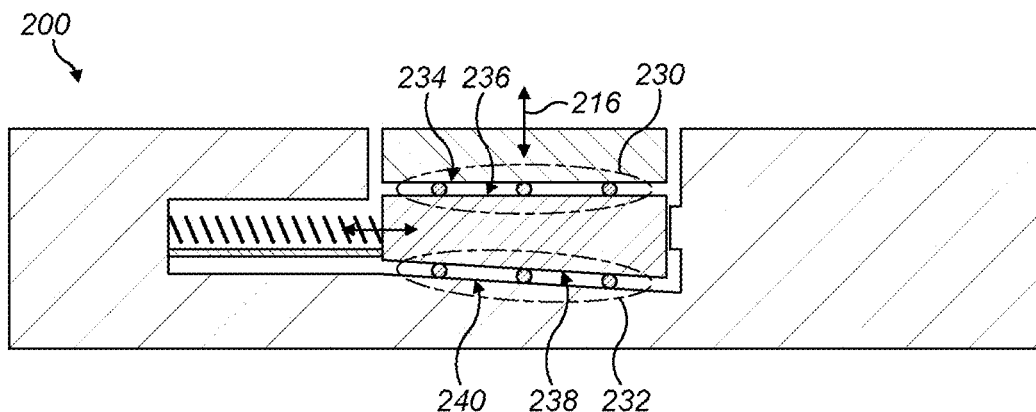
FIG. 2 shows a cross-sectional view of a second arrangement of a haptic button assembly.

FIG. 2 shows a cross-sectional view of a second arrangement of a haptic button assembly 200. The haptic button assembly 200 in FIG. 2 is similar to the arrangement shown in FIG. 1, and therefore, for the sake of conciseness, like features are not described. In haptic button assembly 100, both the button 102 and the intermediate moveable element 110 are wedge-shaped. Specifically, the mating surfaces 134 and 136 are inclined (ramped). In haptic button assembly 200, surfaces 234 and 236 are not inclined/ramped. In this embodiment, the intermediate moveable element 210 is a 'single wedge', as only one surface of the element is sloped/inclined. The haptic assembly 200 may comprise a first bearing 230 between the button and the intermediate moveable element. The first bearing 230 may comprise one or more ball bearings that are provided between the surfaces 234 and 236 of the button and intermediate moveable element respectively. For example, the first bearing 230 may comprise three ball bearings, but this is a non-limiting example.

In haptic button assembly 100, surfaces 138 and 140 of the intermediate moveable element 110 and the housing 104 respectively are substantially flat (i.e. are not inclined or ramped). In haptic button assembly 200, surface 238 of the intermediate moveable element is ramped/inclined, and surface 240 of the housing/cavity is also ramped/inclined. The surfaces 238 and 240 are inclined by the same angle and in the same direction, such that the moveable element may, when actuated, slide or move along the surface 240 and in doing so, push the button upwards in the cavity such that the contact surface of the button protrudes from the housing. As mentioned earlier, in embodiments, the button may move into the cavity when delivering haptic feedback—in this case, the direction of the ramps/inclined surfaces may be reversed. The haptic button assembly 200 may comprise a second bearing 232 between the intermediate moveable element and a surface of the housing/surface of the cavity. The second bearing 232 may comprise one or more ball bearings provided between surface 238 of the intermediate moveable element and surface 240 of the housing/cavity, which may facilitate the movement of the intermediate moveable element. The bearing 232 may comprise three ball bearings, for example. The second bearing 232 may comprise the ramped/inclined surfaces 238, 240. In this arrangement, when the at least one SMA actuator wire contracts (as described above with reference to FIG. 1), the intermediate moveable element may move laterally (e.g. in the direction of the force exerted by the at least one SMA actuator wire on the moveable element) and in a substantially perpendicular or orthogonal direction. As the moveable element moves along the ramp provided by surface 240 of the cavity, the moveable element causes the button to move within the cavity (as indicated by arrow 216).

Figure 3:
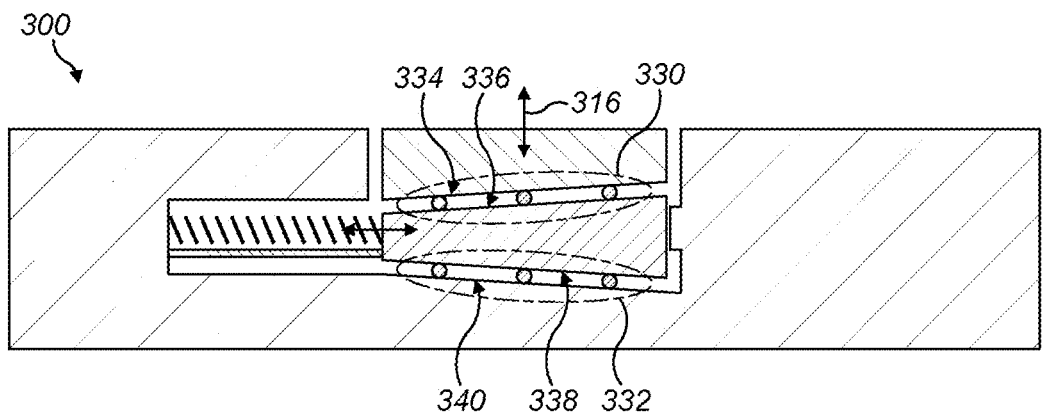
FIG. 3 shows a cross-sectional view of a third arrangement of a haptic button assembly.

FIG. 3 shows a cross-sectional view of a third arrangement of a haptic button assembly 300. The haptic button assembly 300 in FIG. 1 is similar to the arrangement shown in FIG. 1 and therefore, for the sake of conciseness, like features are not described. The haptic button assembly 300 combines features of assemblies 100 and 200. Specifically, both the button and the intermediate moveable element are wedge-shaped in haptic button assembly 300. The haptic button assembly 300 may comprise one or more bearings to reduce friction between the moving parts of the assembly. For example, the haptic button assembly 300 may comprise a first bearing 330 between the button and the intermediate moveable element. The first bearing 330 may comprise one or more ball bearings that are provided between surface 334 of the button and surface 336 of the intermediate moveable element. Surfaces 334 and 336 are ramped/inclined so that when the SMA actuator wire contracts and moves the moveable element in the direction of the force applied by the SMA actuator wire, the button is forced to move within the cavity (i.e. substantially orthogonal to the movement of the moveable element). Surfaces 334 and 336 are inclined by the same angle and in the same direction. Specifically, the direction in which the surfaces 334 and 336 are inclined is chosen so that movement of the intermediate moveable element towards the further cavity 112a pushes the button upwards in the cavity, such that the contact surface of the button may protrude from the housing. Thus, this is an example of the intermediate moveable element being a 'double wedge', as two surfaces of the element are sloped/inclined.

The haptic button assembly 300 may comprise a second bearing 332. In haptic button assembly 300, surface 338 of the intermediate moveable element is ramped/inclined, and surface 340 of the housing/cavity is also ramped/inclined. The surfaces 338, 340 are inclined by the same angle and in the same direction, such that the moveable element may, when actuated, slide or move along the surface 340 and in doing so, push the button upwards in the cavity such that the contact surface of the button protrudes from the housing. The second bearing 332 of the assembly 300 may be provided between the intermediate moveable element and a surface of the housing/cavity. The second bearing 332 may comprise one or more ball bearings provided between surface 338 of the intermediate moveable element and surface 340 of the housing/cavity, which may facilitate the movement of the intermediate moveable element. The second bearing 332 may comprise three ball bearings, for example. The second bearing 332 may comprise the inclined/ramped surfaces 338, 340. The direction in which surfaces 334, 336 are inclined is opposite to the direction in which surfaces 338, 340 are inclined. The angles or gradients of the pairs of inclined surfaces 334, 336 and 338, 340 may be the same or different—however, the angles/gradients of the surfaces in a pair of inclined surfaces need to be the same. The gradients of the pairs of inclined surfaces/the bearing surfaces may be linear or non-linear. In other words, the bearing surfaces may have a constant gradient or a non-linear gradient. Thus, in embodiments, the at least one ramp/bearing surface may have a constant gradient, or may have a variable, non-constant gradient (which follows any non-linear equation). Thus, in this arrangement, when the at least one SMA actuator wire contracts (as described above with reference to FIG. 1), the moveable element may move laterally—causing the button to move upwards as in FIG. 1—and in a substantially perpendicular or orthogonal direction—causing the button to move upwards as in FIG. 2. Thus, the arrangement of FIG. 3 combines two techniques to move the button and deliver a haptic sensation.

Figure 4:
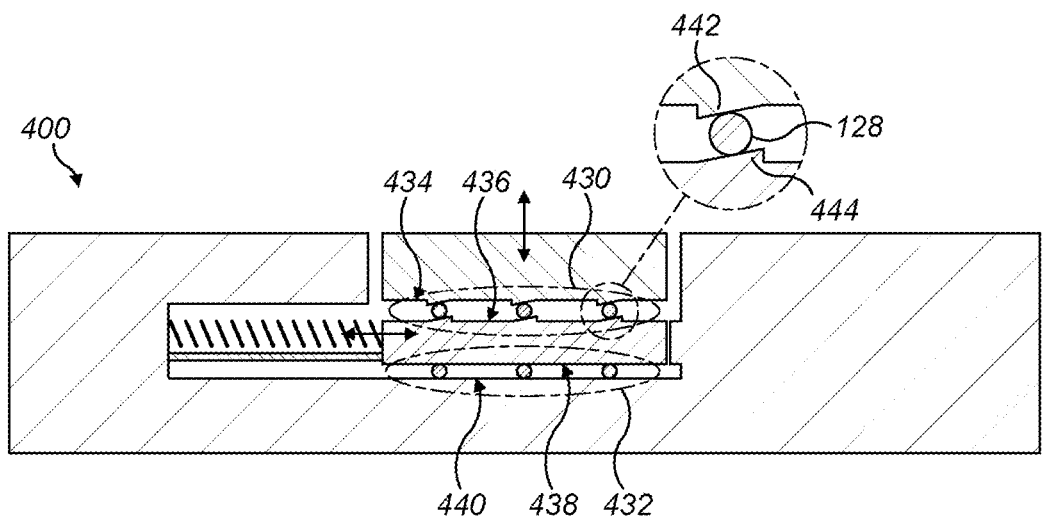
FIG. 4 shows a cross-sectional view of a fourth arrangement of a haptic button assembly.

FIG. 4 shows a cross-sectional view of a fourth arrangement of a haptic button assembly 400. The haptic button assembly 400 in FIG. 4 is similar to the arrangement shown in FIG. 1 and therefore, for the sake of conciseness, like features are not described. In haptic button assembly 100, both the button 102 and the intermediate moveable element 110 are wedge-shaped. Specifically, the mating surfaces 134 and 136 are inclined/ramped. In haptic button assembly 400, surfaces 434 and 436 are not entirely inclined/ramped across their full extent. Instead, surfaces 434 and 436 are locally ramped. Surface 434 of the button comprises one or more localised ramps 442 (as shown more clearly in the inset close-up view of the assembly). Surface 436 of the intermediate moveable element comprises one or more localised ramps 444 (as shown more clearly in the inset close-up view of the assembly). The localised ramps 442 and 444 are co-located in pairs. In other words, a localised ramp 442 of the button is in close proximity to a corresponding localised ramp 444 of the intermediate moveable element. The localised ramps 442 and 444 are inclined by the same angle and in the same direction. Where there is more than one pair of localised ramps, all of the ramps may be inclined by the same angle and in the same direction. The direction in which the localised ramps 442 and 444 are inclined is chosen so that the movement of the intermediate moveable element towards the further cavity pushes the button upwards in the cavity, i.e. such that the contact surface of the button may protrude from the housing. (It can be seen that the direction of the localised ramps is the same as the direction of the inclined surfaces 134, 136 in FIG. 1). In the illustrated example, there are three pairs of localised ramps, but it will be understood that this is a non-limiting example. An advantage of the localised ramps 442, 444 is that they may enable the overall height of the haptic button assembly to be reduced relative to, for example, the arrangement shown in FIG. 1, as the surfaces 434, 436 are not ramped across their whole length. In this embodiment, the intermediate moveable element may be considered a 'single wedge', as only one surface of the element comprises the localised ramps.

The haptic button assembly 400 may comprise a first bearing 430 between the button and the intermediate moveable element. The first bearing 430 may comprise one or more ball bearings 128 that are provided between surface 434 of the button and surface 436 of the intermediate moveable element. At least one ball bearing 128 may be provided between the or each pair of localised ramps 442, 444. As shown in FIG. 4, a ball bearing 128 is provided between each of the three pairs of localised ramps. However, it will be understood that more than one ball bearing 128 may be provided on each ramp. For example, in embodiments there may be three ball bearings on each localised ramp 442, 444. The number of ball bearings per localised ramp may depend on whether there are other ways of constraining the motion of the intermediate moveable element and the button (e.g. additional wall contacts or end stops). The first bearing 430 may comprise one or more localised ramps 442, 444, and one or more ball bearings 128.

The haptic button assembly 400 may comprise a second bearing 432 between the intermediate moveable element and a surface of the housing/cavity. The second bearing 432 may comprise one or more ball bearings provided between surface 438 of the intermediate moveable element and surface 440 of the housing (i.e. a surface of the cavity), which may facilitate the lateral movement of the movable element.

It will be understood that the localised ramps shown in FIG. 4 could be incorporated into any of the arrangements shown in FIGS. 1 to 3, or indeed, any of the embodiments described herein. Generally speaking, the localised ramps may be provided between the button and the intermediate moveable element, and/or between the intermediate moveable element and the housing. This may amplify the amount by which the button is moved when the intermediate moveable element is actuated. The direction and inclination angle of the localised ramps may be chosen to suit each arrangement.

FIG. 22 shows a cross-sectional view of an alternative arrangement of a haptic button assembly 2200. The haptic button assembly 2200 is similar to the arrangement shown in FIG. 4 and therefore, for the sake of conciseness, like features are not described. In FIG. 22, the location of the localised ramps is changed relative to FIG. 4. In FIG. 4, surfaces 434 and 436 are locally ramped. In comparison, in FIG. 22, surfaces 438 and 440 are locally ramped and surfaces 434 and 436 are not. Surface 438 of the intermediate moveable element comprises one or more localised ramps 442' (as shown more clearly in the inset close-up view of the assembly). Surface 440 of the housing (i.e. a surface of the cavity), comprises one or more localised ramps 444' (as shown more clearly in the inset close-up view of the assembly). The localised ramps 442' and 444' are co-located in pairs. In other words, a localised ramp 442' of the intermediate moveable element is in close proximity to a corresponding localised ramp 444' of the housing. The localised ramps 442' and 444' are inclined by the same angle and in the same direction. Where there is more than one pair of localised ramps, all of the ramps may be inclined by the same angle and in the same direction. The direction in which the localised ramps 442' and 444' are inclined is chosen so that the movement of the intermediate moveable element towards the further cavity pushes the button upwards in the cavity, i.e. such that the contact surface of the button may protrude from the housing. However, it will be understood that if the direction of incline of the localised ramps are reversed, the button could move into the cavity/housing. In the illustrated example, there are three pairs of localised ramps, but it will be understood that this is a non-limiting example. An advantage of the localised ramps 442', 444' is that they may enable the overall height of the haptic button assembly to be reduced relative to, for example, the arrangement shown in FIG. 1, as the surfaces 438, 440 are not ramped across their whole length. In this embodiment, the intermediate moveable element may be considered a 'single wedge', as only one surface of the element comprises the localised ramps.

An advantage of this embodiment relative to that shown in FIG. 4 is simplified manufacturing. In the case of smartphones, typically the button may be manufactured and inserted into a smartphone handset by one manufacturer, and the haptic button assembly may be inserted into the smartphone handset by another manufacturer. In the embodiments shown in FIGS. 1, 3, and 4 to 6, for example, the button may need to be specially designed, shaped or milled, either to have inclined surfaces or localised ramps. However, the embodiment shown in FIG. 22 may simplify the manufacturing process as the button does not need to be specially designed. Instead, the intermediate moveable element and the housing are shaped to comprise the localised ramps, but these are typically manufactured by the same manufacturer. This may mean that any button can be used alongside the haptic button assembly 2200, which simplifies the design of the haptic button assembly and removes any requirement for the manufacturer of the smartphone handset to shape the handset in a particular way or provide a particular type of button.

FIG. 22 shows a haptic button assembly 2200 in which there is a gap between the button and the housing. In this case, as described herein, it may be necessary to incorporate a sealing mechanism to prevent or minimise liquid and/or dirt ingress into the assembly via the gap. However, it will be understood that the haptic button assembly 2200 may be arranged as a gapless haptic assembly, i.e. one in which there is no gap between the button and the housing. For example, the button (i.e. the element which is used to deliver haptic feedback) may be integrated into the housing, as shown in FIG. 25.

The haptic button assembly 2200 may comprise a first bearing 430' between the button and the intermediate moveable element. The first bearing 430' may comprise one or more ball bearings 128 that are provided between surface 434 of the button and surface 436 of the intermediate moveable element, which may facilitate the lateral movement of the movable element.

The haptic button assembly 2200 may comprise a second bearing 432' between the intermediate moveable element and a surface of the housing/cavity. The second bearing 432' may comprise one or more ball bearings 128 that are provided between surface 438 of the intermediate moveable element and surface 440 of the housing (i.e. a surface of the cavity). A ball bearing 128 may be provided between the or each pair of localised ramps 442', 444'. As shown in FIG. 22, a ball bearing 128 is provided between each of the three pairs of localised ramps. The second bearing 432' may comprise one or more localised ramps 442', 444', and one or more ball bearings 128.

It will be understood that the localised ramps shown in FIG. 22 could be incorporated into any of the arrangements shown in FIGS. 1 to 3, or indeed, any of the embodiments described herein. Furthermore, the localised ramps shown in FIG. 22 could be used in addition to or instead of the localised ramps of the arrangements of FIGS. 4 to 6. Generally speaking, the localised ramps may be provided between the button and the intermediate moveable element, and/or between the intermediate moveable element and the housing. This may amplify the amount by which the button is moved when the intermediate moveable element is actuated. The direction and inclination angle of the localised ramps may be chosen to suit each arrangement.

Thus, in embodiments, the haptic button assembly may further comprise a bearing provided between the intermediate moveable element and a base of the cavity and arranged to bear movement of the intermediate moveable element along the second axis. The second bearing of the haptic button assembly may comprise at least one ramp and at least one ball bearing arranged to roll along the at least one ramp. The at least one ramp may be provided by an inclined surface of the intermediate moveable element and/or a base surface of the cavity. The at least one ramp may be a localised ramp provided on a surface of the intermediate moveable element and/or on the base surface of the cavity.

Figure 7:
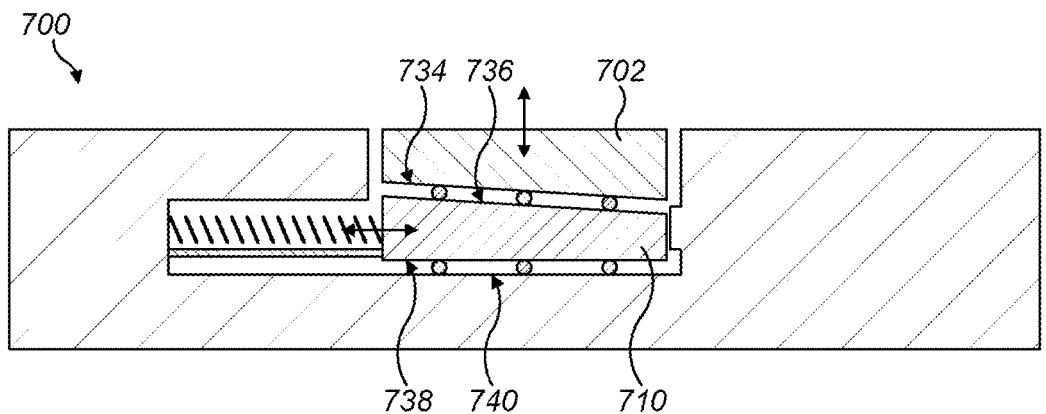
FIG. 7 shows a cross-sectional view of a seventh arrangement of a haptic button assembly.

Turning now to FIG. 7, this shows a cross-sectional view of a seventh arrangement of a haptic button assembly 700. The haptic button assembly 700 is similar to the arrangement shown in FIG. 1 and therefore, for the sake of conciseness, like features are not described. In haptic button assembly 700, button 702 is wedge-shaped and intermediate moveable element 710 is also wedge-shaped. The button 702 and intermediate moveable element 710 are arranged within the cavity such that a wider end of the wedge-shaped button 702 is in proximity to a narrower end of the wedge-shaped moveable element 710, and a narrower end of the wedge-shaped button 702 is in proximity to a wider end of the wedge-shaped moveable element 710. In FIG. 1, movement of the intermediate moveable element 710 towards/into the further cavity 112a caused the button 102 to be pushed upwards in the cavity 112 such that the button 102 may protrude from the housing 108. In contrast, the haptic button assembly causes the button 702 to move downwards, i.e. further down into the cavity when the moveable element 710 moves into/towards the further cavity. This is achieved by changing (reversing) the direction of the inclined surfaces relative to the arrangement of FIG. 1. Specifically, surface 734 of the button 702 and surface 736 of the intermediate moveable element 710 are inclined in the opposite direction to surfaces 134 and 136 of FIG. 1. Thus, movement of the intermediate moveable element 710 towards the further cavity enables the button 702 to drop or move downwards in the cavity (i.e. move towards a base of the cavity). In this embodiment, the intermediate moveable element 710 may be considered a 'single wedge', as only one surface of the element is inclined/sloped.

An advantage of the arrangement of FIG. 7 may be that the motion of the button 702 into the cavity is assisted by any pressure that a user applies to the button 702 (rather than resisting the motion when the button moves upwards). Furthermore, the effect of the button dropping away from a user's finger may be another type of haptic feedback. It also means that if the button is prevented from moving, the wire will not reach very high tensions and so run the risk of being damaged. For example, in FIG. 1, if the button 102 were prevented from moving upwards/vertically/out of the cavity (by e.g. a user pushing down on the button with excessive force), the SMA actuator wire will not be able to contract even though it is being powered—this may cause the SMA actuator wire to reach a high tension that may lead to damage. However, in FIG. 7, if the button 702 were prevented from moving, the intermediate moveable element 710 is still able to move as the SMA actuator wire contracts, thereby avoiding potential damage to the wire.

It will be understood that the "reverse wedge" arrangement shown in FIG. 7 may be combined with any of the techniques described with reference to any of the preceding arrangements of FIGS. 1 to 6.

Figure 8:
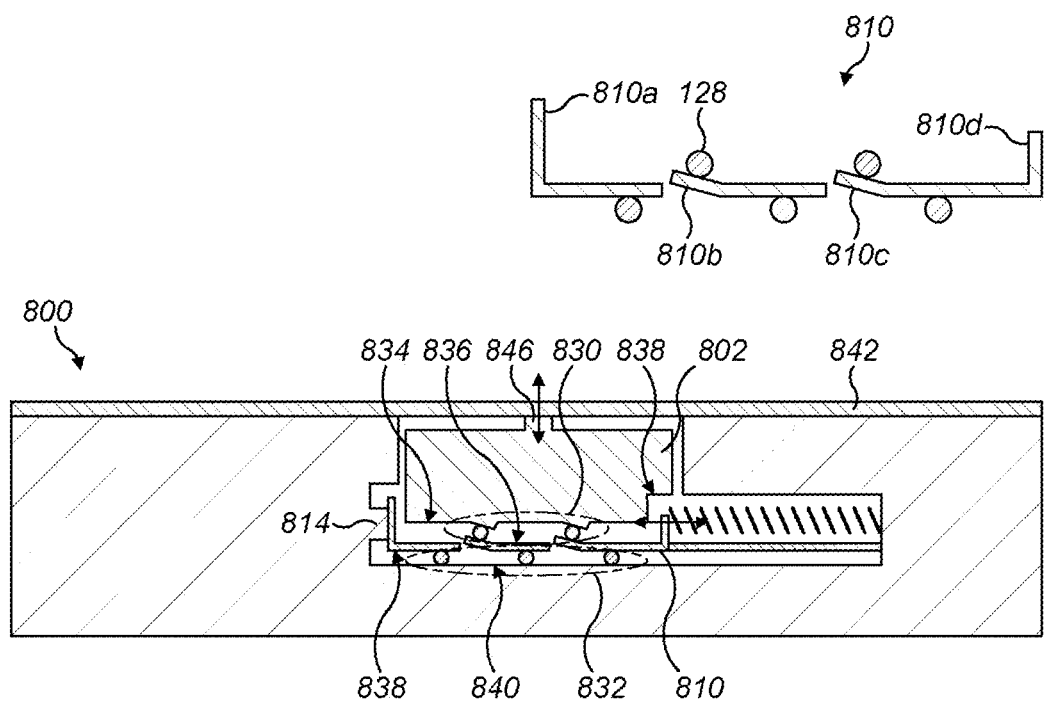
FIG. 8 shows a cross-sectional view of an eighth arrangement of a haptic button assembly.

FIG. 8 shows a cross-sectional view of an eighth arrangement of a haptic button assembly 800. The haptic button assembly 800 is similar to the arrangement shown in FIGS. 1 and 6 and therefore, for the sake of conciseness, like features are not described. The haptic button assembly comprises a button 802 and an intermediate moveable element 810. The button 802 is similar to button 602 in FIG. 6. Button 802 comprises a protrusion 846 which forms the contact point or contact surface of button 802. As per FIG. 6, here there is a large gap between the button 802 and protective seal 842, which may enable the protective seal 842 to flex/bend in such a way that the seal does not restrict the motion of the button 802. The button 802 comprises one or more localised ramps along surface 834 (i.e. the surface which comes into contact with the intermediate moveable element 810). Thus, the intermediate moveable element 810 may be considered a 'single wedge', as only one surface of the element comprises the localised ramps.

The intermediate moveable element 810 may be formed from a sheet of material which may be etched to form one or more localised ramps. The or each localised ramp may be formed by etching a tab-like element in the sheet of material and folding the tab by the required angle and in the required direction to create a ramp. In the illustrated arrangement, the intermediate moveable element 810 comprises two localised ramps 810b, 810c formed from two tabs in the sheet of material, but this is a non-limiting example. Two opposite ends of the sheet of material may be folded in the same direction to form edges 810a and 810d of the intermediate moveable element 810. Edge 810a is coupled to the at least one SMA actuator wire and, if present, may be coupled to a return spring (or similar component). Edge 810d may, in combination with endstop 814, function to limit the range of motion of the intermediate moveable element 810. The button 802 and intermediate moveable element 810 may comprise the same number of localised ramps. The localised ramps of the button 802 and intermediate moveable element

810 may be co-located in pairs. In other words, a localised ramp of the button may be in close proximity to a corresponding localised ramp of the intermediate moveable element 810. The intermediate moveable element 810 may, in embodiments, be formed from a thin sheet of metal which may be relatively rigid (such that, in use, the localised ramps do not flex or bend). For example, the intermediate moveable element 810 may be formed from a sheet of phosphor bronze. In embodiments, the tab-like elements may be formed by plastic deformation of the sheet of material into a well or pocket, to thereby improve the rigidity of the sheet of metal which forms the intermediate moveable element. In embodiments, rib-like features may be provided on the intermediate moveable element 810 to further stiffen the metal sheet where required.

The haptic button assembly 800 may comprise a first bearing 830 between the button 802 and the intermediate moveable element 810. The first bearing 830 may comprise one or more ball bearings 128 that are provided between surface 834 of the button and surface 836 of the intermediate moveable element. At least one ball bearing 128 may be provided between the or each pair of localised ramps. The first bearing 830 may comprise one or more localised ramps and one or more ball bearings. It will be understood that more than one ball bearing 128 may be provided between each pair of localised ramps. For example, in embodiments there may be three ball bearings on each localised ramp.

The haptic button assembly 800 may comprise a second bearing 832 between the intermediate moveable element 810 and a surface of the housing/cavity. The second bearing 832 may comprise one or more ball bearings provided between surface 838 of the intermediate moveable element and surface 840 of the housing (i.e. a surface of the cavity), which may facilitate the lateral movement of the moveable element.

The button 802 may comprise a clearance nick or cut 838 at a corner of the button which interacts with edge 810d of the intermediate moveable element 810. The clearance cut 838 may be provided so that edge 810d may be able move freely when the intermediate moveable element 810 is actuated.

Figure 6:
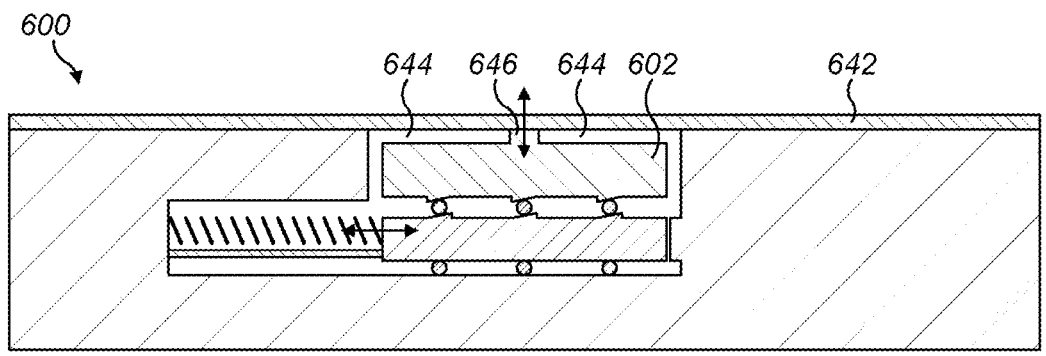
FIG. 6 shows a cross-sectional view of a sixth arrangement of a haptic button assembly and a sealing mechanism.

The overall height of the intermediate moveable element 810 may be similar to the height of the moveable element in, for example FIG. 6, or may be lower. Furthermore, less material may be used to form the intermediate moveable element 810 compared to, for example, FIG. 6. Therefore, the arrangement of FIG. 8 may advantageously enable a lower height/smaller size haptic button assembly to be provided and/or may provide a lower cost assembly (as less material is used).

Figure 9A:
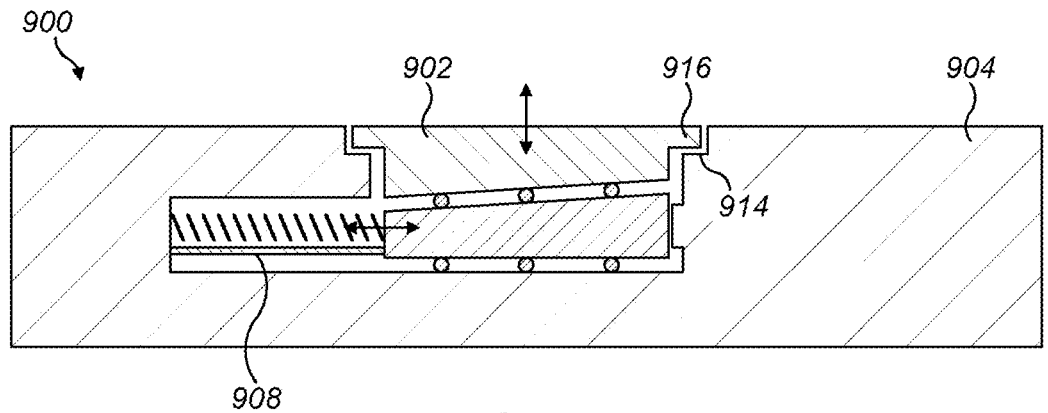
FIG. 9A shows a cross-sectional view of a ninth arrangement of a haptic button assembly.

FIG. 9A shows a cross-sectional view of a ninth arrangement of a haptic button assembly 900. The haptic button assembly 900 is similar to the arrangement shown in FIG. 1 and therefore, for the sake of conciseness, like features are not described. Button 902 of the haptic button assembly 900 may comprise a lip 916 that protrudes from a side or along at least a part of the button 902 (providing a 'local' endstop). The lip 916 may be provided all the way around the button if the lip also acts as a sealing mechanism. The housing 904 may comprise a corresponding ledge or groove 914, and the lip 916 of the button may engage with the ledge 914 of the housing 904. The ledge 914 may, for example, restrict the movement of the button 902 into the cavity of the housing 904. The lip 916 therefore functions as an endstop to restrict the motion of the button 902 in one direction. If the button 902 is pressed with excessive force, the lip 916 comes into contact with the ledge 914, and the force is transmitted into the housing 904 through this contact, instead of passing through the bearings which could potentially cause damage to the bearings. Furthermore, the lip 916 may perform a sealing function when the button is pressed. For example, if the lip 916 of the button 902 has the form of an O-ring, the lip 916 may provide sealing of the assembly 900 against water and dust ingress when the button is in its equilibrium position.

Figure 10A:
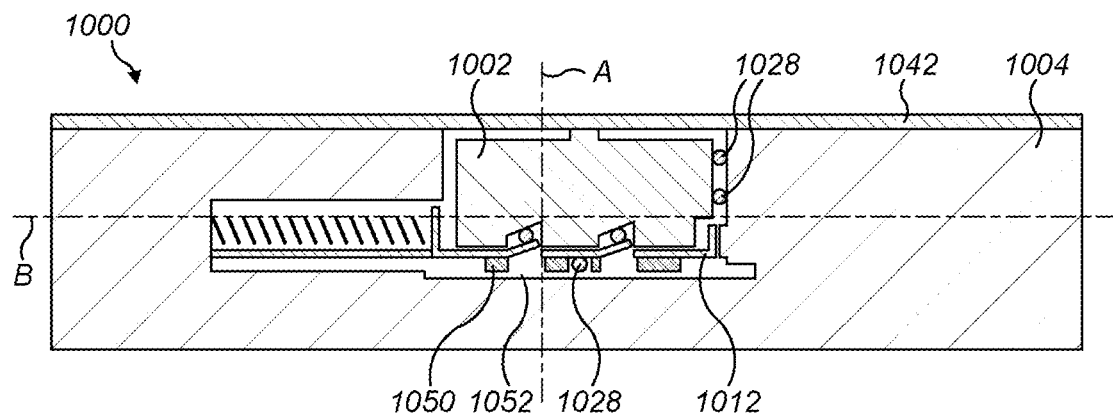
FIG. 10A shows a cross-sectional view of a tenth arrangement of a haptic button assembly and a sealing mechanism.
Figure 10B:
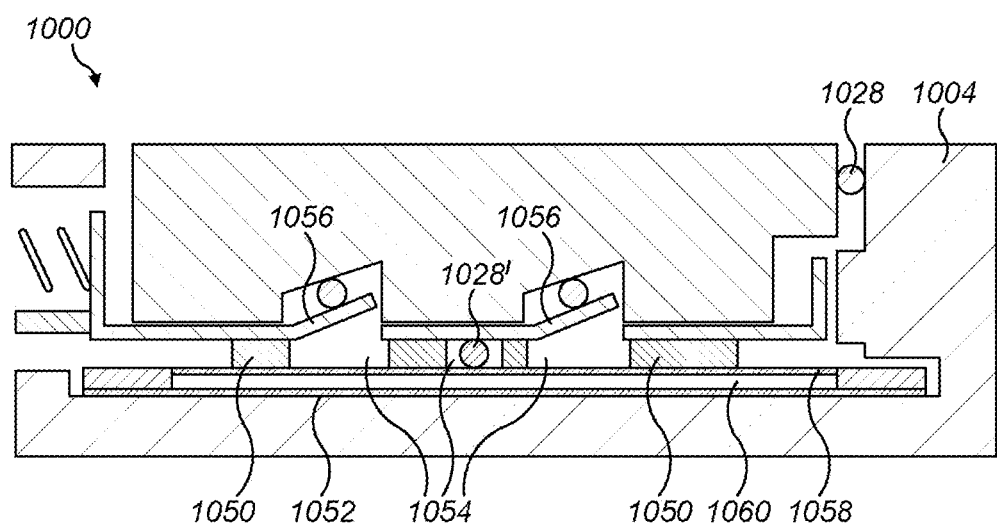
FIG. 10B shows a zoomed-in view of a portion on the tenth arrangement.

FIG. 10A shows a cross-sectional view of a tenth arrangement of a haptic button assembly 1000, and FIG. 10B shows a zoomed-in view of a portion on the tenth arrangement. Generally speaking, it may be useful to constrain the motion of the button within the cavity of a haptic button assembly such that it only moves up and down within the cavity (i.e. along a first axis A) and not side-to-side/laterally (i.e. not along a second axis B). In embodiments, a bearing may be provided between the button and the cavity/housing to restrict the motion along the second axis B. Alternatively, if the assembly comprises one or more flexures, the flexures may restrict the motion of the button along the second axis B. The intermediate moveable element moves along the second axis B and may in some embodiments also move along the first axis A. The motion of the button along axis B may be restricted in a variety of ways. For example, a surface of the button and a surface of the housing (i.e. an inner surface of the cavity) may be in contact such that they operate as a plain bearing. Alternatively, one or more ball bearings may be provided between the button and the cavity, and/or one or more flexures may be provided between the button and the cavity/housing to constrain lateral motion of the button (i.e. motion along axis A). In embodiments, the protective membrane (described above) may act as a flexure that constrains the lateral motion of the button. The protective membrane/flexure is stiff and able to absorb the moment induced in it by the intermediate moveable element.

The haptic button assembly 1000 is similar to the arrangement shown in FIG. 8 and therefore, for the sake of conciseness, like features are not described. Haptic button assembly 1000 comprises at least one ball bearing 1028 provided between button 1002 and housing 1004 (i.e. an inner surface of the cavity of the housing), which may accept/absorb any sideways/lateral force that is transferred from intermediate moveable element 1012 to the button 1002. The ball bearing(s) between the button 1002 and the housing 1004 may be sufficient to restrict motion of the button 1002 along axis B.

Additionally or alternatively, the haptic button assembly 1000 may comprise means for restricting the amount of lateral motion of intermediate moveable element 1012. By restricting the extent of lateral motion that the intermediate moveable element 1012 can undergo (i.e. motion along axis B), the lateral motion of the button 1002 may also be restricted. The means for restricting the lateral motion of intermediate moveable element 1012 may be or comprise a spacing component 1050, provided between the intermediate moveable element 1012 and the housing 1004. The spacing component 1050 may be formed of a sheet or layer of material. The spacing component 1050 may comprise one or more holes 1054. Each hole 1054 may be a through-hole or a blind hole. The intermediate moveable element 1012 may comprise one or more localised ramps 1056, which correspond to the localised ramp(s) of the button 1002, as described above with reference to FIG. 8. The or each localised ramp 1056 may be arranged to sit within (locate within) the holes 1054 in the spacing component 1050. The spacing component 1050 may therefore restrict the motion of the intermediate moveable element 1012 because the hole 1054 constrains the motion of the localised ramp 1056 that is located in the hole.

Where the intermediate moveable element 1012 comprises multiple localised ramps 1056, at least one ball bearing may be provided between the ramps 1056 to reduce friction between the unramped portions of the intermediate movable element 1012 and the spacing component 1050. In the embodiment shown in FIG. 10B, the intermediate moveable element 1012 comprises two localised ramps 1056. Ball bearing 1028' is provided between the unramped portion of the intermediate movable element 1012 and the housing 1004. Ball bearing 1028' is located in a hole 1054 in the spacing component 1050 to keep this ball in the correct location.

As mentioned earlier with reference to FIG. 1, each haptic button assembly may comprise a sensor to detect when a user is pressing the button. FIGS. 10A and 10B show a sensor 1052 for detecting when a user is pressing the button 1002. The sensor 1052 is provided between the spacing component 1050 and the housing 1004. The sensor 1052 may be a contact sensor and may comprise a deformable surface 1058. Thus, when button 1002 is pressed, the downward force on the button is transferred to the intermediate moveable element 1012 and the spacing component 1050, which causes the deformable surface 1058 to deform and make an electrical contact with conductive surface 1060 of the sensor 1052. This type of sensor may be provided in any of the haptic button assemblies described above with reference to FIGS. 1 to 9C. An example mechanism to detect a press of a button is described in GB2551657, which is hereby incorporated by reference in its entirety.

FIG. 16 shows a cross-sectional view of a thirteenth haptic button assembly 1600. The haptic button assembly 1600 comprises a button 1602 and a housing 1604. In this case, the button 1602 is part of the housing 1604. The housing 1604 may comprise at least a portion which is flexible and pressable and therefore provides the button 1602 of the assembly 1600. Advantageously, by forming the button 1602 as part of the housing 1604, there is no gap between the button and the housing and therefore, a sealing mechanism is not required. This may also provide a cheaper and simpler assembly to manufacture.

The assembly 1600 comprises an intermediate moveable element 1606, which takes the form of a lever arm. The intermediate moveable element 1606 may be coupled to a first SMA actuator wire 1608 to move the lever arm in a first direction, and may be coupled to a second SMA actuator wire 1610 to move the lever arm in a second direction. Alternatively, one of the actuator wires 1608, 1610 may be replaced by a return spring or similar resilient element. Further alternatively, the flexible portion of the housing 1604 may itself be stiff enough to provide a return force—in this case, a return spring or second SMA actuator wire may not be required. Movement of the intermediate moveable element 1606 may cause the button portion 1602 of the housing 1604 to flex. Thus, the housing 1604 may be formed of a flexible material such that when the intermediate moveable element 1606 is actuated, the button portion 1602 flexes and provides a haptic sensation. Alternatively, the housing 1604 may be formed of a material which is not generally flexible unless it is provided as a thin layer. Thus, the button 1602 may be thinner than the rest of the housing 1604 such that the button portion is flexible. For example, at least the button 1604 may be formed from a thin layer of metal, e.g. a 50 μm thick layer of aluminium.

FIG. 16A shows a cross-sectional view of a further haptic button assembly 1650 comprising a lever arm 1656. The haptic button assembly 1650 comprises a button or button portion 1652 and a housing 1654. In this case, the button 1652 is part of the housing 1654. The housing 1604 may comprise at least a portion which is flexible and pressable and therefore provides the button 1652 of the assembly 1650. Advantageously, by forming the button 1652 as part of the housing 1654, there is no gap between the button and the housing and therefore, a sealing mechanism is not required. This may also provide a cheaper and simpler assembly to manufacture. However, it will be understood that the haptic button assembly 1650 may be arranged such that there is a gap between the button 1652 and the housing 1654 (e.g. as shown in FIG. 24), or such that there is a separate button component which is not part of the housing (e.g. as shown in FIG. 1).

The assembly 1650 comprises an intermediate moveable element 1656, which takes the form of a lever arm. The intermediate moveable element 1656 may be coupled to at least one SMA actuator wire 1658 to move the lever arm in a first direction. The intermediate moveable element 1656 moves about pivot 1660. In embodiments, the lever arm 1656 may be coupled to another SMA actuator wire (not shown) to move the lever arm in a second direction. Alternatively, one of the actuator wires may be replaced by a return spring or similar resilient element. Further alternatively, the flexible portion of the housing 1654 may itself be stiff enough to provide a return force—in this case, a return spring or second SMA actuator wire may not be required. In some cases, the force of a user's finger may be sufficient to provide a return force, such that an SMA actuator wire or return spring is not required to return the button to an equilibrium position. Movement of the intermediate moveable element 1656 may cause the button portion 1652 of the housing 1654 to flex. Thus, the housing 1654 may be formed of a flexible material such that when the intermediate moveable element 1656 is actuated, the button portion 1652 flexes and provides a haptic sensation. Alternatively, the housing 1654 may be formed of a material which is not generally flexible unless it is provided as a thin layer. Thus, the button 1652 may be thinner than the rest of the housing 1654 such that the button portion is flexible. For example, at least the button 1654 may be formed from a locally-thinned section of the housing, e.g. a 30 μm thick layer of aluminium.

Thus, in embodiments, the intermediate moveable element may be a lever arm arranged to drive movement of the button along the first axis.

FIG. 17 shows a cross-sectional view of a fourteenth haptic button assembly 1700. As mentioned above with respect to FIG. 1, each haptic button assembly described here may comprise a sensor in the housing below the button and intermediate moveable element. The sensor may be a force sensor, for example. Generally speaking, the sensor may be any suitable sensor or mechanism for detecting depression of the button by a user (i.e. detecting that a user has pressed the button). The movement of the button into the cavity (as a result of the user pressing the button) causes a force to be exerted on the sensor. The sensor may be coupled to control circuitry, and the sensor may be configured to communicate with the control circuitry when the force on the sensor changes, or when the force on the sensor has been applied for a minimum duration. The detection by the sensor of a user pressing the button causes the haptic feedback to be generated and applied by haptic button assembly. The haptic button assembly 1700 shown in FIG. 17 comprises an alternative arrangement of the sensor, which may advantageously reduce the overall size/height of the assembly.

The haptic button assembly comprises a button 1702 and an intermediate moveable element 1706, both provided in housing 1704. The assembly comprises at least one SMA actuator wire 1708, which is coupled at one end to the intermediate moveable element 1706, and another end to the housing 1704. A resilient biasing element 1710 may be coupled to the intermediate moveable element 1706 and the housing 1704. The biasing element 1710 may be a weak spring, and may be weaker than a return spring because the force applied to the button by a user may be advantageously used to stretch out the SMA actuator wire 1708. Thus, in embodiments, the force applied by a user can be utilised to provide the 'return force' against the SMA actuator wire, such that only a weak spring is required (or the spring may be removed completely). When a press of button 1702 is detected, the SMA actuator wire 1708 is driven, which causes the wire 1708 to contract. The contraction of the wire 1708 causes the intermediate moveable elements 1706 to move into the further cavity of the housing (as described with reference to e.g. FIG. 1), which causes the button 1702 to move upwards (i.e. out of the cavity). The biasing element 1710 may enable the button 1702 to return to the equilibrium state as the SMA actuator wire 1708 cools.

The haptic button assembly 1700 may comprise an endstop 1712 in the cavity. The endstop 1712 may be formed as part of the housing 1704 or cavity, or may be a separate element that is provided in the cavity. The endstop 1712 may be provided at a location in the cavity to restrict movement of the intermediate moveable element 1706. As explained above with reference to FIG. 1, if SMA actuator wire is stretched too far (i.e. a certain tension is exceeded), the SMA actuator wire may weaken or become damaged, or even break. The force of the biasing element 1710 on the intermediate moveable element 1706 may cause the SMA actuator wire 1708 to become overstretched. Therefore, the endstop 1712 may restrict the movement of the intermediate moveable element 1706 so that the at least one SMA actuator wire 1708 does not overstretch. Similarly, a force applied to the button 1702 by a user's finger may cause the wire to overstretch if there is no endstop, because when the button is pushed downwards (i.e. into the cavity), the intermediate moveable element 1706 moves towards the left in the Figure, such that the SMA actuator wire 1708 is stretched.

The fact that the intermediate moveable element 1706 moves towards the endstop 1712 when the button is pressed 1702 is used to provide the alternative arrangement of the sensor. In assembly 1700, a sensor 1714 is provided on the endstop 1712. The sensor 1712 may be a contact sensor or a force sensor, and a conductive element 1716 may be provided on the intermediate moveable element 1706. When the button 1702 is pressed, the downward force on the button causes the intermediate moveable element 1706 to move towards, and make contact with, the endstop 1712. When the intermediate moveable element 1706 and endstop 1712 are in contact, the contact sensor 1712 and the conductive element 1716 make an electrical connection, which indicates that the button 1702 has been pressed and that haptic feedback should be delivered.

FIGS. 18A and 18B respectively show cross-sectional views of a fifteenth haptic button assembly 1800 in an equilibrium state and in an activated state. The haptic button assembly 1800 comprises a button 1802, a housing 1804 and an intermediate moveable element 1806. The intermediate moveable element 1806 is a flat flexure, which is attached at one end 1808 to the housing 1804. The other end 1810 of the flexure 1806 is not attached to the housing 1804 and is free to translate along the flexure's longitudinal direction. The button 1802 is coupled to (e.g. attached to) the flexure 1806. The assembly 1800 comprises an SMA actuator wire 1812 which is coupled at one end to the free end 1810 of flexure 1806 and at another end to the housing 1804. The SMA actuator wire 1812 may be arranged such that when the wire contracts (on heating), the wire forces an out-of-plane deflection of the flexure 1806, which forces the button 1802 to move upwards, i.e. to move out of the cavity of the housing 1804, as shown in FIG. 18B. When the wire is cooled, the flexure 1806 returns to its equilibrium state (i.e. is substantially flat), which causes the button 1802 to move downwards within the cavity of the housing 1804, as shown in FIG. 18A. Advantageously, the flexure 1806 means that an additional bias spring is not required to oppose the effect of the SMA actuator wire 1812. Thus, the assembly may be simpler and cheaper to manufacture and operate. Furthermore, compared to the embodiments which comprise a wedge-shaped button and/or intermediate moveable element (e.g. FIGS. 1 to 3), the overall profile or size of the haptic button assembly 1800 may be reduced by using a flexure as the intermediate moveable element.

In embodiments, the assembly 1800 may be adapted to allow vertically 'downward' motion of the button 1802, i.e. to allow the button 1802 to move into the cavity. (As mentioned earlier, haptic feedback may be provided by the button moving upwards into a user's finger, or by the button dropping away from the user's finger). In this case, the assembly 1800 may comprise a well or further cavity in the housing 1804 below the flexure 1806. Thus, the flexure 1806 may be arranged to buckle or bend into the well/further cavity, and doing so causes the button 1802 to move further into the cavity.

FIG. 19 shows a plan view of a fifteenth haptic button assembly 1900. (The button has been removed from the illustration for the sake of clarity). Here, intermediate moveable element 1906 is able to rotate within housing 1904, rather than merely translate. As a result, the button (not shown) may also be able to rotate or tilt. This may be achieved by providing a series of ramps 1908 which are arranged such that the gradient of the ramps increases in the same direction along a helical (or substantially helical) path. In this example, the assembly 1900 comprises four ramps and ball bearings roll along the ramps in the same direction when the intermediate moveable element 1906 is actuated (by SMA actuator wires 1902) such that the intermediate moveable element rotates. In some cases, a bearing layer may be provided between the button and the intermediate moveable element to prevent the button from rotating—the bearing layer may de-couple the button from the rotating intermediate moveable element. Suitable mechanisms may be used to keep the ball bearings in place, e.g. the bearings may be located in tracks or grooves to constrain their motion.

In embodiments, a single SMA actuator wire may be sufficient to drive motion of the intermediate moveable element 1906. For example, as per FIG. 17, the force of a user's finger may be sufficient to provide a return force, such that an SMA actuator wire is not required to return the button to an equilibrium position. Alternatively, to maximise the force used to move the button, multiple SMA actuator wires may be used (e.g. multiple wires arranged to be mechanically in parallel).

Turning to FIG. 33A shows a plan view of a button of a further haptic button assembly 3300, FIG. 33B shows a plan view of the further haptic button assembly 3300 and FIG.

33C shows a cross-sectional view of the further haptic button assembly 3300. The haptic button assembly 3300 comprises a button 3302 which is able to rotate within housing 3304. The haptic button assembly 3300 comprises an intermediate moveable element 3308 and at least one SMA actuator wire to move the intermediate moveable element in one direction and a resilient element (e.g. a spring) to move the intermediate moveable element in the opposite direction. In the illustrated arrangement, the haptic button assembly 3300 comprises two SMA actuator wires 3310a, 3310b which may be arranged as opposing wires (i.e. one of the SMA actuator wires acts as the resilient element that provides the restoring force). In other words, SMA actuator wire 3310a may move the intermediate moveable element 3308 in one direction, and SMA actuator wire 3310b may move the intermediate moveable element 3308 in an opposite direction. The haptic button assembly 3300 comprises a central shaft or bearing 3306. The central bearing 3306 is coupled to the intermediate moveable element 3308 and to the button 3302. Movement of the intermediate moveable element 3308 in one direction causes the central bearing 3306 to rotate in one direction, which thereby causes the button 3302 to rotate relative to the housing 3304. Movement of the intermediate moveable element 3308 in the opposite direction causes the button 3302 to rotate in an opposite sense. The haptic button assembly 3300 may comprise a seal 3312, such as a flexible sealing membrane, to prevent any fluid and/or dirt which enters the haptic assembly through the gap between the housing 3304 and the button 3302 from travelling any further into the haptic assembly, or into the device in which the haptic assembly is incorporated. The haptic button assembly 3300 may comprise one or more bearings (e.g. ball bearings) 3314 which are provided between the housing 3304 and the intermediate moveable component 3308. The ball bearings 3314 may provide a low friction surface on which the intermediate moveable component 3308 is able to move.

Accordingly, the present techniques provide a haptic button assembly comprising: a housing comprising a cavity; a button provided within the cavity and moveable along a first axis within the cavity; at least one intermediate moveable element provided within the cavity in contact with the button and rotatable about a second axis that is parallel to the first axis, and arranged to drive movement of the button along the first axis; and at least one shape memory alloy (SMA) actuator wire coupled to the at least one intermediate moveable element and arranged to, on contraction, rotate the intermediate moveable element about the second axis.

FIG. 20 shows a cross-sectional view of a sixteenth haptic button assembly 2000. In haptic button assembly 2000, button 2002 is chevron-shaped, i.e. the button 2002 comprises two slopes which are inclined in opposite directions at equal angles. The assembly 2000 comprises two intermediate moveable elements 2004 and 2006 which are wedge-shaped. In this embodiment, the intermediate moveable element may be considered to be or comprise two 'opposing wedges', as the two elements are wedges having slopes inclined in opposite directions. The gradient of the wedge-shaped moveable element 2004 corresponds to one slope of the chevron-shaped button 2002, and the gradient of the wedge-shaped moveable element 2006 corresponds to the other slope of the chevron-shaped button 2002. In embodiments, the angles or gradients of the slopes of the two moveable elements 2004, 2006 are the same, to prevent the button 2002 from tilting when the SMA actuator wire 2008 is driven. However, in some embodiments a tilt may be required and may be achieved by having differing slopes. It will be understood that the direction of the gradients or slopes of the two wedge-shaped moveable elements may be reversed without loss of functionality (though the slopes of the button 2002 will also need to be reversed). The two intermediate moveable elements 2004, 2006 are coupled together via an SMA actuator wire 2008.

A return spring 2010 is coupled to moveable element 2004 and the housing, and another return spring 2012 is coupled to moveable element 2006 and the housing. When a press of button 2002 is detected, the SMA actuator wire 2008 is driven, which causes the wire 2008 to contract. The contraction of the wire 2008 causes the intermediate moveable elements 2004 and 2006 to move towards each other, which causes the button 2002 to move upwards (i.e. out of the cavity). The return springs 2010, 2012 may enable the button 2002 to return to the equilibrium state as the SMA actuator wire 2008 cools and a force is applied. In embodiments, the return springs may not be required as the force of the user's finger on the button 2002 may be sufficient to return the button to the equilibrium state after the haptic sensation has been provided. The assembly may comprise two endstops 2010, 2012 to restrict the motion of the intermediate moveable elements 2004, 2006, respectively.

Thus, from the above-described embodiments and arrangements, it will be understood that the intermediate moveable element which causes the button to move 'vertically' may be a single wedge-shaped element (or element comprising localised wedges/ramps), may comprise two wedge-shaped elements (or elements comprising localised wedges/ramps), or may comprise opposing wedges. Alternatively, the intermediate moveable element may be a flexure (see e.g. FIG. 18A), or a lever arm (see e.g. FIG. 16). The intermediate moveable element be arranged to drive motion of the button (or button portion of the housing) into the housing or out of the housing (i.e. vertically 'downwards' or 'upwards').

Sealing Mechanisms

The haptic button assemblies may comprise a protective seal to prevent ingress of fluids and/or dirt/dust into the assembly. The haptic button assemblies described herein may be incorporated into a variety of different devices, including smartphones and wearables. Smartphone and wearable devices may be required to meet a particular waterproofing standard. For example, such devices may be required to meet the standard necessary for an Ingress Protection (IP) Rating of 67 or 68. An IP rating of 67 indicates the device has some sort of protection that results in the device being dust tight and being waterproof when the device is immersed in up to 1 m of water, while an IP rating of 68 indicates the device has some sort of protection that results in the device being dust tight and being waterproof when the device is continuously immersed in more than 1 m of water. Accordingly, if the haptic button assemblies are to be incorporated into a smartphone or wearable device with an IP rating of 67 or 68, the haptic button assembly also needs to be water and dust proof to the same standard.

As mentioned above, the haptic button assemblies described herein may be more readily, and more efficiently, sealed compared to haptic button assemblies in which the button moves laterally. There are a number of different possible sealing mechanisms, some of which are described with reference to FIGS. 5, 6, 9A, 11A-C, 12A-C, 13A-B, and 14 to 16. Before these specific sealing mechanisms are described, some general concepts associated with the sealing mechanism are described.

Generally speaking, the sealing mechanism may be non-structural (i.e. it does not provide any intentional force on the button of the haptic button assembly), or may be structural (i.e. it provides some force on the haptic button assembly to, for example, guide the movement of the button).

In cases where the sealing mechanism is substantially non-structural, additional bearings may be required to constrain the lateral (sideways) motion of the button within the cavity. For example, a rolling bearing may be provided between the button and the cavity, on the same side of the button to which the SMA actuator wire is connected, such that when the SMA actuator wire contracts, the bearing prevents the button from moving sideways or from tilting within the cavity (i.e. constrains the motion of the button). Alternatively, when the sealing mechanism is non-structural, no rolling bearing may be provided between the button and the cavity—in this case, the direct contact of the button with the cavity is a high friction, low efficiency sliding contact which acts to constrain the motion of the button. In some embodiments, the sealing mechanism may be non-structural, and may be combined with a flexure to guide the motion of the button 'vertically' in the cavity. In this case, a rolling bearing between the cavity and button may not be required.

In cases where the sealing mechanism is structural, the sealing mechanism provides both a sealing function and a bearing function, i.e. the sealing mechanism is able to guide the motion of the button within the cavity. In this case, an additional bearing between the cavity and the button may not be required. Alternatively, the sealing mechanism may be provided by housing itself—the button may be an integral part of the housing such that no additional sealing mechanism is required. This may be achieved by making the button part of the housing thinner than the rest of the housing, such that it is flexible. However, in this case, a further button that a user may press/contact may be provided externally in order to protect the thin integrally-formed button of the housing.

Regardless of whether the sealing mechanism is structural or non-structural, the sealing mechanism may function at all times or may only function when the button of the haptic button assembly is not in motion.

Figure 5:
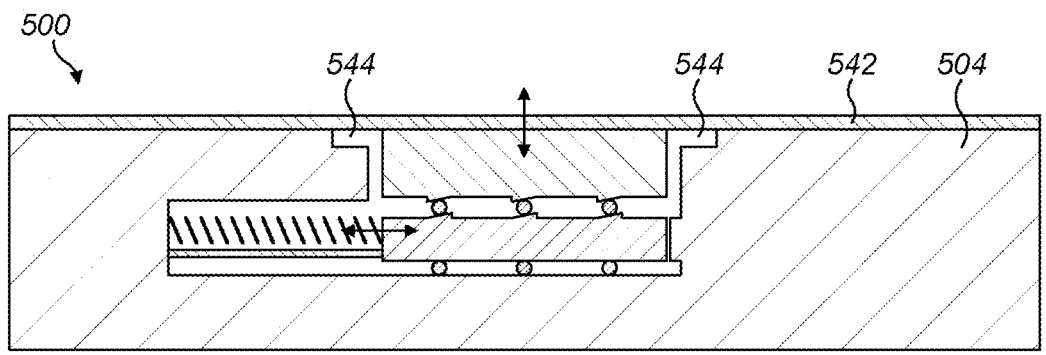
FIG. 5 shows a cross-sectional view of a fifth arrangement of a haptic button assembly and a sealing mechanism.

Turning now to FIG. 5, this shows a cross-sectional view of a fifth arrangement of a haptic button assembly 500 comprising a sealing mechanism which is structural and functions at all times (i.e. both when the button is in motion and is not in motion). The haptic button assembly 500 is similar to the arrangement shown in FIG. 4 and therefore, for the sake of conciseness, like features are not described. Compared to assembly 400, haptic button assembly 500 comprises a protective seal 542 (also referred to as a protective membrane, film or cover). The protective seal 542 may be a waterproofing and/or dust proofing seal to prevent water and/or dust ingress into the cavity. Generally speaking, a small gap may be provided between the button and the cavity, to avoid contact between a surface of the button with a surface of the cavity, which may increase friction and affect the performance of the assembly. However, the gap may then enable liquid and/or dirt to enter the cavity of the assembly, where it could affect the performance of the assembly. For example, dirt could inhibit the movement of button, the bearings and/or the intermediate moveable element, while liquid could interfere with any electronic components/circuitry. Thus, the protective seal 542 may advantageously enable a waterproof/dustproof haptic button assembly to be provided.

The protective seal 542 may be provided across the entire area of the external surface of the housing (i.e. surface 108 in FIG. 1) and the button (as shown in FIG. 5), or may be provided across the button and at least part of the area of this external surface. In either case, the protective seal 542 may be formed of a flexible material, an elastic material, or a material which exhibits some flexibility/elasticity when it is provided as a thin layer, which enables the protective seal 542 to flex as the button moves. (If the protective seal 542 were not made of a flexible/elastic material, the protective seal may inhibit or limit the motion of the button, which may affect the haptic sensation delivered by the assembly). The protective seal 542 may be formed of an elastomer, hard plastic, a composite material, a thin metallic layer e.g. a thin aluminium or a thin stainless steel layer, for example. It will be understood that is a non-exhaustive, non-limiting example list of materials. The protective seal 542 may be attached to the housing 504 by any suitable technique, such as adhesive, welding, or otherwise.

Optionally, when a haptic button assembly comprises a protective seal, the housing of the assembly may be modified to accommodate the protective seal. As shown in FIG. 5, the housing 504 comprises a cut-out or ledge 544 in the external surface of the housing, provided around the button. The cut-out or ledge 544 provides clearance or space between the button and the housing. The protective seal 542 may be able to bend/flex into the ledge 544 when the button moves in the cavity, such that a portion of the protective seal 542 which is able to move when the button moves is increased. This may advantageously reduce the extent to which the protective seal 542 resists the motion of the button.

It will be understood that the protective seal, and the optional cut-out, may be incorporated into any of the haptic button assemblies described herein.

FIG. 6 shows a cross-sectional view of a sixth arrangement of a haptic button assembly 600 comprising a sealing mechanism which is structural and functions at all times (i.e. both when the button is in motion and is not in motion). This may be considered to include a more extreme version of the cut-out shown in FIG. 5. The haptic button assembly 600 is similar to the arrangements shown in FIGS. 4 and 5 and therefore, for the sake of conciseness, like features are not described. Compared to assembly 500, haptic button assembly 600 comprises a reduced size (i.e. reduced height) button 602. The button 602 comprises a protrusion 646 which forms the contact point or contact surface of button 602. Thus, the area or size of the contact surface of button 602 is reduced relative to FIG. 5. By reducing the height of the button 602 and providing the protrusion 646 as the contact surface, a large gap 644 is provided between the button 602 and protective seal 642. Accordingly, the extent to which the protective seal 642 resists the motion of the button is further reduced. As explained above, the protective seal 642 may be formed of an elastomer, hard plastic, a composite material, a thin metallic layer e.g. a thin aluminium or a thin stainless steel layer, for example. It will be understood that is a non-exhaustive, non-limiting example list of materials.

Returning briefly to FIG. 8, in this embodiment, the protective seal 842 acts as a flexure to guide the button to move in the first direction (vertically). Thus, the sealing mechanism is structural and functions at all times (i.e. both when the button is in motion and is not in motion).

Figure 11C:
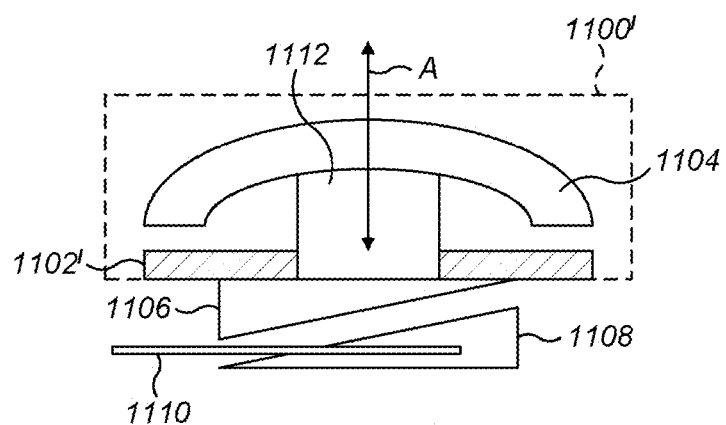

FIGS. 11A and 11B respectively show a plan view and a cross-sectional view of a mechanism 1100 for sealing a haptic button assembly, and FIG. 11O shows a cross-sectional view of a modified mechanism 1100'. The sealing mechanism shown in FIGS. 11A to 11C is structural and functions at all times (i.e. both when the button is in motion and is not in motion). The sealing mechanisms 1100, 1100' may provide an efficient mechanism for water- and dust-proofing a haptic button assembly. The sealing mechanism 1100 comprises a flexible skin or membrane 1102 and an external button 1104. The flexible skin 1102 may cover the cavity in the housing which houses the button 1106, intermediate moveable element 1108 and at least one SMA actuator wire 1110, as described earlier, such that the flexible skin 1102 effectively covers the cavity. The flexible skin 1102 may be considered an impermeable barrier between the external environment and the cavity of the housing of a haptic button assembly (i.e. the internal environment). Thus, the term 'external button' is used to mean that button 1104 is provided at least partly outside of the cavity, i.e. at least partly on the external side of the barrier formed by the flexible skin 1102. The external button 1104 may cooperate with the (internal) button of the haptic button assemblies described earlier.

FIG. 11B shows an example internal button 1106, which is provided on the internal side of the barrier formed by the flexible skin 1102. The external button 1104 may comprise a stem 1112 that is arranged to cooperate with the internal button 1106. In the mechanism 1100 shown in FIG. 11B, the stem 1112 contacts the flexible skin 1102. When the external button 1104 is pressed by a user, the stem 1112 exerts a force on the flexible skin 1102, which causes the flexible skin 1102 to flex/bend. The force applied to the button 1104 is transferred via the stem 1112 to the internal button 1106, and a press of the internal button 1106 is detected as described earlier (e.g. via a sensor located within the cavity).

FIG. 11C shows a sealing mechanism 1100' having a flexible skin 1102' which comprises a cut-out (not visible) to reduce the overall stiffness of the mechanism in the direction of motion. Thus, the stem 1112 of external button 1104 at least partly extends through the cut-out in the flexible skin 1102'. Thus, the stem 1112 may be able to directly contact the internal button 1106.

The flexible skin 1102, 1102' may be made from any suitable material having an appropriate stiffness in the direction of motion. The flexible skin 1102, 1102' is preferably an impermeable material, i.e. impermeable to liquids and dirt. The flexible skin 1102, 1102' may be formed from a thin film polymer, for example. The flexible skin 1102, 1102' may be formed of a material which is impermeable to liquid, such that the sealing mechanism protects the haptic button assembly against fluid ingress. The flexible skin may be, for example, a thin silicone film. The sealing mechanism 1100, 1100' may comprise an adhesive or an adhesive element to fixedly attach the flexible skin 1102, 1102' to the housing of the assembly. The flexible skin (also referred to as a thin membrane) may deflect sufficiently to enable the button 1106 to move within the haptic button assembly. The thin membrane 1102, 1102' may provide a return force to return the button 1106 to its default, rest state when the intermediate moveable element 1108 is not being actuated to deliver a haptic sensation.

Advantageously, the sealing mechanisms 1100, 1100' secure the haptic button assembly against ingress of liquid and/or dirt or dust. The flexible skin may enable a water and dust proof haptic button assembly to be provided along a curved edge of a device. The sealing mechanisms 1100, 1100' decouple the sealing mechanism from the button/external button—this may be advantageous as the external button may then be customisable without affecting the sealing mechanism or mechanics of the assembly. For example, the design and texture of the external button may be selected/customised without impacting the sealing mechanism.

FIGS. 12A to 12C show cross-sectional views of three mechanisms for sealing a haptic button assembly.

FIG. 12A shows a portion of a haptic button assembly 1200 comprising a sealing mechanism which is non-structural and functions only when the button is not in use, because when the button moves upwards, the seal is broken. Here, button 1202 of the haptic button assembly performs two functions—it provides a contact surface which a user presses and it forms part of the sealing mechanism. The haptic button assembly 1200 comprises button 1202, intermediate moveable element 1206 and one or more ball bearings 1208, which are provided in a cavity of the housing 1204 of the assembly. The haptic button assembly shown here is similar to that shown in FIG. 4 and comprises localised ramps on both the button 1202 and the moveable element 1206. At least one ball bearing 1208 is provided between pairs of localised ramps, as shown. The button 1202 comprises a lip 1212 that extends all the way around the button. The housing 1204 comprises a corresponding ledge or groove 1210, and the lip 1212 of the button may engage with the ledge 1210 of the housing 1204. The ledge 1210 may, for example, restrict the movement of the button 1202 into the cavity of the housing 1204, and thereby providing a sealing effect. The button 1202 may be formed of a thick flexible material, such that the button 1202 flexes when the button is pressed and when the intermediate moveable element 1206 is actuated. The button 1202 may be moulded from a flexible material. The button 1202 may be formed of a material which is impermeable to liquid, such that the sealing mechanism protects the haptic button assembly against fluid ingress. The button 1202 may be bonded to the housing 1204—the lip 1212 may be fixedly attached to the ledge 1210 of the housing 1204, thereby providing a seal. The sealing mechanism may comprise an adhesive or an adhesive element to fixedly attach the button 1202 to the housing 1204. The button 1202 may deflect sufficiently to enable the button to move within the haptic button assembly. The button 1202 may provide a return force to return the button to its default, rest state when the intermediate moveable element 1206 is not being actuated to deliver a haptic sensation.

FIG. 12B shows a portion of a haptic button assembly 1220 comprising a sealing mechanism which is non-structural and functions only when the button is not in use, because when the button moves upwards, the seal is broken. Here, button 1222 of the haptic button assembly performs two functions—it provides a contact surface which a user presses, and it forms part of the sealing mechanism. The haptic button assembly 1220 comprises button 1222, intermediate moveable element 1226 and one or more ball bearings 1228, which are provided in a cavity of the housing 1224 of the assembly. Compared to FIG. 12A, the embodiment shown in FIG. 12B comprises one or more localised ramps on one surface only, i.e. on the button 1222 or the intermediate moveable element 1226. In the arrangement shown in FIG. 12B, the intermediate moveable element 1226 comprises at least one localised ramp. At least one ball bearing 1228 is provided between the ramp of the intermediate moveable element 1226 and the button 1222. The intermediate moveable element 1226 may comprise one or more supports 1234 which extend towards and support the button 1222.

The button 1222 comprises a lip 1232 that extends all the way around the button. The housing 1224 comprises a corresponding ledge or groove 1230, and the lip 1232 of the button may engage with the ledge 1230 of the housing 1224. The ledge 1230 may, for example, restrict the movement of the button 1222 into the cavity of the housing 1224, and thereby providing a sealing effect. The button 1222 may be formed of a thin layer of material, such that the button 1222 flexes when the button is pressed and when the intermediate moveable element 1226 is actuated. The button 1222 may be moulded from a flexible material, or may be formed from a thin metallic film or layer. The button 1222 may be formed of a material which is impermeable to liquid, such that the sealing mechanism protects the haptic button assembly against fluid ingress. The button 1222 may be bonded to the housing 1224—the lip 1232 may be fixedly attached to the ledge 1230 of the housing 1224, thereby providing a seal. The sealing mechanism may comprise an adhesive or an adhesive element to fixedly attach the button 1222 to the housing 1224. The button 1222 may deflect sufficiently to enable the button to move within the haptic button assembly. The button 1222 may provide a return force to return the button to its default, rest state when the intermediate moveable element 1226 is not being actuated to deliver a haptic sensation.

FIG. 12C shows a portion of a haptic button assembly 1240 comprising a sealing mechanism which is structural and functions at all times (i.e. both when the button is in motion and is not in motion). Here, button 1242 of the haptic button assembly performs two functions—it provides a contact surface which a user presses and it forms part of the sealing mechanism. The haptic button assembly 1240 comprises button 1242, intermediate moveable element 1246 and one or more ball bearings 1248, which are provided in a cavity of the housing 1244 of the assembly. Compared to FIG. 12B, the embodiment shown in FIG. 12C comprises one or more localised ramps on one surface only, i.e. on the button 1242 or the intermediate moveable element 1246. In the arrangement shown in FIG. 12C, the intermediate moveable element 1246 comprises at least one localised ramp. At least one ball bearing 1248 is provided between the ramp of the intermediate moveable element 1246 and the button 1242. The button 1242 comprises a lip 1252 that extends all the way around the button. The housing 1244 comprises a corresponding ledge or groove 1250, and the lip 1252 of the button may engage with the ledge 1250 of the housing 1244, optionally via an O-ring 1258. The O-ring 1248 is provided on ledge 1250 of the housing and between the ledge and the lip 1252 of the button. In embodiments, the O-ring 1258 may be replaced by any suitable internal seal, that is able to prevent ingress of dirt and liquid into the housing of the button assembly. For example, internal seal 1258 could be a flexible Y-shaped seal, flexible C-shaped seal, flexible hollow O-ring, etc. The ledge 1250 may, for example, restrict the movement of the button 1242 into the cavity of the housing 1244, and thereby providing a sealing effect. The button 1242 (or at least the contactable/pressable portion of the button) may be formed of a thin layer of material, such that the button 1242 flexes when the button is pressed and when the intermediate moveable element 1246 is actuated. The button 1242 may be moulded from a flexible material, or may be formed from a thin metallic film or layer. The button 1242 may be formed of a material which is impermeable to liquid, such that the sealing mechanism protects the haptic button assembly against fluid ingress. The internal seal 1258 provides an additional barrier against dirt or fluid ingress.

The button assembly 1240 may comprise a flexure 1252 or similar flexible element provided below the button 1242. The flexure 1252 extends across the cavity of the button assembly below the button 1242, and is attached along its edge(s) to an internal surface of the housing 1244. Thus, flexure 1252 may function as a further barrier against dirt or fluid ingress. The flexure 1252 is flexible and is therefore able to flex when the button 1242 moves in and out of the cavity of the housing 1244. A gap 1260 between the flexure 1252 and the housing 1244 may be provided to provide a space into which the flexure 1252 can flex/bend into when the button 1242 moves upwards. Accordingly, when a flexure 1252 is provided, ball bearing 1248 is provided between the ramp of the intermediate moveable element 1246 and the flexure 1252 below the button 1242. The button 1242 may be bonded to the housing 1244—the lip 1252 may be fixedly attached to the ledge 1250 of the housing 1244, thereby providing a seal. The sealing mechanism may comprise an adhesive or an adhesive element to fixedly attach the button 1242 to the housing 1244. The button 1242 may deflect sufficiently to enable the button to move within the haptic button assembly. The button 1242 may provide a return force to return the button to its default, rest state when the intermediate moveable element 1246 is not being actuated to deliver a haptic sensation.

FIGS. 13A and 13B show cross-sectional views of two mechanisms for sealing a haptic button assembly.

FIG. 13A shows a portion of a haptic button assembly 1300 comprising a sealing mechanism which is non-structural and functions at all times (i.e. both when the button is in motion and is not in motion). The sealing mechanism comprises an O-ring type of seal 1310. The O-ring 1310 is provided between button 1302 and housing 1304 of the haptic button assembly 1300. The cavity comprises button 1302, intermediate moveable element 1306 and one or more ball bearings 1308. The haptic button assembly shown here is similar to that shown in FIG. 4 and comprises localised ramps on both the button 1302 and the moveable element 1306. It will be understood however, that the localised ramp(s) could be more generally provided on one or both of the button 1302 and the moveable element 1306 (see e.g. FIG. 12C). At least one ball bearing 1308 is provided between pairs of localised ramps, as shown. The O-ring 1310 constrains the edges of button 1302 within the housing 1304 of the button assembly. The 1310 may permit some movement or flexing of the button 1302 in and out of the housing 1304, but prevents or minimises lateral (sideways) movement of the button 1302 in the housing. The O-ring 1310 forms a tight seal between the button 1302 and the housing 1304 and thereby protects the haptic button assembly against fluid and dirt ingress.

FIG. 13B shows a portion of a haptic button assembly 1350 comprising a sealing mechanism which is structural and functions at all times (i.e. both when the button is in motion and is not in motion). The sealing mechanism comprises an internal seal 1360. The internal seal 1360 is provided between button 1352 and housing 1354 of the haptic button assembly 1350. The cavity comprises button 1352, intermediate moveable element 1356 and one or more ball bearings 1358. The haptic button assembly shown here is similar to that shown in FIG. 4 and comprises localised ramps on both the button 1352 and the moveable element 1356. It will be understood however, that the localised ramp(s) could be more generally provided on one or both of the button 1352 and the moveable element 1356 (see e.g. FIG. 12C). At least one ball bearing 1358 is provided between pairs of localised ramps, as shown. The internal seal 1360 is provided across a portion of both the button 1352 and the cavity of the housing 1354. Specifically, the internal seal 1360 is provided where edges of the button 1352 and cavity meet. The internal seal 1360 is provided below the button 1352 and within the cavity such that it cannot be seen from the outside of the button assembly 1350. The internal seal 1360 may be ring shaped, for example. The internal seal 1360 may be attached to both the cavity and the button 1352 such that when button 1352 moves within the cavity, the seal 1360 prevents or minimises ingress of dirt and fluid into the cavity. The internal seal 1360 may be formed of a flexible material to enable the button 1352 to move within the cavity to deliver a haptic sensation.

FIG. 14 shows a cross-sectional view of a portion of an eleventh haptic button assembly 1400 comprising a sealing mechanism which is structural and functions at all times (i.e. both when the button is in motion and is not in motion). The arrangement is similar to that shown in FIG. 12C. Here, the O-ring type internal seal 1310 shown in FIG. 12C may be replaced with a Y-shaped flexible internal seal, C-shaped seal or hollow O-ring 1410. The haptic button assembly 1400 comprises button 1402, intermediate moveable element 1406 and one or more ball bearings 1408, which are provided in a cavity of the housing 1404 of the assembly. The haptic button assembly shown here comprises localised ramps on both the button 1402 and the moveable element 1406. It will be understood however, that the localised ramp(s) could be more generally provided on one or both of the button 1402 and the moveable element 1406 (see e.g. FIG. 12B). At least one ball bearing 1408 is provided between pairs of localised ramps, as shown.

The button 1402 comprises a notch 1414 along one or more surfaces of the button which are within the cavity of the housing 1404. The notch 1414 may, for example, be a circumferential notch provided around a surface of the button 1402. The housing 1404 comprises a groove or notch 1412 in one or more surfaces of the cavity of the housing. The groove 1412 may be, for example, a circumferential groove provided around a surface of the cavity. The Y-shaped flexible internal seal 1410 comprises a portion which extends into the notch 1414 of the button 1402, and a portion which extends into the groove 1412 of the cavity wall. In the arrangement depicted in FIG. 14, the stem portion of the Y-shaped seal is provided in the notch 1414 and the fork or V portion of the Y-shaped seal is provided in the groove 1412. (It will be understood that, alternatively, the step portion may be provided in groove 1412 and the fork portion in the notch 1414). The stem portion of the Y-shaped seal 1410 may be fixedly attached in notch 1414, and each end of the fork portion may be fixedly attached in groove 1412. The Y-shaped seal 1410 is formed of a flexible material such that when the button 1402 moves up and down in the cavity, the seal stretches and continues to prevent ingress of fluid and dirt into the cavity. The Y-shaped seal 1410 may also function as a spring or resilient element because when one of the prongs of the fork portion is compressed, the other prong is stretched and provides a return force.

FIG. 15 shows a cross-sectional view of a portion of a twelfth haptic button assembly 1500 comprising a sealing mechanism which is structural and functions at all times (i.e. both when the button is in motion and is not in motion). The haptic button assembly 1500 comprises a button 1502 and a housing 1504. In this case, the button 1502 is part of the housing 1504. The housing 1504 may comprise at least a portion which is flexible and pressable and therefore provides the button 1502 of the assembly 1500. The assembly comprises an intermediate moveable element 1506 and one or more ball bearings 1508. The haptic button assembly comprises localised ramps on both the button 1502 (i.e. the button portion of the housing 1504) and the moveable element 1506. At least one ball bearing 1508 is provided between pairs of localised ramps, as shown. Advantageously, by forming the button 1502 as part of the housing 1504, there is no gap between the button and the housing and therefore, a sealing mechanism is not required. This may also provide a cheaper and simpler assembly to manufacture. The housing 1504 may be formed of a flexible material such that when the intermediate moveable element 1506 is actuated, the button portion 1502 flexes and provides a haptic sensation. Alternatively, the housing 1504 may be formed of a material which is not generally flexible unless it is provided as a thin layer. Thus, the button 1502 may be thinner than the rest of the housing 1504 such that the button portion is flexible. For example, at least the button 1504 may be formed from a thin layer of metal, e.g. a 50 μm thick layer of aluminium, or of stainless steel or of flexible/deformable glass.

Similarly, returning briefly to FIG. 16, the assembly 1600 comprises a sealing mechanism (i.e. the housing 1604) which is structural and functions at all times (i.e. both when the button is in motion and is not in motion).

It will be understood that any of the sealing mechanisms described herein may be used with any of the haptic button assemblies described herein. Many of the sealing mechanisms described above are independent of the curvature of surface/edge of the device into which the haptic button assembly is incorporated.

SMA Actuator Wire Arrangements

As mentioned earlier, the haptic button assemblies described with reference to FIGS. 1 to 8 may comprise an SMA actuator wire and a return spring coupled to the same edge of the intermediate moveable element, but this is a non-limiting arrangement and other arrangements are possible. For example, the haptic button assemblies may comprise two or more SMA actuator wires. The SMA actuator wires may all be parallel to each other. The SMA actuator wires may all act in the same direction (i.e. they may, on contraction, cause the intermediate moveable element to move in the same direction), which may advantageously increase the force applied to the intermediate moveable element. Each wire of the two or more SMA actuator wires may be driven in unison or may be separately driveable. If each wire is separately driveable, the force applied to the intermediate moveable element may be variable and thus, the haptic sensation delivered to a user may be varied (e.g. may be made softer or stronger). Alternatively, one or more of the SMA actuator wires may act in the opposite direction to one or more of the remaining SMA actuator wires. In this case, as mentioned earlier, SMA actuator wires may be used to provide a reversed or return force, and may thereby replace the return spring. The SMA actuator wire or wires may, in embodiments, run alongside the intermediate moveable element. That is, the SMA actuator wire(s) may be coupled to and extend across a side of the intermediate moveable element, instead of being coupled to an edge and extending into the further cavity. Advantageously, such an arrangement of SMA actuator wires may reduce the width or length of the haptic button assembly, as the further cavity is no longer required.

Figure 9B:
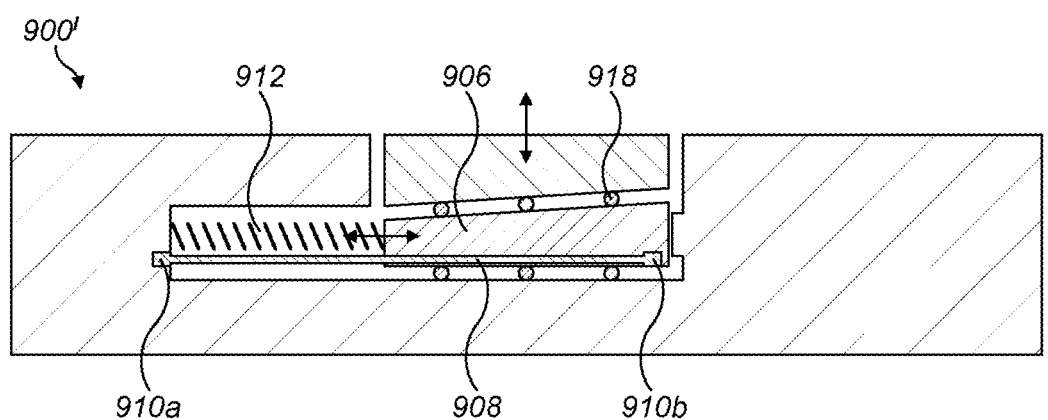
FIGS. 9B, 9C and 9D show various arrangements of SMA actuator wire.
Figure 9C:
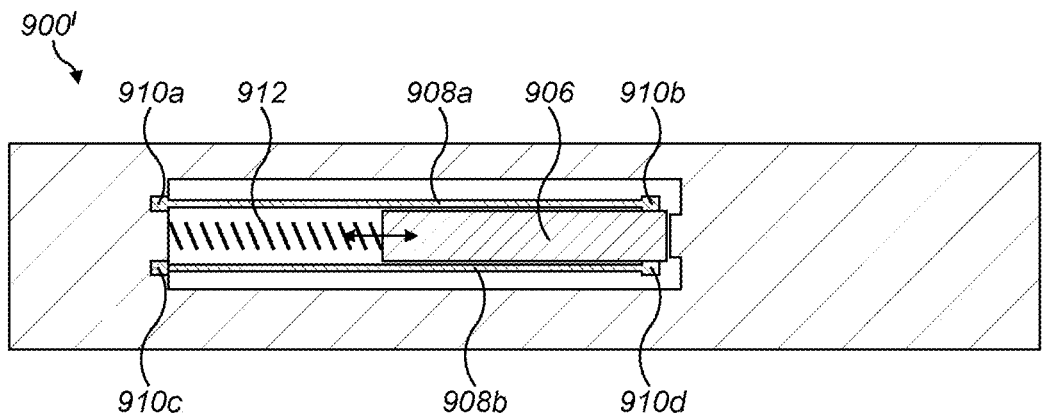
Figure 9D:
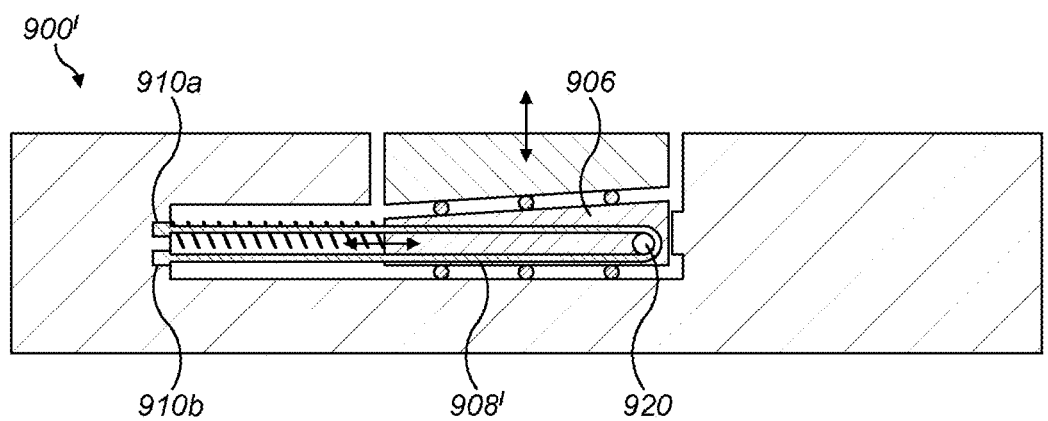

Example arrangements of SMA actuator wires are described below with reference to FIGS. 9B to 9D. FIGS. 9B, 9C and 9D show various arrangements of SMA actuator wire in a haptic button assembly 900'. Generally speaking, the force available to move the intermediate moveable element may be proportional to the number of SMA actuator wires provided in a mechanically parallel arrangement in the assembly. Furthermore, the overall stroke of the actuation mechanism in the assembly may depend on the length of the SMA actuator wire(s)—longer SMA actuator wires generally provide increased stroke. Generally, the wire arrangements may comprise parallel wires that are mechanically in parallel but electrically in series (e.g. wire loops), parallel wires that are both mechanically and electrically in series/parallel, parallel wires that are mechanically in series but electrically in parallel, or independently driven opposing wires.

The haptic button assembly 900' is similar to the arrangement shown in FIG. 1 and therefore, for the sake of conciseness, like features are not described. In the haptic button assembly 900', at least one SMA actuator wire 908 runs along at least one side of intermediate moveable element 906, instead of being coupled to an edge and extending into the further cavity (see FIG. 9A, for example). Thus, compared to e.g. FIG. 9A, the stroke of the actuation mechanism of FIGS. 9B-D is greater because the SMA actuator wire is longer. In FIG. 9B, the haptic button assembly 900' comprises at least one SMA actuator wire 908, where the or each wire is coupled at one end to the intermediate moveable element 906 via a connector or crimp 910b, and at another end to the housing 904 via a connector or crimp 910a. Thus, a large portion of the at least one SMA actuator wire 908 is parallel to a side of the intermediate moveable element 906. A return spring 912 may be coupled between the intermediate moveable element 906 and the housing 904. One or more ball bearings 918 may be provided between button 902 and the intermediate moveable element 906, and between the intermediate moveable element 906 and the housing 904, as described above with reference to any of FIGS. 1 to 8. This arrangement of SMA actuator wire(s) 908 may provide a more compact haptic button assembly.

FIG. 9C shows a plan view of a haptic assembly comprising two parallel SMA actuator wires. As mentioned above, the haptic button assembly 900' may comprise at least one SMA actuator wire 908. In FIG. 9C, the haptic button assembly is shown to comprise two parallel SMA actuator wires 908a, 908b which are coupled to (and extend across) opposite sides of the intermediate moveable element 906. The two SMA actuator wires 908a, 908b may act in the same direction (i.e. may apply a force to the intermediate moveable element in the same direction), or may act in opposite directions. In the former case, the two SMA actuator wires advantageously provide twice the force of a single wire, while in the latter case, the wires may remove the need for return spring 912. A first SMA actuator wire 908a is coupled at one end to the intermediate moveable element 906 via a connector or crimp 910b, and at another end to the housing 904 via a connector or crimp 910a. A second SMA actuator wire 908b is coupled at one end to the intermediate moveable element 906 via a connector or crimp 910d, and at another end to the housing 904 via a connector or crimp 910c.

FIG. 9D shows a variation of the assembly 900 depicted in FIG. 9B. Here, a single SMA actuator wire 908' is hooked at its midpoint over a hook 920 provided on a side of the intermediate moveable element 906. The two halves of the SMA actuator wire 908' mechanically act in parallel and therefore, the SMA actuator wire 908' may provide twice the force of a single wire. This may be advantageous relative to FIG. 9C because only one set of connectors/crimps are required to couple the SMA actuator wire 908' to the intermediate moveable element 906 and housing 904. Further advantageously, both of the connectors 910a, 910b are provided on the housing 904. As the SMA actuator wire 908' needs to be powered, the connectors 910a, 910b are electrical connectors (to connect the SMA actuator wire to a power supply), and therefore, the arrangement of FIG. 9D simplifies the connections and circuitry to power the wire 908'.

It will be understood that any of the haptic assemblies described herein may comprise SMA actuator wire(s) which is either under tension or which is slack. In some cases, when a user presses the button, the force exerted by the user on the button may cause the SMA actuator wire(s) to be stretched. This may mean a required pre-load is applied to the SMA actuator wire(s) to achieve an optimal phase transformation when the SMA actuator wire(s) is powered. The force applied by the user may cause the SMA actuator wire to be stretched to its original length. When the user applies a force to the button, the intermediate moveable element may be forced to move laterally/horizontally such that the SMA actuator wire stretches. In some cases, the SMA actuator wire may be considered to be slack when the length of the SMA actuator wire between two coupling elements (e.g. crimp connector or welded component) is longer than the distance between the two coupling elements when no external load is applied to the button/intermediate moveable element by a user (e.g. the system is in equilibrium) at ambient temperature (which may, in some cases be, 25° C.). More particularly, the SMA actuator wire may be considered to be slack when the length of the SMA actuator wire between two coupling elements is longer than the distance between the two coupling elements when the intermediate moveable element abuts against an endstop within the cavity.

In some cases, the SMA actuator wire(s) may be much longer than the distance between the two coupling elements when no external load is applied/the system is in equilibrium, at ambient temperature (which may, in some cases be, 25° C.). In other words, the SMA actuator wire may not always be in tension.

In some cases, the SMA actuator wire(s) may be much shorter than the distance between the two coupling elements when no external load is applied/the system is in equilibrium, at ambient temperature (which may, in some cases be, 25° C.). In other words, the SMA actuator wire may always be in tension.

In some cases, the SMA actuator wire(s) may have a precise amount of slack, at ambient temperature (which may, in some cases be, 25° C.). For example, the distance between the two coupling elements when no external load is applied/the system is in equilibrium may be 7.5 mm, and the length of SMA actuator wire may be 7.5 mm plus a precise amount of slack. The amount of slack may be between a few microns and no more than a few tens of microns.

Thus, in embodiments, the at least on SMA actuator wire may be slack.

The SMA actuator wire(s) used in any of the haptic assemblies described herein may be uncoated, or may be coated with an electrically insulating layer/coating. In some cases, the SMA actuator wire may be coated with an electrically insulating layer of thickness in the range from 0.3 μm to 10 μm. The electrically insulating layer may coat the entire length of each SMA actuator wire or a part of the length of each SMA actuator wire. Techniques for providing the coated SMA actuator wire are described in WO2015/036761. Although WO2015/036761 describes the use of coated wire or partly-coated wire in miniature cameras, it will be understood that the techniques described therein may be utilised in other applications, such as haptics.

Gapless Designs

Various techniques for sealing a haptic assembly have been described above. Alternatively, haptic assemblies which are gapless (or partly gapless, or gapless when not in use), are now described. The truly gapless haptic assemblies may not require any additional sealing mechanisms. The haptic assemblies which are partly gapless or gapless when not in use may require additional sealing mechanisms, such as those described above, in order to provide sealing.

The term "gapless" is used herein to generally mean any haptic assembly in which there is no gap between the button/moveable component and the housing. The term "gapless" is used interchangeably herein with the term "truly gapless".

The term "partly gapless" is used herein to mean a haptic assembly in which there is no visible gap or which appears to be gapless, but in which there is actually a gap between the button/moveable component and the housing. In some cases, the gap may only become visible when the button/moveable component is being actuated to deliver a haptic sensation. The term "partly gapless" is used interchangeably herein with the terms "gapless when not in use", "near gapless", "unibody", "apparently gapless", and "no visible gap". In some cases, a device such as a smartphone may be formed from two or more pieces/components to provide an apparently unibody or gapless device. As described below, a haptic assembly may be provided within a device such as the gap or join line between the pieces/components of the device are used to provide a gap between the button/moveable component and the housing of the haptic assembly.

FIGS. 21A and 21B respectively show cross-sectional views of a gapless haptic assembly 2100 in an equilibrium state and in an activated state. The haptic assembly 2100 may be coupled to a flexible piece of material 2106. The flexible piece of material 2106 may be, for example, a flexible portion of a casing of a smartphone or of a housing of a consumer electronics device, or may be a flexible display screen or flexible surface. It will be understood that these are merely exemplary. Alternatively, the flexible piece of material 2106 may be part of the haptic assembly 2100 itself. It will also be understood that the flexible piece of material may be replaced by a button of the type shown in FIG. 1, for example, such that the haptic assembly is used to move the button. Thus, the haptic assembly 2100 may be gapless, apparently gapless or to have a visible gap, depending on other design criteria.

The haptic assembly 2100 comprises a first moveable arm 2102a which is fixedly connected at a first end 2112 to the flexible piece of material 2106, and rotatably/moveably connected at a second end via a hinge 2110 (or similar) to a first end of a second moveable arm 2102b. The second moveable arm 2102b is fixedly connected at a second end to a static component 2104. The haptic assembly 2100 comprises a third moveable arm 2102c which is fixedly connected at a first end 2112 to the flexible piece of material 2106, and rotatably connected at a second end via a hinge 2110 (or similar) to a first end of a fourth moveable arm 2102d. The fourth moveable arm 2102d is fixedly connected at a second end to the static component 2104. At least one SMA actuator wire 2108 is connected to the pins 2110. The at least one SMA actuator wire 2108 is arranged such that when the wire(s) contract(s) (on heating), the angle between the first moveable arm 2102a and the second moveable arm 2102b increases, and the angle between the third moveable arm 2102c and the second moveable arm 2102d increases. In other words, the ends of the first and second moveable arms which are connected to the moveable component 2106 and static component 2104 move further apart, and the ends of the third and fourth moveable arms which are connected to the moveable component 2106 and static component 2104 move further apart. As a result, the first moveable arm 2102a and third moveable arm 2102c pushes upwards against the flexible piece of material 2106, causing the flexible piece of material 2106 to bend/deflect in the direction of arrow A, as shown in FIG. 21B. When the at least one SMA actuator wire 2108 is cooled, the moveable arms 2102a-d return to their equilibrium state, which causes the flexible piece of material to move downwards and return to being substantially flat, as shown in FIG. 21A. In some cases, the haptic assembly 2100 may comprise an additional resilient element (e.g. a return spring or an opposing SMA actuator wire) to provide a return force. In some cases, the force of a user's finger may be sufficient to provide a return force, such that an SMA actuator wire or return spring is not required to return the moveable component 2106 to an equilibrium position.

It will be understood that at least one of the two pivot points (hinges 2110) must be able to move in a direction parallel to the length of the SMA actuator wire 2108. If only one side is free to translate, the button will 'tilt'. Otherwise, it will move upwards symmetrically about the line of symmetry of the mechanism.

It will be understood that the first and second moveable arms may be a flexure, and the third and fourth moveable arms be another flexure.

If the flexible piece of material 2106 is a part of the casing of a smartphone, for example, the haptic assembly 2100 may be advantageous because the design may be configured to be gapless when compared to, for example, the embodiments which comprise a wedge-shaped button and/or intermediate moveable element (e.g. FIGS. 1 to 3). This means that the device containing the haptic assembly 2100 may be substantially dust-proof and/or water-proof.

FIG. 23A shows a cross-sectional view of a gapless haptic assembly 2300, and FIGS. 23B to E show cross-sectional views of a flexible portion of the gapless haptic assembly 2300 of FIG. 23A. The haptic assembly 2300 may be incorporated into or otherwise provided along an edge of an electronic device or on a surface of an electronic device. The haptic assembly 2300 may be arranged to move a flexible portion of a casing of a smartphone or of a housing of a consumer electronics device, for example. The haptic assembly 2300 may be provided as a standalone module that may be incorporated into an electronic device during manufacturer. Alternatively, some or all of the components of the haptic assembly 2300 may be integrally formed in an electronic device.

The haptic assembly 2300 comprises a housing 2304. The housing 2304 is shaped (e.g. by forming, etching, or otherwise), to comprise a button portion 2302 and a flexible portion 2312. The flexible portion 2312 is connected to the button portion 2302 such that it surrounds the button portion 2302. The flexible portion may be formed of thinner material than the button portion 2302 to provide the flexibility. The button portion 2302 comprises a contact surface 2306. In embodiments, the contact surface 2306 may be substantially level with/flush with an external surface 2308 of the housing 2304 when the haptic assembly is in an equilibrium state.

The haptic assembly 2300 comprises an intermediate moveable element 2310 similar to that shown in FIG. 22, and for the sake of simplicity, the features and operation of the intermediate moveable element will not be described again. When the intermediate moveable element 2310 moves, the button portion 2302 of the housing is caused to move within/relative to the housing 2304. The button portion 2302 is able to move because the flexible portion 2312 is flexible. The haptic assembly 2300 is advantageous because the button portion 2302 is part of the housing 2304 such that there is no external gap between the button portion and the housing 2304 when the haptic assembly 2300 is intergrated into devices such as a smartphone. Thus, the haptic assembly 2300 is substantially water-proof and/or dust-proof.

Figure 23B:
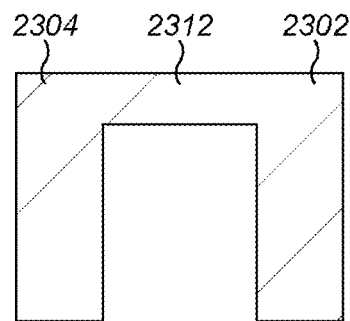
Figure 23C:
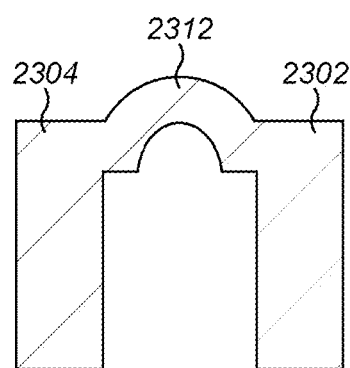
Figure 23D:
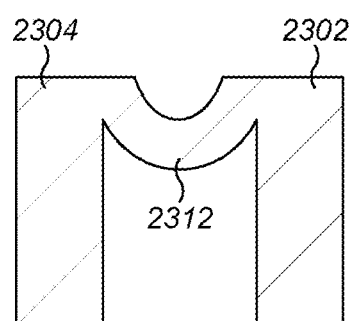
Figure 23E:
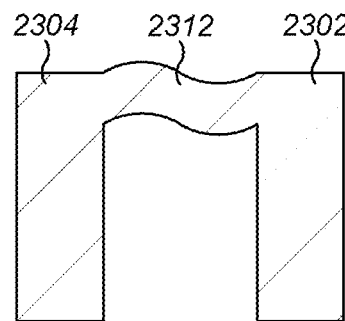
Figure 23F:
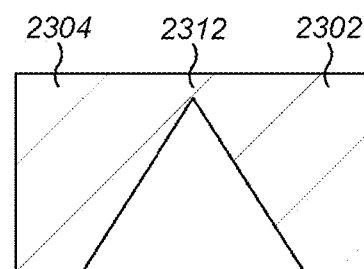
Figure 23G:
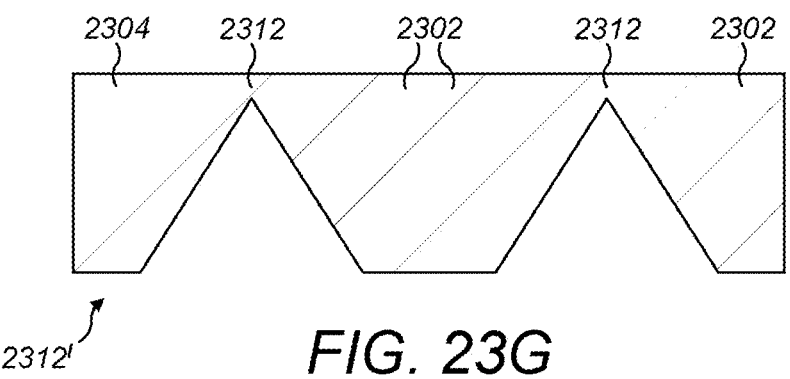

As shown in FIGS. 23B to 23D the flexible portion 2312 may take on various forms. In FIG. 23B, the flexible portion 2312 is simply thinner than the button portion 2302. This may be useful as it may enable a smooth edge or surface to be provided when the haptic assembly 2300 is integrated into a device such as a smartphone. In other words, this form of the flexible portion 2312 may be the most aesthetically-pleasing to a user. However, as the flexible portion 2312 needs to flex to enable the button portion 2302 to move, it may be useful for the flexible portion 2312 to have a non-linear profile. In other words, it may be useful for the flexible portion 2312 to be shaped in some way or to comprise one or more bends/curves, which provide the flexible portion 2312 with the structure to enable it to flex easily. Thus, in FIG. 23C, the flexible portion 2312 is dome-shaped, while in FIG. 23D, the flexible portion is dimple- or well-shaped. In FIG. 23E, the flexible portion 2312 has a wavy or undulating form. In FIG. 23F, the flexible portion 2312 may comprise a point about which the flexible portion may bend/flex. It may be advantageous to provide more than one flexible portion 2312 on either side of the button 2302, to further reduce stiffness/increase the flexibility of the flexible portion. For example, it may be useful to combine any of the flexible portions 2312 shown in FIGS. 23B to 23F in a series combination on either side of the button 2302. An example of this is shown in FIG. 23G—here, two of the flexible portions 2312 shown in FIG. 23F are combined to form a larger combined flexible portion 2312'. This larger combined flexible portion 2312' may be provided on either side of the button 2302. It will be understood that different shaped flexible portions 2312 may be combined in series to form the combined flexible portion 2312'.

FIG. 24 shows a cross-sectional view of a partly gapless haptic assembly 2400. The haptic assembly 2400 may be incorporated into or otherwise provided along an edge of an electronic device or on a surface of an electronic device. The haptic assembly 2400 may be arranged to move a flexible portion of a casing of a smartphone or of a housing of a consumer electronics device, for example. The haptic assembly 2400 may be provided as a standalone module that may be incorporated into an electronic device during manufacturer. Alternatively, some or all of the components of haptic assembly 2400 may be integrally formed in an electronic device.

The haptic assembly 2400 may comprise a housing 2404. In this case, the haptic assembly 2400 may be a module which is incorporated into an electronic device. Alternatively, the housing 2404 may be part of an electronic device (and not part of the haptic assembly) into which the components of the haptic assembly 2400 are incorporated. In this case, the electronic device may be more aesthetically pleasing to a user because the edge or surface of the electronic device where the haptic assembly 2400 is located may be substantially smooth and nearly gapless/apparently gapless. This may allow an electronic device to be produced which has smooth edges/surfaces that do not have protruding buttons. Instead of having a visible, protruding button, the haptic assembly 2400 may provide haptic feedback when a user contacts (or is in the vicinity of) a 'non-protruding button' of the haptic assembly.

The housing 2404 (whether it is part of the haptic assembly 2400 or otherwise) comprises a (non-protruding) button portion 2402. One or more edges of the button portion 2402 may be connected to the housing 2404. In the embodiment shown in FIG. 24, at least one edge of the button portion 2402 is not connected to the housing 2404. This allows the button portion 2402 to move relative to the housing 2404 (as indicated by the arrow) when the haptic assembly 2400 is activated. The button portion 2402 may comprise a thinner hinge portion 2410. The hinge portion 2410 of the button portion 2402 may be thinner than the rest of the button portion, such that the button portion 2402 is able to move/flex about the hinge portion 2410. In other words, the thinner hinge portion 2410 may provide the button portion 2402 with the flexibility to move relative to the housing 2402. The hinge portion 2410 may be provided by machining, forming, etching or half-etching the button portion 2402 to remove material. The button portion 2402 comprises a contact surface. The contact surface may be substantially level with/flush with an external surface of the housing 2402 when the haptic assembly is in an equilibrium state.

The haptic assembly 2400 comprises an intermediate moveable element 2406 similar to that shown in FIG. 22, and for the sake of simplicity, the features and operation of the intermediate moveable element will not be described again. When the intermediate moveable element 2406 moves, the button portion 2402 of the housing is caused to move within/relative to the housing 2404. The button portion 2402 is able to move because the hinge portion 2410 provides some flexibility to the button portion. At least one bearing 2408 (e.g. a ball bearing—see also the definition above of the term 'bearing') is disposed between the button portion 2402 and the intermediate moveable element 2406. The at least one bearing 2408 may facilitate the lateral movement of the button portion 2402 when the intermediate moveable element 2406 moves. The haptic assembly 2400 may be advantageous because the button portion 2402 is part of, and connected to the housing 2404 such that there is a reduced external gap between the button portion and the housing 2404 when the haptic assembly 2400 is integrated into a device such as a smartphone. For example, if the button portion 2402 is connected to the housing 2404 by three of its four edges (such that only one edge of the button portion 2402 is free and unconnected to the housing), the gap is much reduced compared to, for example, the embodiment of FIG. 1. Furthermore, the gap may be minimal (and potentially even difficult to see/not easily visible) when the haptic assembly 2400 is in an equilibrium state. When the haptic assembly 2400 is in an active state and the button portion 2402 is moving relative to the housing 2404, the gap may be larger and more visible. Thus, the haptic assembly 2400 may reduce the possibility of dust and/or water ingress into the device at least when then haptic assembly is in the equilibrium state.

FIG. 25 shows a cross-sectional view of a gapless haptic assembly 2500. The haptic assembly 2500 may be incorporated into or otherwise provided along an edge of a smartphone or on a surface of a smartphone. The haptic assembly 2500 may be a provided as a standalone module that may be incorporated into an electronic device during manufacture. Alternatively, some or all of the components of haptic assembly 2500 may be integrally formed in an electronic device.

The haptic assembly 2500 may comprise a housing 2504. In this case, the haptic assembly 2500 may be a module which is incorporated into an electronic device. Alternatively, the housing 2504 may be part of an electronic device (and not part of the haptic assembly) into which the components of the haptic assembly 2500 are incorporated. In this case, the electronic device may be more aesthetically pleasing to a user because the edge or surface of the electronic device where the haptic assembly 2500 is located may be substantially smooth and gap-free. This may allow an electronic device to be produced which has smooth edges/surfaces that do not have protruding buttons. Instead of having a visible, protruding button, the haptic assembly 2500 may provide haptic feedback when a user contacts (or is in the vicinity of) a 'non-protruding button' of the haptic assembly.

The housing 2504 (whether it is part of the haptic assembly 2500 or otherwise) comprises a (non-protruding) button portion 2502. All of the edges of the button portion 2502 may be connected to the housing 2504. However, the button portion 2502 is thinner than the rest of the housing 2504— this allows the button portion 2502 to move relative to the housing 2504 (as indicated by the arrow) when the haptic assembly 2500 is activated. In other words, the thickness of the button portion 2502 may provide the button portion 2502 with the flexibility to move relative to the housing 2502. The button portion 2502 may be provided by machining, stamping, etching or half-etching the housing 2502 to remove material. The button portion 2502 comprises a contact surface. The contact surface may be substantially level with/flush with an external surface of the housing 2502 when the haptic assembly is in an equilibrium state.

The haptic assembly 2500 comprises an intermediate moveable element 2506 similar to that shown in FIG. 22, and for the sake of simplicity, the features and operation of the intermediate moveable element will not be described again. When the intermediate moveable element 2506 moves, the button portion 2502 of the housing is caused to move within/relative to the housing 2504. At least one bearing 2508 (e.g. a ball bearing or plain bearing) may be disposed between the button portion 2502 and the intermediate moveable element 2506. The at least one bearing 2508 may facilitate the lateral movement of the button portion 2502 when the intermediate moveable element 2506 moves. Alternatively, the bearing 2508 may be replaced by some support mechanism to support the button portion on the actuator, as the button portion 2502 may be formed of a thin piece of material (i.e. may be formed by locally-thinning the housing 2504) and may be easily damaged or punctured if it is not supported. The haptic assembly 2500 may be advantageous because the button portion 2502 is part of the housing 2504 such that there is no gap between the button portion and the housing 2504 when the haptic assembly 2500 is integrated into a device such as a smartphone. Thus, the haptic assembly 2500 is substantially water-proof and/or dust-proof.

As mentioned above with reference to FIGS. 24 and 25, the button or moveable element of the haptic assemblies may be part of the housing itself. In FIG. 24, the button portion is connected along at least one edge to the housing, while in FIG. 25, the button portion is completely connected to the housing. Turning to FIG. 26, this shows schematic diagrams of gapless and partly gapless haptic assemblies. Specifically, FIG. 26 shows schematic plan views of the moveable element (or button or button portion) of five haptic assemblies 2600-2614. In haptic assembly 2600, short edges 2604 of moveable element 2602 are mechanically connected to the housing (not shown) of the haptic assembly (i.e. are mechanically constrained), while long edges 2606 are mechanically constrained to be 'free'. When the haptic assembly 2600 is in the equilibrium state, the haptic assembly 2600 may appear 'gapless' and may be substantially water-proof and/or dust-proof. However, when the haptic assembly 2600 is activated and the moveable element 2602 moves, gaps between the moveable element 2602 and the housing may appear and therefore, the assembly may not be water- and/or dust-proof while the haptic assembly 2600 is delivering haptic feedback.

In haptic assembly 2608, the moveable element 2602 comprises only one 'free' long edge 2606. In haptic assembly 2610, the moveable element 2602 comprises no free edges, i.e. both the long edges and short edges are fixed. In haptic assembly 2612, the short edges 2604 of the moveable element 2602 are free while the long edges are fixed. In haptic assembly 2614, the moveable element 2602 comprises only one free short edge. Haptic assembly 2610, which has four fixed edges, is the stiffest and provides the most resistance against deflection by the intermediate moveable component (not shown), but is the only design which is water- and dust-proof in both the equilibrium and active states.

FIG. 27A shows a schematic perspective view of a smartphone 2700. The smartphone 2700 comprises one or more design features or functional features (such as antenna bands) provided around the smartphone. In the illustrated example, the smartphone 2700 comprises at least two such design features (e.g. antenna bands) 2704, 2708, which are located near the top and bottom edges of the smartphone (when held by a user in 'portrait mode'). The front and back faces of the smartphone 2700 may be formed from glass, while the sides/edges of the smartphone 2700 may be formed from three pieces/components 2702, 2706 and 2710 which may be moulded or otherwise formed as separate components and which are connected together in the manufacturing process. The three components 2702, 2706, and 2710 may be formed of aluminium, stainless steel, plastic or flexible/deformable glass. It will be understood that these are merely example materials. The three components are typically machined and then insert moulded into one piece, with the antenna bands provided between the sections. As shown, antenna band 2704 is located between components 2702 and 2706 (and may typically be moulded into components 2702 and 2706), and antenna band 2708 is located between components 2706 and 2710 (and may be moulded into components 2706 and 2710). In some cases, there is no gap (or significant gap) between the three components 2702, 2706 and 2710—there may be a seamless transition between the three components such that it appears that the edges of the smartphone (and possibly the entire smartphone) are formed from a single piece of material. In this instance, the smartphone may be gapless, particularly if there are no protruding mechanical buttons along the edges of the smartphone 2700. Accordingly, the smartphone may achieve an Ingress Protection (IP) Rating of 67 or 68 indicating the device is dust-proof and water-proof to some standard. In some cases, there may be a small gap either side of each antenna band 2704, 2708 of up to 20 µm for example, and in this instance the smartphone is not gapless. Accordingly, additional sealing techniques may be required to provide the smartphone with the required dust-proof and water-proof qualities, such as the sealing techniques described above.

FIG. 27B shows a schematic plan view of an edge of the smartphone of FIG. 27A, and FIGS. 27C-E show schematic cross-sectional views of the profile of a button portion 2706 of the smartphone of FIG. 27A. The button portion 2706 may be used to deliver haptic feedback to a user of the smartphone. The length of the button portion 2706 may be long—for example, the button portion 2706 may be nearly as long as a long edge of the smartphone 2700. A single haptic assembly/haptic actuator may not impart the required force to move the whole length of the button portion 2706 and thereby deliver an adequate haptic sensation to a user. Therefore, one or more haptic assemblies may be coupled to the button portion 2706 and arranged to deliver localised haptic feedback.

Figure 27C:
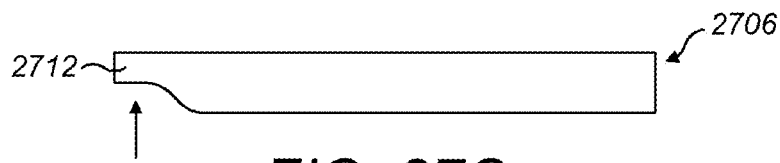

FIG. 27C shows how the button portion 2706 may be shaped to form a cantilever 2712. The cantilever 2712 is adjacent to antenna band 2704 and the gap between the button portion 2706 and component 2702. Accordingly, when a force is applied to the cantilever 2712 by a haptic actuator (as indicated by the arrow), the cantilever 2712 is able to move/tilt relative to the rest of the button portion 2706 and to the component 2702. Accordingly, the haptic assembly makes use of an existing gap in the smartphone 2700 to enable movement of the cantilever 2712 to deliver a haptic sensation.

Figure 27D:
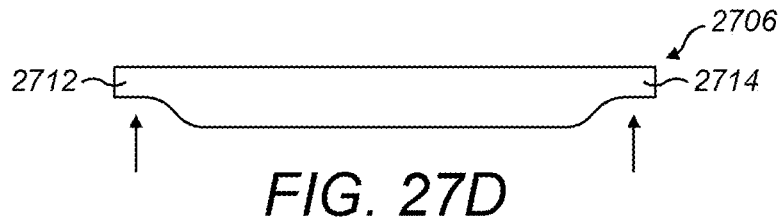

FIG. 27D shows how the button portion 2706 may be shaped to form a first cantilever 2712 and a second cantilever 2714. The second cantilever 2714 is adjacent to antenna band 2708 and the gap between the button portion 2706 and component 2710. The first and second cantilevers 2712, 2714 may be separately actuated by individual haptic actuators to deliver haptic feedback at different positions along the button portion 2706. In this way, localised haptic feedback may be delivered via button portion 2706.

Figure 27E:
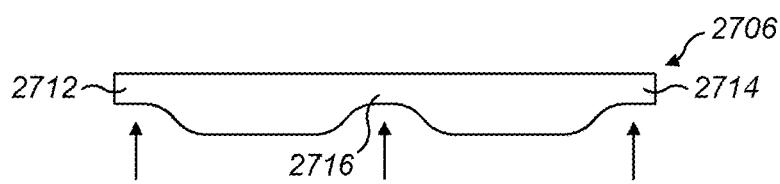

FIG. 27E shows how the button portion 2706 may be shaped to form a first cantilever 2712, a second cantilever 2714 and a thin flexible portion 2716. A further haptic actuator may be used to move the thin flexible portion 2716 to deliver haptic feedback at a point along the length of the button portion 2706. Thus, by shaping the cross-sectional profile of the button portion 2706 it is possible to deliver haptic feedback at different points along the button portion 2706. It will be understood that the number of points of haptic feedback on the button portion 2706 may depend on the length of the button portion 2706.

FIG. 28A shows a schematic cross-sectional view of a part of a gapless haptic assembly 2800 which uses magnets and magnetic interaction to produce haptic feedback. The gapless haptic assembly 2800 comprises a housing 2802, similar to that shown in for example, FIGS. 23A and 25. The housing 2802 comprises a contact surface which a user may touch to receive haptic feedback. The gapless haptic assembly 2800 comprises a first magnet or magnetic element 2806, which may be fixedly connected to an internal surface of the housing 2802, and specifically to an internally-located side of the contact surface. The first magnet 2806 may be a permanent magnet. As shown in FIG. 28A, the north pole of the first magnet 2806 may be closest to the internal surface of the housing 2802 and the south pole is further away from the internal surface of the housing, however it will be understood that this is merely exemplary. The gapless haptic assembly 2800 comprises a second magnet 2804. The second magnet 2804 is moveable relative to the housing 2802 and relative to the first magnet 2806. The second magnet 2804 may be a permanent magnet. The second magnet 2804 is arranged such that the south pole faces the south pole of the first magnet 2804. The second magnet 2804 is coupled to at least one SMA actuator wire 2808. The at least one SMA actuator wire 2808 is coupled at one end to a static component (e.g. the housing 2802 itself), and at another end to the moveable second magnet 2804. In an equilibrium state, the second magnet 2804 is at a distance from the first magnet 2806 such that the magnetic interaction between the two magnets is minimal/insignificant. When the at least one SMA actuator wire 2808 is heated and caused to contract, the second magnet 2804 is moved closer to the first magnet 2806. As the like poles of the two magnets 2804, 2806 are brought closer together, the movement of the second magnet 2804 forces the first magnet 2806 to be repelled away from the second magnet 2804. This repulsion causes the movement of the housing 2802 (specifically the contact surface of the housing), which thereby causes a haptic sensation to be delivered.

FIG. 28B shows an alternative arrangement of the first magnet in FIG. 28A. Here, the first magnet 2806' may be arranged such that the poles of the magnet are at an angle to the internal surface of the housing 2802. This may help to reduce any undesired horizontal/sideways motion of the first magnet 2806' when the second magnet 2804 is moved into proximity with the first magnet 2806'. Additionally or alternatively, one or more bearings (not shown) may be used to restrict the horizontal/sideways motion of the first magnet 2806, 2806' within the housing.

The haptic assemblies shown in FIGS. 28A and 28B may further comprise a bias spring or other component (not shown) to oppose the effect of the at least one SMA actuator wire 2808. The haptic assemblies may further comprise one or more endstops (not shown) in the housing to restrict movement of the second magnet 2804 and first magnet 2806.

Many of the haptic assemblies described above use wedge-shaped components or inclined surfaces to transfer motion along one axis into motion along a second axis (e.g. 'horizontal'/lateral motion to 'vertical' motion). FIGS. 29A and 29B show two gapless haptic assemblies which use alternative mechanisms to deliver haptic feedback.

FIG. 29A shows a cross-sectional view of a gapless haptic assembly 2900 comprising a material under compression. The haptic assembly 2900 may be incorporated into or otherwise provided along an edge of a smartphone or on a surface of a smartphone. The haptic assembly 2900 may be a provided as a standalone module that may be incorporated into an electronic device during manufacture. Alternatively, some or all of the components of haptic assembly 2900 may be integrally formed in an electronic device.

The haptic assembly 2900 may comprise a housing 2906. In this case, the haptic assembly 2900 may be a module which is incorporated into an electronic device. Alternatively, the housing 2906 may be part of an electronic device (and not part of the haptic assembly) into which the components of the haptic assembly 2900 are incorporated. In this case, the electronic device may be more aesthetically pleasing to a user because the edge or surface of the electronic device where the haptic assembly 2900 is located may be substantially smooth and gap-free. This may allow an electronic device to be produced which has smooth edges/surfaces that do not have protruding buttons. Instead of having a visible, protruding button, the haptic assembly 2900 may provide haptic feedback when a user contacts (or is in the vicinity of) a 'non-protruding button' of the haptic assembly.

The housing 2906 (whether it is part of the haptic assembly 2900 or otherwise) comprises a (non-protruding) button portion 2902. All of the edges of the button portion 2902 may be connected to the housing 2906. However, the button portion 2902 may be thinner than the rest of the housing 2906—this allows the button portion 2902 to move relative to the housing 2906 (as indicated by the arrow) when the haptic assembly 2900 is activated. In other words, the thickness of the button portion 2902 may provide the button portion 2902 with the flexibility to move relative to the housing 2902. The button portion 2902 may be provided by machining, etching or half-etching the housing 2902 to remove material. The button portion 2902 comprises a contact surface. The contact surface may be substantially level with/flush with an external surface of the housing 2902 when the haptic assembly is in an equilibrium state.

The haptic assembly 2900 comprises an intermediate moveable element 2904. The intermediate moveable element 2904 is coupled to at least one SMA actuator wire. The or each SMA actuator wire is coupled at one end to the housing 2906 and at another end to the intermediate moveable element 2904. The haptic assembly 2900 may comprise a return spring/bias spring. The haptic assembly 2900 comprises a compliant or flexible material 2908. The compliant material 2908 may be an elastomer, such as natural rubber, silicone rubber, thermoplastic polyurethane (TPU), neoprene rubber and polyurethane. It will be understood that is a non-exhaustive, non-limiting example list of materials. The compliant material 2908 is in contact with the intermediate moveable element 2904 and the button portion 2902 of the housing 2906. When the haptic assembly 2900 is in the equilibrium (inactive) state, the intermediate moveable element 2904 exerts a force on the compliant material 2908. Generally speaking, when the compliant material 2908 is compressed in one direction (e.g. by the intermediate moveable element 2904), the compliant material 2908 expands in another direction. When the at least one SMA actuator wire is heated and contracts, the intermediate moveable element 2904 moves and the force exerted by the intermediate moveable element 2904 on the compliant material 2908 is reduced. This enables the compliant material 2908 to expand in the lateral direction (i.e. along the axis of movement of the intermediate moveable element 2904).

The haptic assembly 2900 may function in a number of ways. For example, in one arrangement, in the equilibrium state, the compliant material 2908 may exert a force on the button portion 2902 which causes the button portion 2902 to bulge or be in a 'raised' position. In this case, when the haptic assembly 2900 is in the active state, the compliant material 2908 is able to expand in the lateral direction (i.e. along the axis of movement of the intermediate moveable element 2904). This causes the button portion 2902 to become 'unraised', such that the button portion 2902 moves vertically 'downward' when the haptic assembly 2900 is activated. In an alternative arrangement, in the equilibrium state, the compliant material 2908 may exert a force on the button portion 2902, and the button portion 2902 may exert an equal but opposite force on the compliant material 2908. In this case, the button portion 2902 is substantially flush with/level with the housing 2906 in the equilibrium state. When the haptic assembly 2900 is in the active state, the force on the compliant material 2908 is reduced, but the force exerted by the button portion remains the same. Therefore, the button portion 2902 may form a dimple-shape when the haptic assembly is activated.

It will be understood that the arrangement of the intermediate moveable element and the compliant material may be changed so that the button portion 2902 moves vertically 'upward' when the haptic assembly 2900 is activated.

The haptic assembly 2900 may be advantageous because the button portion 2902 is part of the housing 2906 such that there is no gap between the button portion and the housing 2906 when the haptic assembly 2900 is integrated into a device such as a smartphone. Thus, the haptic assembly 2900 is substantially water-proof and/or dust-proof.

Like many of the gapless haptic assemblies described herein, the haptic assembly 2900 may be modified such that it is used to move a button (e.g. a button of the type shown in FIG. 1). Thus, the haptic assembly 2900 may be gapless, apparently gapless or have a visible gap, depending on other design criteria. FIG. 29B shows a cross-sectional view of the haptic assembly 2900 having a gap between the button 2902' and the housing.

FIG. 29C shows a cross-sectional view of a gapless haptic assembly 2950 comprising a piston. The haptic assembly 2950 may be incorporated into or otherwise provided along an edge of an electronic device or on a surface of a electronic device. The haptic assembly 2950 may be provided as a standalone module that may be incorporated into an electronic device during manufacture. Alternatively, some or all of the components of haptic assembly 2950 may be integrally formed in an electronic device.

The haptic assembly 2950 may comprise a housing 2956. In this case, the haptic assembly 2950 may be a module which is incorporated into an electronic device. Alternatively, the housing 2956 may be part of an electronic device (and not part of the haptic assembly) into which the components of the haptic assembly 2950 are incorporated. In this case, the electronic device may be more aesthetically pleasing to a user because the edge or surface of the electronic device where the haptic assembly 2950 is located may be substantially smooth and gap-free. This may allow an electronic device to be produced which has smooth edges/surfaces that do not have protruding buttons. Instead of having a visible, protruding button, the haptic assembly 2950 may provide haptic feedback when a user contacts (or is in the vicinity of) a 'non-protruding button' of the haptic assembly.

The housing 2956 (whether it is part of the haptic assembly 2950 or otherwise) comprises a (non-protruding) button portion 2952. All of the edges of the button portion 2952 may be connected to the housing 2956. However, the button portion 2952 may be thinner than the rest of the housing 2956—this allows the button portion 2952 to move relative to the housing 2956 (as indicated by the arrow) when the haptic assembly 2950 is activated. In other words, the thickness of the button portion 2952 may provide the button portion 2952 with the flexibility to move relative to the housing 2952. The button portion 2952 may be provided by machining, etching or half-etching the housing 2952 to remove material. The button portion 2952 comprises a contact surface. The contact surface may be substantially level with/flush with an external surface of the housing 2952 when the haptic assembly is in an equilibrium state.

The haptic assembly 2950 comprises an intermediate moveable element 2954. The intermediate moveable element 2954 is coupled to at least one SMA actuator wire. The or each SMA actuator wire is coupled at one end to the housing 2956 and at another end to the intermediate moveable element 2954. The haptic assembly 2900 may comprise a return spring/bias spring. The haptic assembly 2950 comprises a piston 2960 and a fluid 2958. The fluid 2958 may be an oil, mineral oil, silicone-based fluids, glycol-based fluids, water, gas, air, or an inert gas (e.g. nitrogen). It will be understood that is a non-exhaustive, non-limiting example list of materials. The piston 2960 is in contact with the button portion 2952 and the fluid 2958. The fluid 2958 is in contact with the piston 2960 and the intermediate moveable element 2954. When the haptic assembly 2950 is in the equilibrium (inactive) state, the intermediate moveable element 2954 exerts a force on the fluid 2958, which in turn exerts a force on the piston 2960. Thus, this haptic assembly 2950 uses a hydraulic mechanism to transfer the motion of the SMA actuator wire(s) to the button portion 2952. When the at least one SMA actuator wire is heated and contracts, the intermediate moveable element 2954 moves and the force exerted by the intermediate moveable element 2954 on the fluid 2958 is reduced. This enables the fluid 2958 to expand in the lateral direction (i.e. along the axis of movement of the intermediate moveable element 2954).

The haptic assembly 2950 may function in a number of ways. For example, in one arrangement, in the equilibrium state, the fluid 2958 may exert a force on the piston 2960, which causes the button portion 2952 to bulge or be in a 'raised' position. In this case, when the haptic assembly 2950 is in the active state, the fluid 2958 is able to expand in the lateral direction (i.e. along the axis of movement of the intermediate moveable element 2954). This causes the button portion 2952 to become 'unraised', such that the button portion 2952 moves vertically 'downward' when the haptic assembly 2950 is activated. In an alternative arrangement, in the equilibrium state, the fluid 2958 may exert a force on piston 2960, and the button portion 2952 may exert an equal but opposite force on the piston 2960. In this case, the button portion 2952 is substantially flush with/level with the housing 2956 in the equilibrium state. When the haptic assembly 2950 is in the active state, the force on the fluid 2958 and the piston 2960 is reduced, but the force exerted by the button portion 2952 remains the same. Therefore, the button portion 2952 may form a dimple-shape when the haptic assembly is activated.

FIG. 29D shows an alternative arrangement of the gapless haptic assembly of FIG. 29C, in which the direction of movement of the intermediate moveable element is reversed relative to the arrangement of FIG. 29C. In other words, when the SMA actuator wire is powered, the intermediate moveable element exerts a higher force on the fluid 2958. In this case, the button portion 2952 moves vertically 'upwards' when the SMA actuator wire is powered and contracts.

The haptic assembly 2950 may be advantageous because the button portion 2952 is part of the housing 2956 such that there is no gap between the button portion and the housing 2956 when the haptic assembly 2950 is integrated into a device such as a smartphone. Thus, the haptic assembly 2950 is substantially water-proof and/or dust-proof.

Like many of the gapless haptic assemblies described herein, the haptic assembly 2950 may be modified such that it is used to move a button (e.g. a button of the type shown in FIG. 1). Thus, the haptic assembly 2950 may be gapless, apparently gapless or have a visible gap, depending on other design criteria. FIG. 29E shows a cross-sectional view of the haptic assembly 2950 having a gap between the button 2952' and the housing.

Thus, in embodiments of the haptic button assembly, the button and the housing may be integrally formed.

The button may comprise at least one free edge.

The button may be formed by etching or half-etching the housing.

The button may comprise at least one cantilever and the at least one intermediate moveable element is arranged to drive movement of the cantilever along the first axis.

The haptic button assembly may comprise a first magnetic element fixedly connected to the button, and wherein the intermediate moveable element may comprise a second magnetic element.

The haptic button assembly may comprise a compliant material provided between the button and the intermediate moveable element, wherein the intermediate moveable element may be arranged to drive movement of the compliant material along the first axis, and the movement of the compliant material drives movement of the button along the first axis.

The haptic button assembly may comprise a fluid and a moveable component, wherein the intermediate moveable element is arranged to drive movement of the fluid, the fluid is arranged to drive movement of the moveable component, and the moveable component drives movement of the button along the first axis.

In embodiments, the at least one intermediate moveable element may comprise: a first moveable arm fixedly connected at a first end to the button; a second moveable arm rotatably connected at a first end to a second end of the first moveable arm via a first hinge, and fixedly connected at a second end to the static component; a third moveable arm fixedly connected at a first end to the button; a fourth moveable arm rotatably connected at a first end to a second end of the third moveable arm via a second hinge, and fixedly connected at a second end to the static component; wherein the at least one SMA actuator wire is connected to the first and second hinges and arranged to drive movement of the intermediate moveable element in a first plane, thereby driving movement of the button in the first plane.

FIGS. 30A and 30B show schematic plan views of a device 3000 comprising a partly gapless haptic assembly in the equilibrium (inactive) and active states respectively. As mentioned above with reference to FIGS. 27A to 27E, it may be possible to take advantage of existing gaps and design features within a smartphone or other consumer electronic device, for example, when designing and integrating a haptic assembly into the device. FIGS. 30A and 30B show how a haptic assembly may be used to slide existing design features of a device 3000, and thereby create a haptic sensation. The haptic assembly in this case may not convert horizontal/lateral motion into vertical motion—instead, the haptic assembly may simply be used to move a component of the device 3000 laterally.

The device 3000 comprises at least one moveable component which may be moved by a haptic assembly to deliver haptic feedback. In the illustrated example, the device 3000 comprises a first moveable component 3002 and a second moveable component 3004. The device 3000 comprises one or more haptic assemblies (not shown), where each haptic assembly is used to move an individual moveable component. In the equilibrium state, the first and second moveable components 3002, 3004 are flush against other components of the device 3000, such that there is no discernible gap 3006, 3008 and the device may be water- and/or dust-proof. In the active state, a haptic assembly may slide one of the moveable components 3002, 3004 back and forth to generate haptic feedback. However, this causes a visible gap 3006, 3008 to be formed while the moveable component is in motion. Thus, while the device 3000 is delivering haptic feedback, the device 3000 may not be water- and/or dust-proof. To provide water- and/or dust-proofing, the device 3000 may comprise an additional sealing mechanism, such as those described in International Patent Application No. PCT/GB2018/052923.

FIGS. 31A and 31B show schematic plan views of a device 3100 comprising an alternative partly gapless haptic assembly in the equilibrium (inactive) and active states respectively. As mentioned above with reference to FIGS. 27A to 27E, it may be possible to take advantage of existing gaps and design features within a smartphone or other consumer electronic device, for example, when designing and integrating a haptic assembly into the device. FIGS. 31A and 31B show how a haptic assembly may be used to slide existing design features of a device 3100, and thereby create a haptic sensation. The haptic assembly in this case may not convert horizontal/lateral motion into vertical motion—instead, the haptic assembly may simply be used to move a component of the device 3100 laterally.

The device 3100 comprises at least one moveable component which may be moved by a haptic assembly to deliver haptic feedback. In the illustrated example, the device 3100 comprises a first moveable component 3102 and a second moveable component 3104. The device 3100 comprises one or more haptic assemblies (not shown), where each haptic assembly is used to move an individual moveable component. In the equilibrium state, the first and second moveable components 3102, 3104 are flush against each other, such that there is no discernible gap between the two components and the device 3100 may be water- and/or dust-proof. In the active state, a haptic assembly may slide one of the moveable components 3102, 3104 back and forth to generate haptic feedback. However, this causes a gap 3106 to be formed between the two moveable components while the or each moveable component is in motion. Thus, while the device 3100 is delivering haptic feedback, the device 3100 may not be water- and/or dust-proof. To provide water- and/or dust-proofing, the device 3000 may comprise an additional sealing mechanism, such as those described in International Patent Application No. PCT/GB2018/052923.

Thus, in embodiments, the at least one SMA actuator wire may be arranged to drive movement of the intermediate moveable component along an axis parallel to the axis of the at least one SMA actuator wire; and the at least one intermediate moveable element may be arranged to drive movement of the moveable component along an axis parallel to the axis of the at least one SMA actuator wire. In other words, the intermediate moveable component and the moveable component may move in the same direction as the contraction and expansion of the at least one SMA actuator wire (horizontally/laterally).

FIG. 32 shows a schematic plan view of a device 3200 comprising a further alternative partly gapless haptic assembly in the active state. Here, a whole side or edge of the device 3200 may be a moveable component 3202 which is moveable to deliver haptic feedback. In this case, a visible gap may only appear when the moveable component 3202 is being moved to deliver haptic feedback. One or more haptic assemblies may be provided to move the moveable component 3202 vertically upwards.

In each of the embodiments shown in FIGS. 30 to 32, additional sealing mechanisms may be provided to ensure the device is water-proof and/or dust-proof in use. For example, seals between the moveable component and the haptic assembly may be provided to prevent fluid and/or dust ingress into the body of the device. Thus, even if fluid/dust gets into the gap while the haptic assembly is active, it may not be able to move any further into the body of the device.

While the importance of providing a dust- and/or water-proof device has been discussed, it will be understood that there are a number of applications where this is not required. For example, while compliance with the Ingress Protection (IP) Rating of 67 or 68 may be important for smartphones, smartwatches and some other wearable devices, it may not be important for gaming controllers, domestic appliances and within vehicles, for example. Therefore, in some cases, it may not be necessary for the haptic assembly to be gapless or fully sealed both in an equilibrium and active state.

It will be understood that any of the gapless haptic assemblies described above may be modified such that it they can be used to move a button (e.g. a button of the type shown in FIG. 1). That is, the gapless haptic assemblies may be modified to be apparently gapless or have a visible gap.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An apparatus comprising:
   a static component;
   a moveable component that is moveable along a first axis relative to the static component;
   at least one assembly arranged to move the moveable component, the assembly comprising:
      at least one intermediate moveable element moveable along a second axis that is inclined relative to the first axis or perpendicular to the first axis, wherein the at least one intermediate moveable element is arranged in contact with the moveable component so as to drive movement of the moveable component; and
      at least one shape memory alloy (SMA) actuator wire coupled to the at least one intermediate moveable element and arranged to, on contraction, drive movement of the intermediate moveable component.

2. The apparatus of claim 1, comprising a bearing provided between the intermediate moveable element and the moveable component and arranged to move the moveable component along the first axis when the intermediate moveable element moves along the second axis.

3. The apparatus of claim 2, wherein the bearing comprises at least one ramp.

4. The apparatus of claim 3, wherein the bearing further comprises at least one ball bearing arranged to roll along the at least one ramp.

5. The apparatus of claim 3, wherein the at least one ramp is provided by an inclined surface of the intermediate moveable element and/or of the static component.

6. The apparatus of claim 3, wherein the at least one ramp is a localised ramp provided on a surface of the intermediate moveable element and/or on the surface of the static component.

7. The apparatus of claim 3, wherein the at least one ramp has a constant gradient.

8. The apparatus of claim 3, wherein the at least one ramp has a variable, non-constant gradient.

9. The apparatus of claim 1, comprising a bearing provided between the intermediate moveable element and the static component and arranged to bear movement of the intermediate moveable element along the second axis.

10. The apparatus of claim 9, wherein the bearing comprises at least one ramp.

11. The apparatus of claim 10, comprising at least one ball bearing arranged to roll along the at least one ramp.

12. The apparatus of claim 10, wherein the at least one ramp has a constant gradient.

13. The apparatus of claim 10, wherein the at least one ramp has a variable, non-constant gradient.

14. The apparatus of claim 1, comprising a bearing provided between the moveable component and the static component and arranged to constrain movement of the moveable component along the second axis.

15. The apparatus of claim 1, wherein the moveable component is a button, and wherein the apparatus further comprises a sensor to detect a button press and control circuitry coupled to the sensor and the at least one SMA actuator wire and arranged to:
  receive data from the sensor indicating that the button has been pressed; and
  send a signal to drive the at least one SMA actuator wire.

16. The apparatus of claim 1, comprising a plurality of SMA actuator wires arranged to move the intermediate moveable element in the same direction along the second axis.

17. The apparatus of claim 1, comprising a plurality of SMA actuator wires, wherein the plurality of SMA actuator wires comprises a first group of wires and a second group of wires, where the first group of wires are arranged to move the intermediate moveable element in a first direction along the second axis, and the second group of wires are arranged to move the intermediate moveable element in a second direction along the second axis.

18. The apparatus of claim 1, further comprising a resilient biasing element coupled to the intermediate moveable element and arranged to oppose the movement of the intermediate moveable element caused by contraction of the at least one SMA actuator wire.

19. The apparatus of claim 1, wherein each SMA actuator wire is coupled to the at least one intermediate moveable element via a crimp connector.

20. An apparatus comprising:
  a static component;
  a moveable component that is moveable along a first axis relative to the static component;
    at least one assembly arranged to move the moveable component, the assembly comprising:
      at least one intermediate moveable element rotatable about a second axis that is parallel to the first axis and arranged in contact with the moveable component so as to drive movement of the moveable component; and
      at least one shape memory alloy (SMA) actuator wire coupled to the at least one intermediate moveable element and arranged to, on contraction, drive movement of the intermediate moveable component.

* * * * *